US010515086B2

(12) United States Patent
Jolley et al.

(10) Patent No.: US 10,515,086 B2
(45) Date of Patent: Dec. 24, 2019

(54) INTELLIGENT AGENT AND INTERFACE TO PROVIDE ENHANCED SEARCH

(71) Applicant: Facebook, Inc., Menlo Park, CA (US)

(72) Inventors: Charles Jolley, San Francisco, CA (US); Michael Hanson, Los Altos, CA (US); Chandrasekhar Iyer, Pleasanton, CA (US); Heidi Young, Woodinville, WA (US); David Baggeroer, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 154 days.

(21) Appl. No.: 15/436,822

(22) Filed: Feb. 19, 2017

(65) Prior Publication Data

US 2017/0242899 A1    Aug. 24, 2017

Related U.S. Application Data

(60) Provisional application No. 62/297,328, filed on Feb. 19, 2016.

(51) Int. Cl.
| | |
|---|---|
| *G06F 16/248* | (2019.01) |
| *G06F 16/242* | (2019.01) |
| *G06F 3/0482* | (2013.01) |
| *G06F 3/0485* | (2013.01) |

(52) U.S. Cl.
CPC .......... *G06F 16/248* (2019.01); *G06F 3/0482* (2013.01); *G06F 3/0485* (2013.01); *G06F 16/242* (2019.01)

(58) Field of Classification Search
CPC combination set(s) only.
See application file for complete search history.

(56) References Cited

U.S. PATENT DOCUMENTS

| | | | |
|---|---|---|---|
| 7,720,674 B2 | 5/2010 | Kaiser | |
| 8,046,259 B1* | 10/2011 | Siegel | G06Q 10/10 |
| | | | 705/14.73 |
| 2001/0049601 A1 | 12/2001 | Kroeker | |
| 2002/0052913 A1 | 5/2002 | Yamada | |
| 2008/0034381 A1* | 2/2008 | Jalon | G06F 17/30126 |
| | | | 719/329 |
| 2008/0243830 A1* | 10/2008 | Abhyanker | G06F 16/338 |
| 2008/0307343 A1* | 12/2008 | Robert | G06F 3/04817 |
| | | | 715/765 |
| 2009/0164929 A1* | 6/2009 | Chen | G06F 16/9535 |
| | | | 715/769 |

(Continued)

OTHER PUBLICATIONS

PCT International Search Report and Written Opinion, PCT Application No. PCT/US2017/018717, dated May 15, 2017, seven pages.

*Primary Examiner* — Hien L Duong
(74) *Attorney, Agent, or Firm* — Fenwick & West LLP

(57) ABSTRACT

A set of search results associated with a query is received, the set of search results including for each of search result in at least a subset of the set an indication of an evidence based at least in part on which the search result was included in the set of search results. A search result display interface is generated in which at least a displayed subset of search results are displayed, the search result display interface include for each of at least a subset of the displayed search results an indication of the corresponding evidence based on which that search result was included in the set of search results.

35 Claims, 37 Drawing Sheets

(56) References Cited

U.S. PATENT DOCUMENTS

| | | |
|---|---|---|
| 2009/0228817 A1* | 9/2009 | Adams .................. G06F 16/338 |
| | | 715/767 |
| 2010/0125592 A1* | 5/2010 | Dauginas ............... G06Q 30/02 |
| | | 707/758 |
| 2011/0301941 A1 | 12/2011 | De Vocht |
| 2013/0031074 A1 | 1/2013 | Vartanian |
| 2013/0218885 A1* | 8/2013 | Satyanarayanan ... G06Q 30/016 |
| | | 707/728 |
| 2014/0304257 A1 | 10/2014 | Ben Shahar |
| 2015/0039292 A1 | 2/2015 | Suleman |
| 2015/0134337 A1 | 5/2015 | Seo |
| 2015/0235289 A1* | 8/2015 | Jeremias ............ G06Q 30/0613 |
| | | 705/26.41 |
| 2015/0256499 A1 | 9/2015 | Kumar |
| 2015/0278222 A1* | 10/2015 | Claussenelias ... G06F 16/24578 |
| | | 707/723 |
| 2015/0278820 A1 | 10/2015 | Meadows |
| 2015/0302103 A1* | 10/2015 | Jeremias ........... G06F 17/30867 |
| | | 715/758 |
| 2015/0379648 A1 | 12/2015 | Spiegel |
| 2016/0034448 A1 | 2/2016 | Tran |
| 2017/0046764 A1* | 2/2017 | Konik ............... G06F 17/30867 |
| 2017/0069000 A1* | 3/2017 | Duleba .................. G06F 16/23 |
| 2017/0076327 A1* | 3/2017 | Filippini ............ G06Q 30/0256 |

* cited by examiner

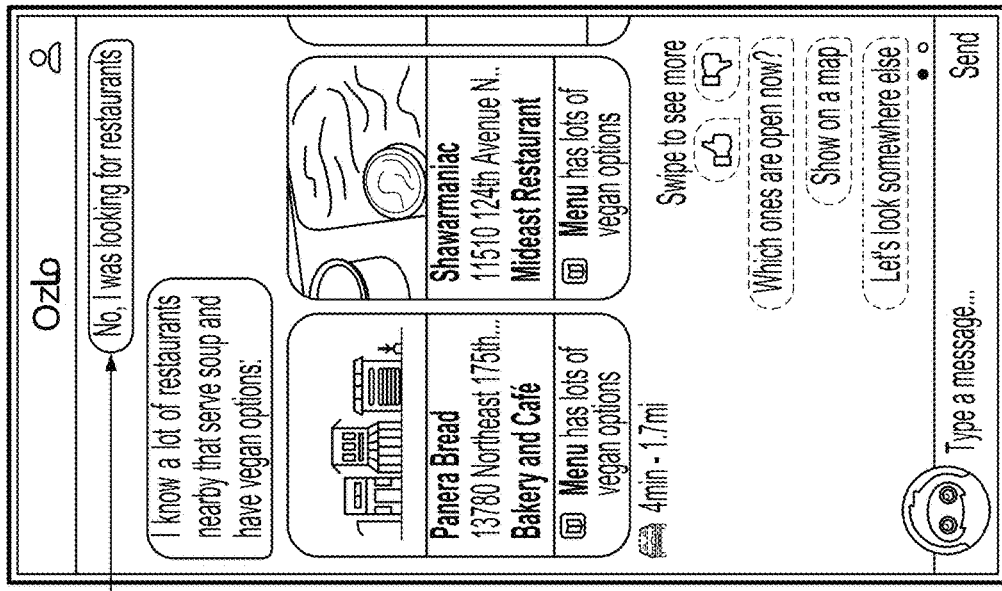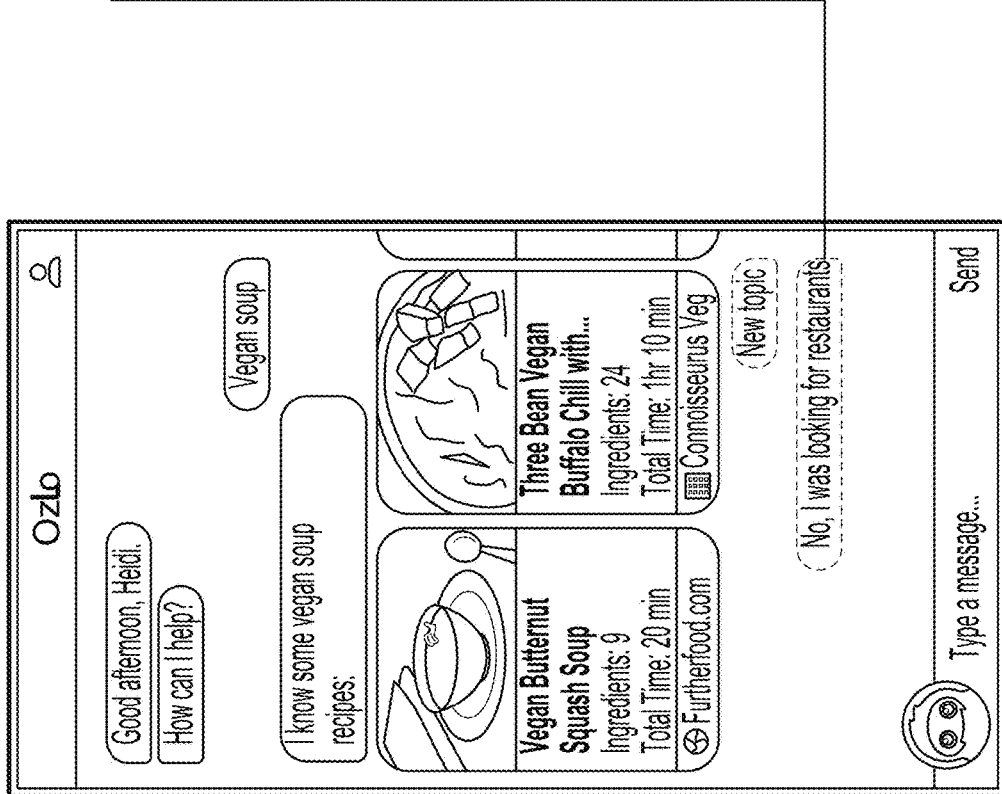
FIG. 5B

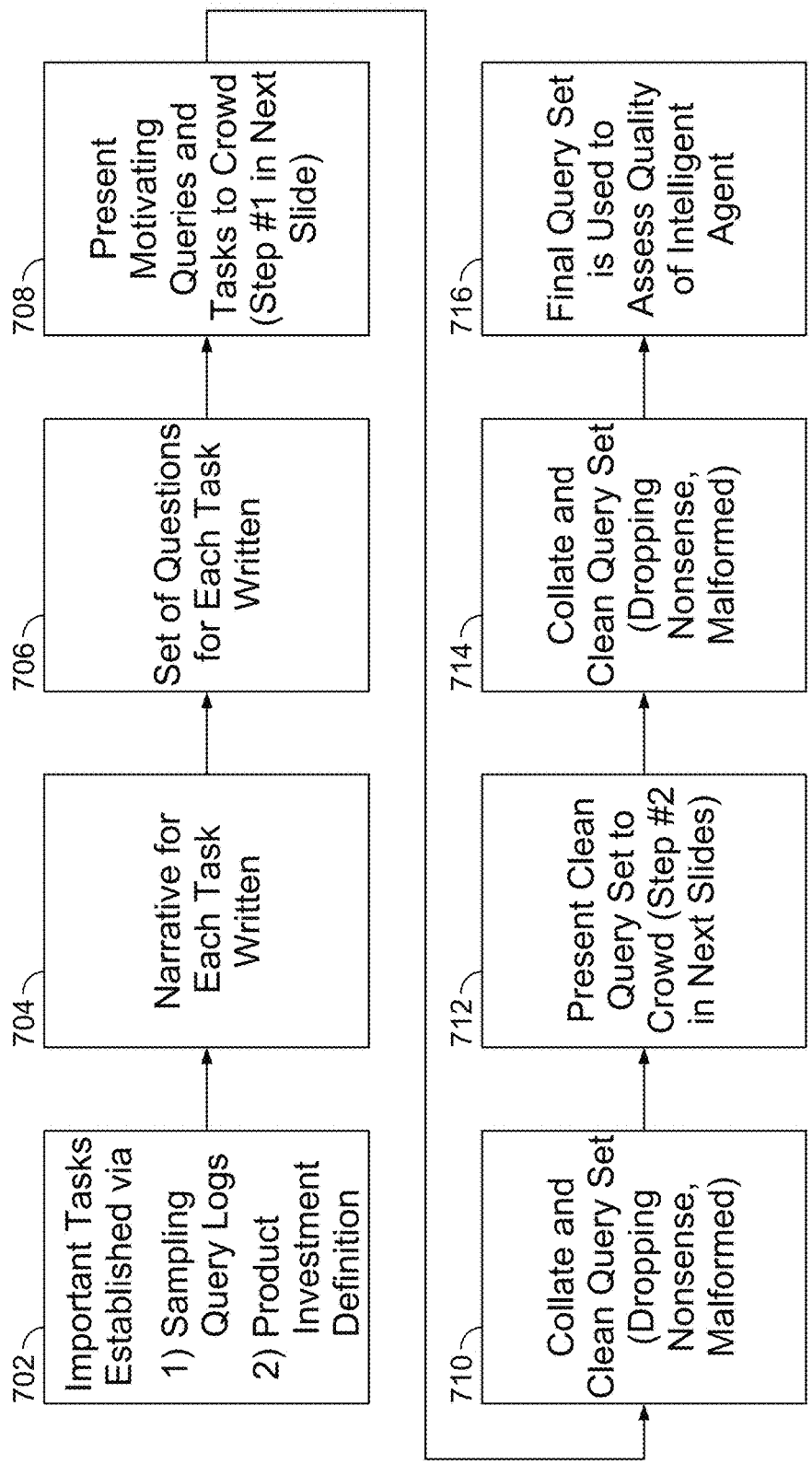

INTELLIGENT AGENT AND INTERFACE TO PROVIDE ENHANCED SEARCH

CROSS REFERENCE TO OTHER APPLICATIONS

This application claims priority to U.S. Provisional Patent Application No. 62/297,328 entitled INTELLIGENT AGENT AND INTERFACE TO PROVIDE ENHANCED SEARCH filed Feb. 19, 2016 which is incorporated herein by reference for all purposes.

BACKGROUND OF THE INVENTION

The computer internet retains the potential for a user to access a substantial amount of relevant information for the user's current needs. However, such a user has traditionally been limited not by access to the information but instead by searching and organizing data available on the internet to infer relevant information.

There exists a need to provide better search provisions to allow a user to infer relevant information more efficiently.

BRIEF DESCRIPTION OF THE DRAWINGS

Various embodiments of the invention are disclosed in the following detailed description and the accompanying drawings.

FIGS. 5A-5D illustrate examples of resolving ambiguity.

FIGS. 6F-6M illustrate example screenshots for an intelligent agent.

FIG. 7J is a flow chart illustrating an embodiment of a process for generating a measurement set.

DETAILED DESCRIPTION

Figure 1:
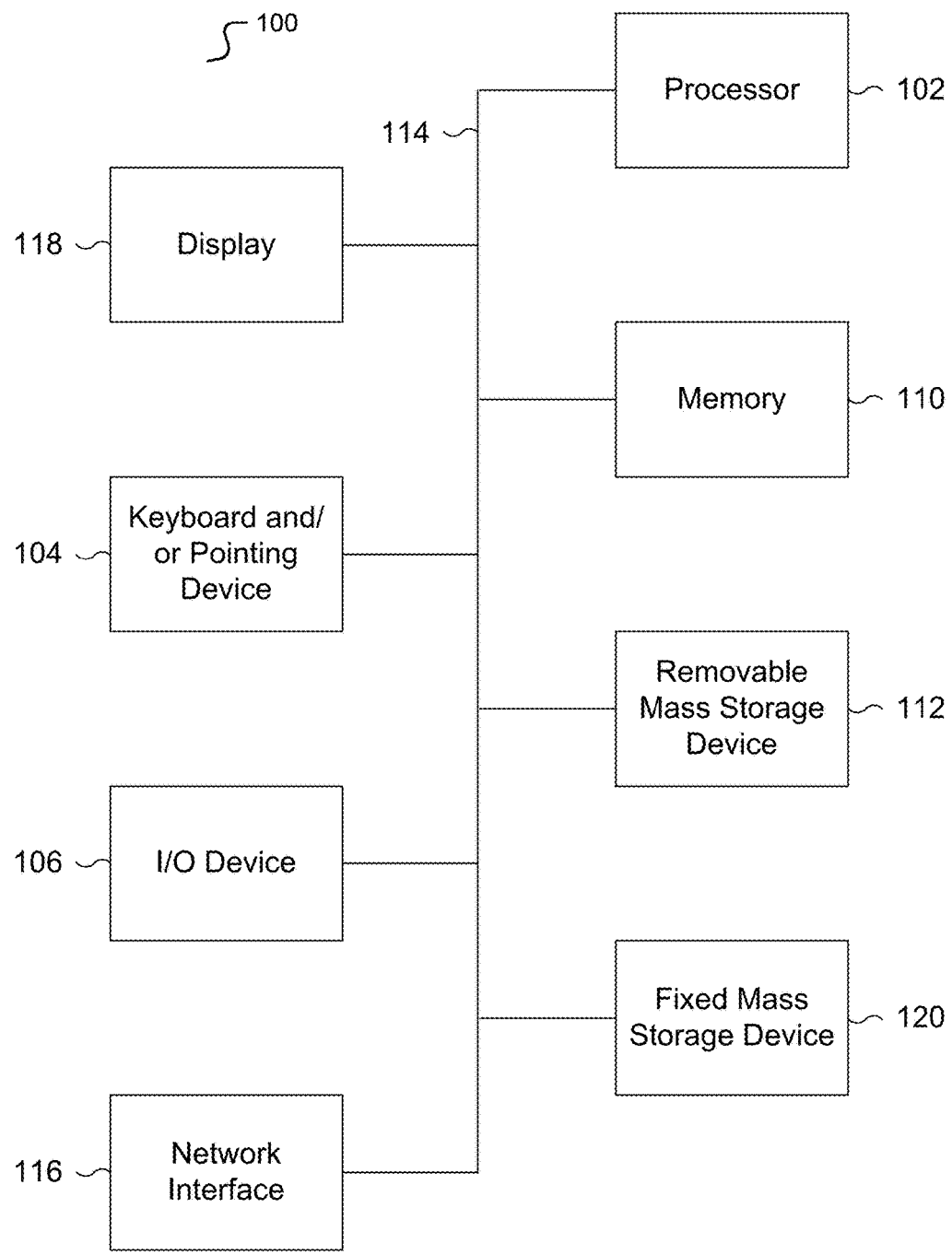
FIG. 1 is a functional diagram illustrating a programmed computer/server system for enhanced search in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An intelligent agent and interface to provide enhanced search is disclosed. In one embodiment, the intelligent agent converses with a user searching to provide a two-way channel to narrow the user's search parameters based on the user's intention efficiently. In one embodiment, the intelligent agent interface is optimized for a mobile user and/or user without a desktop computer, for example for a touch display and/or a "portrait" display aspect ratio wherein the length of the display is larger than its width.

In one embodiment, the intelligent agent returns queries with an indication of evidence, for example evidence supported results. For example, results may be aggregated from multiple sources such as Facebook, Yelp, and Google+, and for each result a most trusted/authoritative source that resulted in the result being presented may be cited as the source is presented. When a search is performed, a ranked list of possible answers and/or results to the user's query may be generated along with an explanation for why the result was included in the set, as well as its rank, in a way that is easily understood by the human user. Presenting evidence back to the human user permits them to efficiently process the results based on their personal consideration of trust and/or authority for the evidence cited.

In one embodiment, the intelligent agent interface presents to a user a carousel of cards with cross-aspect scrolling and/or priority ordering. Cross-aspect scrolling comprises using the secondary axis of a two-axis display. For example, for a portrait aspect ratio display with limited space in the horizontal axis, the carousel is presented as a horizontal series of cards and/or swipable cards. For example, in response to a user's query, a search engine may be used to determine a set of most relevant results. The most relevant results may be presented via the carousel of publisher-themed cards in a priority order, for example most important on the left and least important on the right, wherein on the first three leftmost cards are shown and the other cards may be swiped through to.

In one embodiment, a user query is proceed at least in part by determining a user intent associated with the user query. In one embodiment, user intent is extracted from a user's input using a syntactic parse, wherein raw bytes of user input are mapped to a digital representation of low-level parts of human natural language. A syntactic parse may use algorithmic and statistical processes. User intent may be determined by matching parsed natural language input against a set of interpretations that may have meaning in the context of a knowledge base.

In one embodiment, enhanced and/or interactive search comprises a search engine/service/experience that seeks to provide a highly precise result to the user by focusing the interface on helping the user to clarify or discover their actual search intention rather than focusing on the result. Traditional search focuses on showing a user the best set of results for any given query. Many traditional systems balance between recall, such as showing all of the matches, with precision, such as showing the best match. Some traditional systems offer tools to filter results, but in general search engines depends greatly on a user asking the right question/query.

By contrast, interactive search takes an opposite approach by focusing on assisting the user to iteratively improve the question until the user finds exactly the answer intended. Thus, interactive search focuses on precision, such as showing the best result, at the expense of recall, in order to permit a user to efficiently find the best way to ask for exactly what they want.

Throughout this specification, an "intelligent agent" is a system, functionality, and/or presence provided that may be invoked as a contact in any one of a plurality of supported messaging channels. For example, in some embodiments, the intelligent agent is invited and/or otherwise joined as a participant in a group conversation, such as a group chat. In one embodiment, an intelligent agent is implemented via a software program running on one more server computers. The intelligent agent may comprise a software system that combines one or more of a user model, a natural language comprehension system, a natural language synthesis system, a discourse database, a knowledge database, and one or more messaging channel input/output (I/O) connectors. In one embodiment, an intelligent agent functions as a "virtual person" to whom a human or other user may direct natural language statements. In one embodiment, the intelligent agent attempts to understand and answer with data from its knowledge database, based at least in part on the intelligent agent's understanding of the user's context, conversational state, and previous activity.

Throughout this specification, a "messaging channel" is a multi-user software system provided by a search service provider and/or a third party, in which a user may exchange "messages" or small files in a user-to-user, small group, large group, or public fashion. Such systems typically have user accounts, which typically are associated with unique User IDs (text strings or numbers). One common example of such a system is the public telephone system, in which users are identified by a phone number, and short text messages are exchanged through the SMS and MMS systems. Other examples include "chat" and/or "messenger" applications on desktop, tablet, or mobile computers, and telephones, and also on software-enhanced speakers, televisions, and automobiles.

Throughout this specification, a "messaging channel API" is an application programming interface (API) provided by a messaging channel to third parties, typically for integration with the messaging channel provider's software systems. Throughout this specification, a "contact" is a software abstraction provided by a messaging channel, representing a single account in their system. A contact typically corresponds to a single human user, but the intelligent agent software system may also participate in the role of a contact in one or more messaging channels.

Throughout this specification, an "entity" is a named entity in the data model of a system. An entity may be a person, place, or thing, at any resolution from coarse to very specific. In one embodiment, it is assumed and/or enforced that there is only one digital entity for each real-world entity. Each entity may have one or more "attributes", which may be key-value data pairs which are assigned to the entity. An entity may be modeled as a member of one or more "domains", which correspond to general classes of nouns. For example, the "San Francisco Opera House" entity may be a member of the "Place of Interest" domain, as well as the "Performance Venue" domain and the "Historical Building" domain.

FIG. 1 is a functional diagram illustrating a programmed computer/server system for enhanced search in accordance with some embodiments. As shown, FIG. 1 provides a functional diagram of a general purpose computer system programmed to provide enhanced search in accordance with some embodiments. As will be apparent, other computer system architectures and configurations may be used for enhanced search.

Computer system 100, which includes various subsystems as described below, includes at least one microprocessor subsystem, also referred to as a processor or a central processing unit ("CPU") 102. For example, processor 102 may be implemented by a single-chip processor or by multiple cores and/or processors or by virtual processors. In some embodiments, processor 102 is a general purpose digital processor that controls the operation of the computer system 100. Using instructions retrieved from memory 110, the processor 102 controls the reception and manipulation of input data, and the output of data on output devices, for example network interface 116 or storage 120.

Processor 102 is coupled bi-directionally with memory 110, which may include a first primary storage, typically a random-access memory ("RAM"), and a second primary storage area, typically a read-only memory ("ROM"). As is well known in the art, primary storage may be used as a general storage area and as scratch-pad memory, and may also be used to store input data and processed data. Primary storage may also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 may include any suitable computer-readable storage media, described below, depending on whether, for example, data access needs to be bi-directional or uni-directional. For example, processor 102 may also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 may also include computer-readable media such as flash memory, portable mass storage devices, holographic storage devices, magnetic devices, magneto-optical devices, optical devices, and other storage devices. A fixed mass storage 120 may also, for example, provide additional data storage capacity. The most common example of mass storage 120 is an eMMC device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 may be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard and/or pointing device 104, as well as an auxiliary input/output device 106 interface, a sound card, microphone speakers, and other subsystems as needed. For example, the pointing device 104 can be a mouse, stylus, track ball, touch display, and/or tablet, and is useful for interacting with a graphical user interface.

The communication interface 116 allows processor 102 to be coupled to another computer, computer network, or telecommunications network using a network connection as shown. For example, through the communication interface 116, the processor 102 may receive information, for example data objects or program instructions, from another network, or output information to another network in the course of performing method/process steps. Information, often represented as a sequence of instructions to be executed on a processor, may be received from and outputted to another network. An interface card or similar device and appropriate software implemented by, for example executed/performed on, processor 102 may be used to connect the computer system 100 to an external network and transfer data according to standard protocols. For example, various process embodiments disclosed herein may be executed on processor 102, or may be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, may also be connected to processor 102 through communication interface 116.

In addition, various embodiments disclosed herein further relate to computer storage products with a computer readable medium that includes program code for performing various computer-implemented operations. The computer-readable medium is any data storage device that may store data which may thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that may be executed using an interpreter.

The computer/server system shown in FIG. 1 is but an example of a computer system suitable for use with the various embodiments disclosed herein. Other computer systems suitable for such use may include additional or fewer subsystems. In addition, bus 114 is illustrative of any interconnection scheme serving to link the subsystems. Other computer architectures having different configurations of subsystems may also be utilized, including virtual servers.

Figure 2:
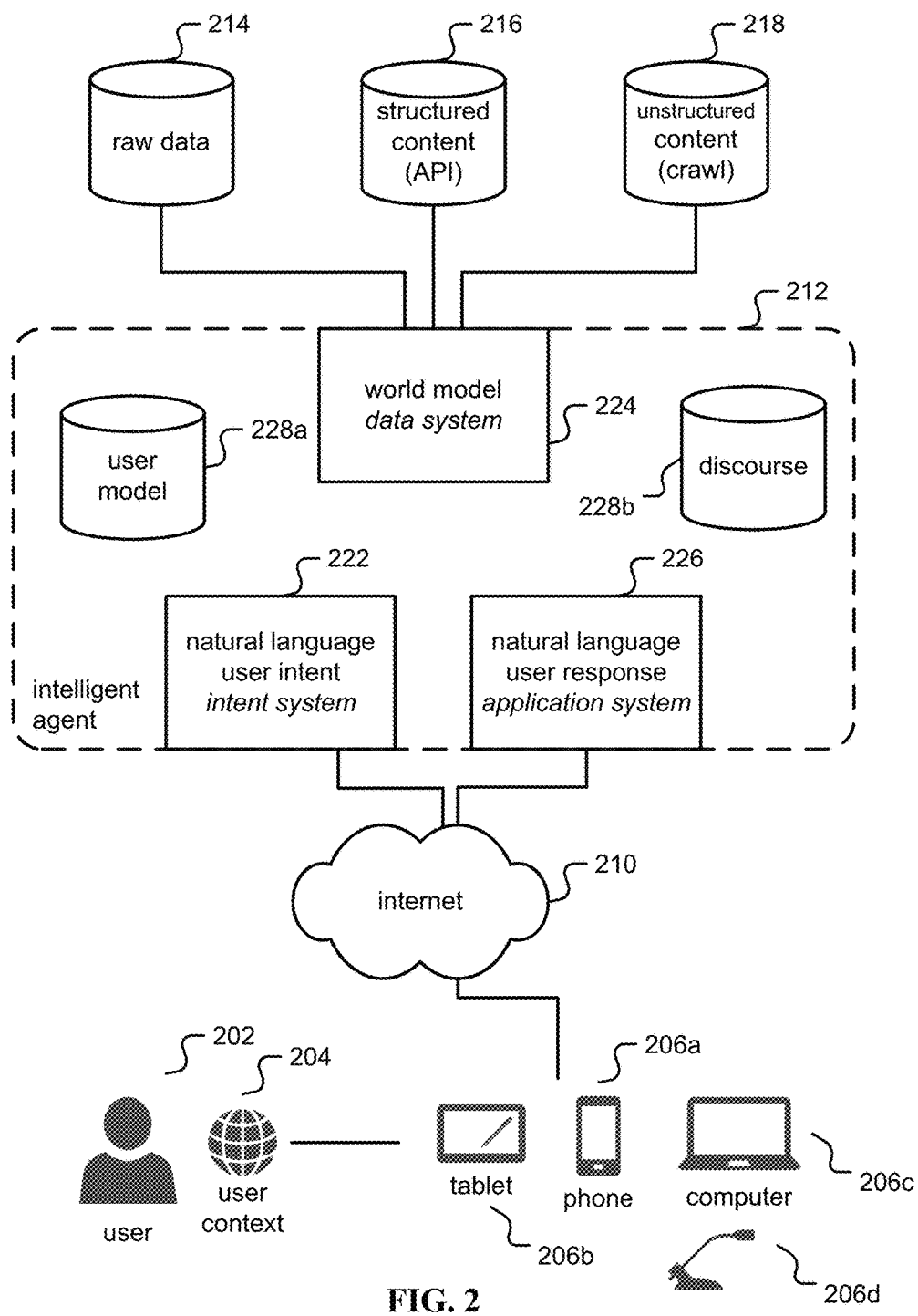
FIG. 2 is a block diagram illustrating an embodiment of a system for enhanced search.

FIG. 2 is a block diagram illustrating an embodiment of a system for enhanced search. User (202) associated with user context (204) uses a device (206), for example one or more of the following: a phone (206a), a tablet (206b), a desktop/laptop computer (206c), a voice only device such as a voice enabled speaker (206d), a television (not shown), or another internet capable device (not shown). The device (206) is coupled to the computer internet (210) which in turn is coupled to an intelligent agent server (212).

The intelligent agent server (212) is coupled directly or indirectly via the internet to a raw data store (214), a structured content store (216) established using an API with a search engine or other database coupling, and/or an unstructured content store (218) established using a crawler/bot.

The intelligent agent server (212) comprises: an "intent system" (222) which includes a system to take a natural language statement from the user (202) and determine user intent; a "data system" (224) to understand and model the world as of a current instant; and an "application system" (226) to match the user intent with a task applied to the world model and/or synthesize a natural language reply to the user's statement.

In other words, the intelligent agent (212) may comprise one or more of the following: a user model database (228a); a natural language comprehension system; a natural language synthesis system; a discourse database (228b); a knowledge database which encodes facts about the world (214, 216, 218); and a plurality of messaging channel input/output (I/O) connectors shown as lines connecting 212 to other objects in FIG. 2.

The intelligent agent (212) may use a messaging channel API to register itself as an account within a multi-user environment hosted by a messaging channel provider which is associated with one or more user devices (206). The intelligent agent (212) may then monitor this API for messages delivered to its account, and correlate those messages with its user model database.

In one embodiment, by connecting to multiple messaging channels and correlating a user identifier and/or User ID of records in the user model database (228a), the intelligent agent (212) simulates a persistent virtual persona to the user (202) as they interact with the intelligent agent (212) via multiple channels. This persona may be able to recall details about the user's profile as modeled in the user model database (228a) and about the previous state of conversations with the user as modeled by the discourse database (228b). Thus with these facilities, an intelligent agent system (212) may maintain a conversation with one or more users across multiple channels.

In one embodiment, the user model database (228a) maintains a User Profile on all human users (202) of the system. This database includes identifying data, for example a name, profile data, for example, home and work addresses, and contact data for this user (202) along one or more of the channels. In one embodiment, information about a user (202) is gathered across a plurality of messaging channels and merged into a single User ID and/or record. The database may, for example, contain an email address, a phone number, and/or the URL of a photo file portraying the user (202), each of which was made available to the system through a different messaging channel's API. The user model database (228a) maintains all of this data, along with records about how the data was added to the system, to preserve freshness and/or provenance.

In one embodiment, a user (202) is authenticated across multiple channels, establishing a "joint identity" wherein the user (202) has proven, through access to a messaging channel or an authentication capability provided by the messaging channel provider, that one or more of the identities associated with the user model are shared by a human operator (202).

In one embodiment, the discourse database (228b) maintains a digital representation of the interactions between the user (202) and the intelligent agent (212), which may be called "discourse states". In one embodiment, a discourse state may comprise a timestamped list of one or more of the following: a user's verbatim statement; a representation of the syntactic, grammatical, and semantic interpretation of this statement; and a list of entities that have been evoked into conversation by previous steps in the discourse. These entities may be tagged with one or more of the following: gender, count, type, and so forth.

When a request from a user (202) is received from a messaging channel API, the User Profile for the user (202) is found by identifying the profile that matches the User ID associated with the request. Typically, messaging channels are required to provide a User ID for accounts associated with their channel. This User Profile is then used to recover the discourse state associated with said user (202). In some cases, a messaging channel will additionally provide a Group ID with the API message, and if this data is available, it is used to further refine the retrieval of discourse states.

In one embodiment, the discourse state is provided as part of a user context to a statement interpretation system (222) configured to determine user intent based on a user's input. In this fashion, the user's previous conversation topics and evoked entities are available to the statement interpretation system (222) to more reliably and/or accurately determine a user's intent with respect to a subsequently received query. In one embodiment, as part of an intelligent agent (212) a statement interpretation component/system (222) is used so that when a message is received from a user (202) through some messaging channel, the intelligent agent (212) uses the statement interpretation (222) system to extract user intent.

In one embodiment, the intelligent agent (212) is configured to detect one or more of the messaging channel being used, the capabilities thereof, and/or current associated conditions associated such as current state of congestion, response times, and round trip times. The intelligent agent (212) may adapt the richness and/or complexity of the intelligent agent's behavior to provide a good user experience that may be supported by the channel.

In one embodiment, the intelligent agent (212) connects to various messaging channels through messaging channel APIs. Through these APIs, the intelligent agent (212) receives digital encodings of user inputs, which may include a textual statement from user (202) and a variable amount of user context data (204). Examples of user context data (204) include a user's geographic position, velocity, data network type (cellular or 802.11, metered or open), and so forth. An example of user context data (204) is:

```
{
    UTC Time of Day: 1421712000
    Geo Location: 37.3855,-122.1009
    Previous Search History: coffee nearby, which ones are open now,
    ...
    Saved Preferences:
        { id: c84888440e6d3363,
          name: The Core
          domain: poi.food }
}
``` which includes the current instant time of day in UTC format for a user utterance, user statement, and/or user query, a longitude/latitude pair representing a geographic location associated with the user, a set of historical user statements and/or queries, and a saved preference indicating a preferred "point of interest" for food associated with a business called The Core.

In one embodiment, the intelligent agent (212) additionally has a model of the interaction and display capabilities of the various messaging channels with which it communicates. A messaging channel typically supports one or more of the following: text, formatted text, static images, dynamic images, embedded dynamic elements, or fully interactive dynamic elements. Dynamism may be provided through a proprietary data encoding delivered to a proprietary or other software component on the device, and/or may be implemented using HTML5 technologies including CSS and JavaScript.

In one embodiment, the intelligent agent (212) is used in a voice only environment, for example, a voice enabled speaker, in car assistant, or on person headphones. The intelligent agent (212) may be supported and/or supplemented with a display and/or real estate, and may also be supported only using voice with a microphone/speaker setup.

In one embodiment, the intelligent agent (212) processes a digital representation of a user's textual statement, along with user context data (204), to produce a discourse model (228b). The discourse model (228b) may be processed dynamically according to the capabilities of the client to produce a rendering with better interactivity and fidelity given constraints of the user's environment.

Figure 3A:
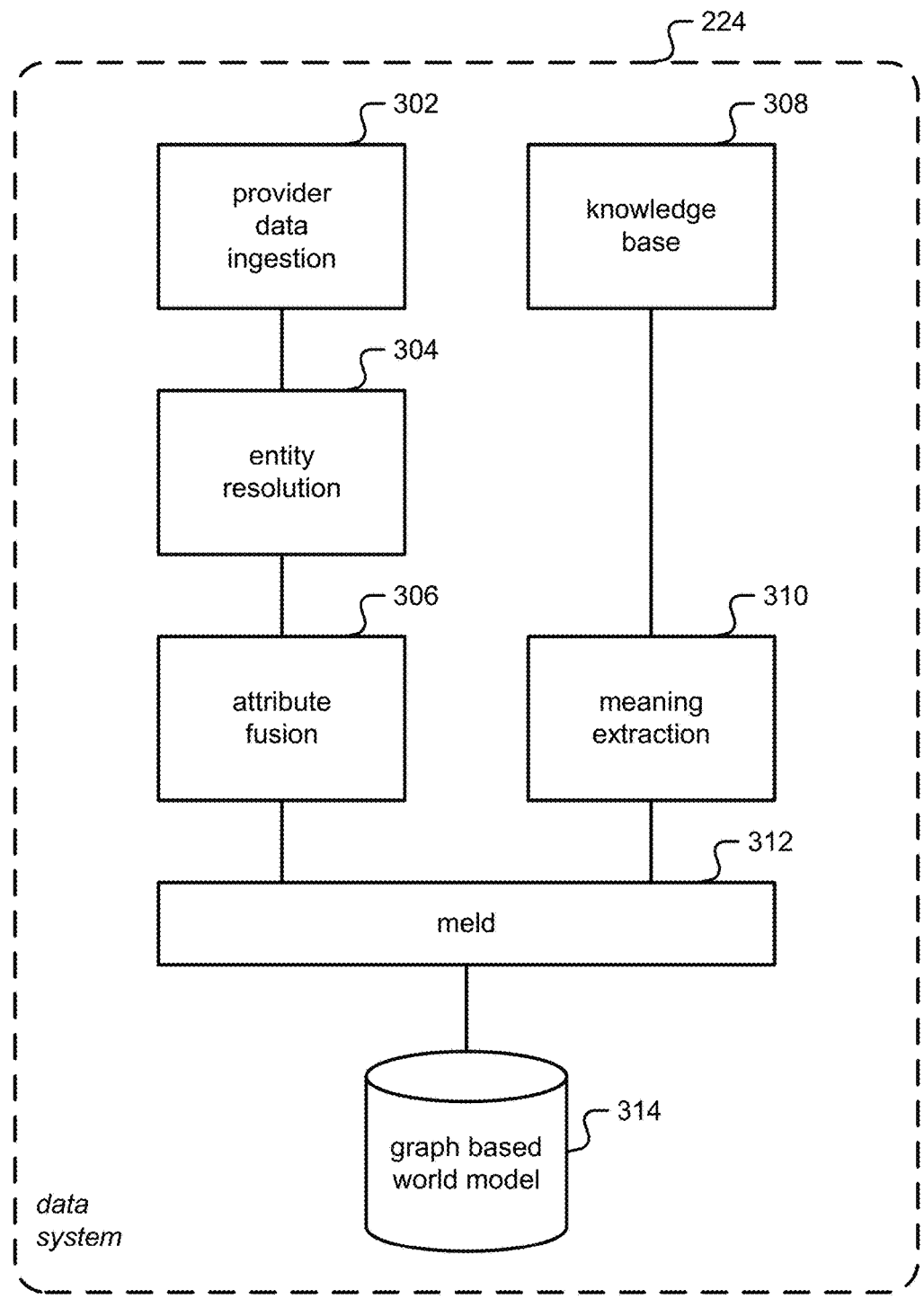
FIG. 3A is a block diagram illustrating an embodiment of a data system.

FIG. 3A is a block diagram illustrating an embodiment of a data system. In one embodiment, the data system of FIG. 3A is represented in FIG. 2 (224).

Within the data system (224) is a system for provider data ingestion (302), for pulling in data and ingesting data from multiple providers, for example as shown with (214, 216,

218). Providers comprise social media services/servers, search engine servers, search and discovery servers, and review servers, for example: Facebook, Google, Foursquare, Yelp, and so on.

Provider data ingestion (302) is coupled to a system for entity resolution (304), to resolve an entity ingested in provider data ingestion (302) uniquely. For example, if a Starbucks coffee shop on a nearby street Main Street is found on Facebook, Google, Foursquare, and Yelp, the resolution allows the system to determine it is the same entity.

A system for attribute fusion (306) is coupled to entity resolution (304) to take uniquely resolved entities and markup the entity with a fusion of the metadata from each of the providers. For example, for the Starbucks coffee shop on Main Street one metadata set "Known for: work friendly, having wifi" from one provider Yelp may be fused with another metadata set "Serves: lattes, mochas, cappuccinos" from another provider Facebook. The provider data ingestion (302), entity resolution (304), and attribute fusion (306) systems collectively provide data services.

Another set of systems provide meaning services. Knowledge base (308) is a system to understand what an entity is. For example, to knowledge base (308), it may determine: Starbucks is a brand; Starbucks is a "Coffee Shop"; and a "Coffee Shop" is an eatery. Knowledge base (308) works with a system for meaning extraction (310) to apply meaning to concepts. For example, meaning extraction (310) may determine that a place being "work friendly" means that place has wifi, lots of tables, and coffee. The set of systems to provide data (302, 304, 306) and the set of systems to provide meaning (308, 310) are melded (312) to provide a graph based model of the world (314), which is the foundation of a virtual 'brain' for the data layer and/or system (224).

Figure 3B:
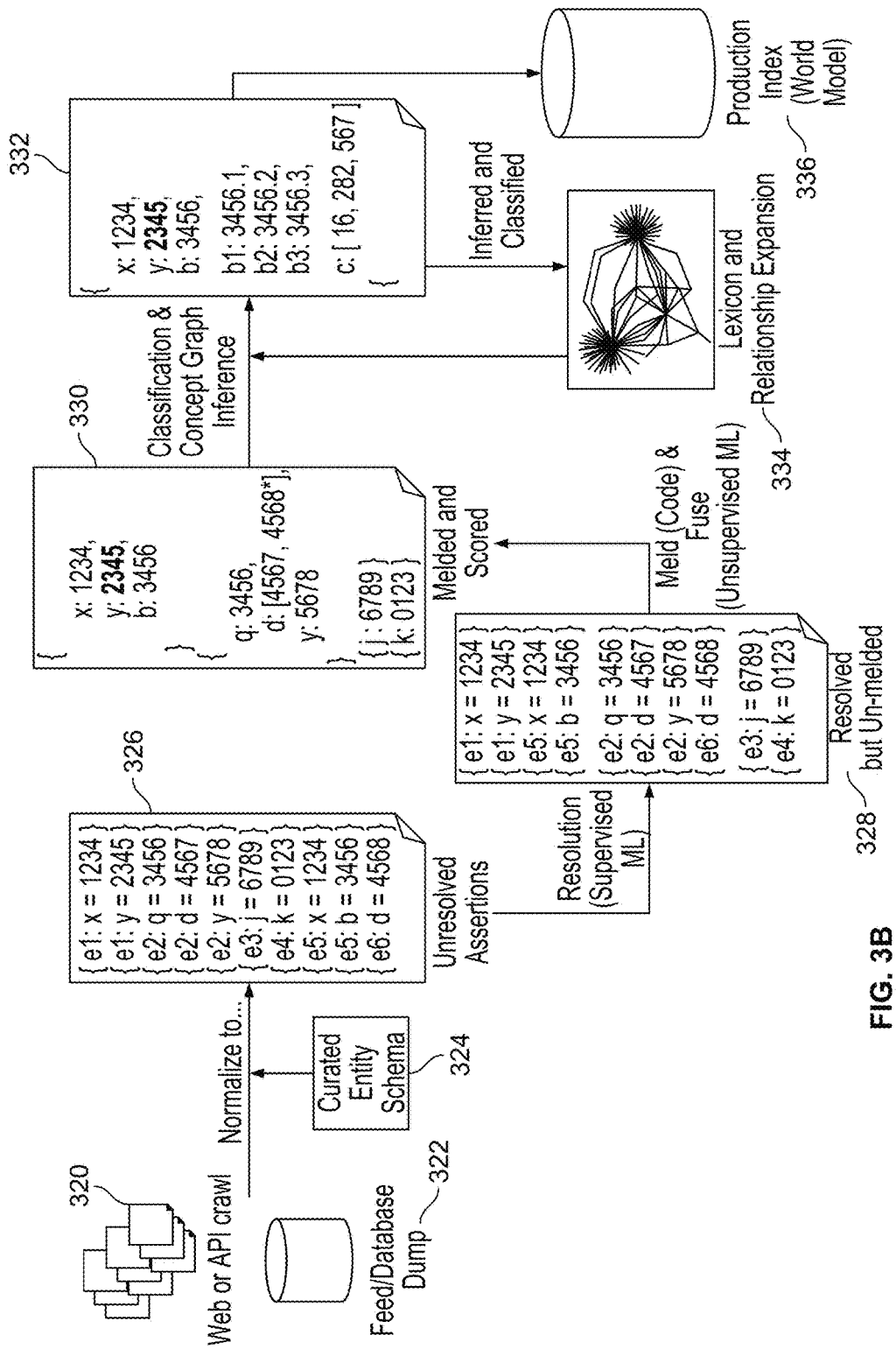
FIG. 3B is a flow diagram illustrating an embodiment of a multi-source probabilistic entity and concept graph.

FIG. 3B is a flow diagram illustrating an embodiment of a multi-source probabilistic entity and concept graph. The entity graph may be probabilistic as it aggregates multiple sources of content, both those based on facts and user modeled assertions about the entity and its related domain. This may result in resolving an entity to one or more physical and/or real world entities. After resolution, the system may then compare any assertions assigned to a physical entity, and to the knowledge available about other things in that domain world, to hold the system accountable and account for variation of attribute assertions. In one embodiment, the concept graph is fused with the entity graph, after a process of inference and relationship expansion, to create a real world index of entities and concepts. In one embodiment, the diagram of FIG. 3B is performed by the data system of FIG. 2 (224).

During data ingestion (302), data from extraction using an API and/or a crawl (320) and data from a feed and/or a database dump (322) is normalized using a curated entity schema (324) to provide a set of unresolved assertions (326). Unresolved assertions (326) are represented in FIG. 3B as entity/metadata pairings, for example for entity e1 the metadata x=1234 and y=2345. Other examples are that: e2 is associated with q=3456, d=4567, and y=5678; and e5 is associated with x=1234 and b=3456, and e6 is associated with d=4568.

Entity resolution (304) uses supervised machine learning (ML) to take the unresolved assertions (326) and produce resolved but un-melded assertions (328). In the example shown in FIG. 3B, for example, both e1 and e5 are associated because they share x=1234. Also, e2 which has d=4567 and e6 which has d=4568 are considered associated because their respective values for d are considered correlated.

Attribute fusion (306) and meld (312) use unsupervised machine learning and algorithmic code, respectively, to take the resolved but un-melded assertions (328) and produce melded and scored entities (330). For example, e1 and e5 are melded to an entity which has the superset of their respective metadata, namely x: 1234, y: 2345, and b: 3456. Similarly, e2 and e6 are melded to an entity which has metadata q: 3456, y: 5678, and d: [4567, 4568*], showing the correlation for that particular metadata d.

Melded and scored entities (330) use classification and concept graph inference to produce and inferred and classified list of entities (332), in part by using lexicon and relationship expansion (334). This in turn is used to populate the production index, or world model (336).

Figure 3C:
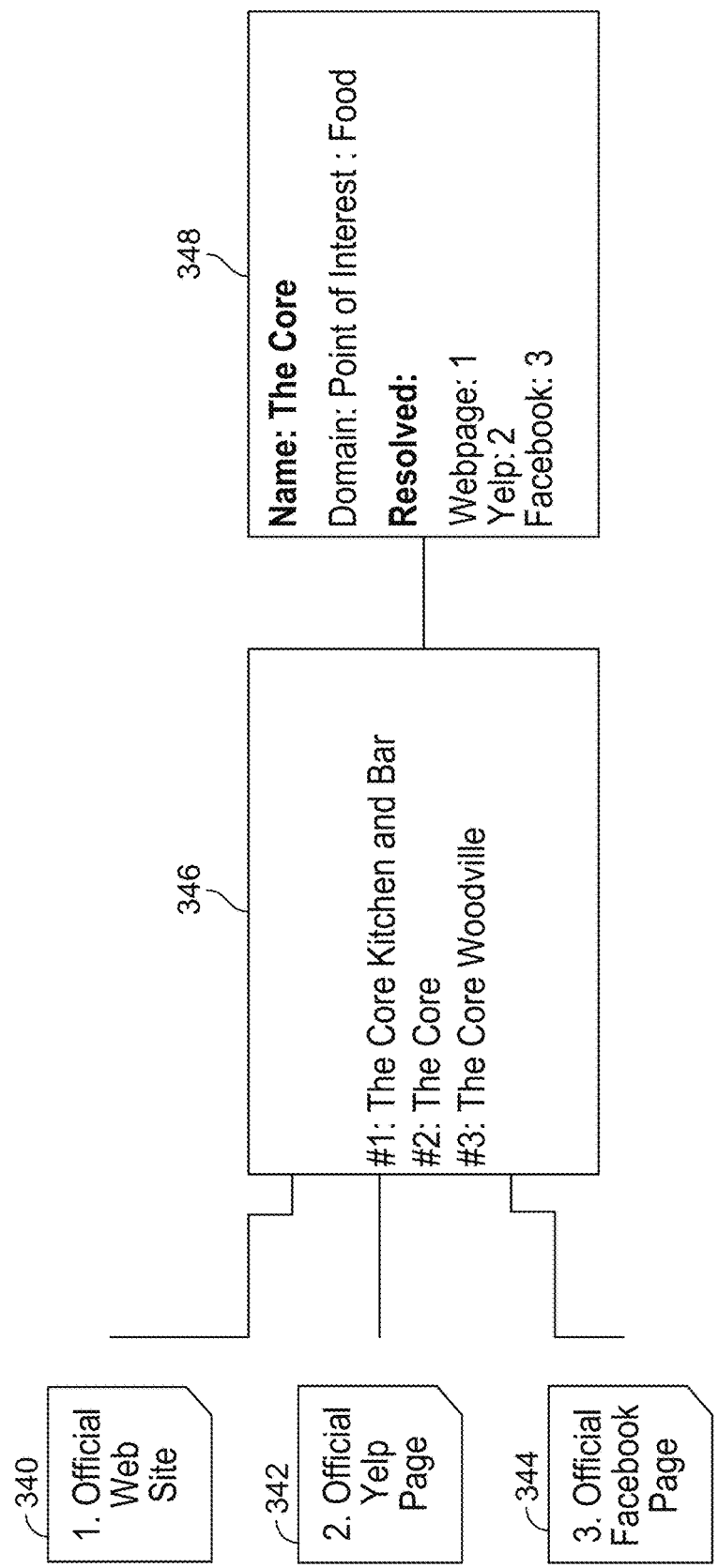
FIG. 3C is a flow diagram illustrating an embodiment of entity resolution and attribute fusion.

FIG. 3C is a flow diagram illustrating an embodiment of entity resolution and attribute fusion. In one embodiment, the diagram of FIG. 3C is performed by the data system of FIG. 2 (224) including FIG. 3 (304, 306). The goal of these systems is to take information from multiple content providers and map them to a single real world and/or physical entity.

In the example shown, The Core is a place of business. It is physically located in Woodville, Ill. A snapshot (340) of their website http://thecorecafe.com is taken, for example by a web crawl and stored, and it contains metadata about this place of business. The official Yelp page (342) also contains metadata about the place of business, and also contains reviews and judgings. The official Facebook page of The Core (344) also contains metadata about the place of business. It also contains comments and/or reviews on the Facebook bulletin board system.

Using deduplication (346) shows The Core entity may have different names for different content providers: for the website (340) it is called "THE CORE KITCHEN AND BAR"; for the official Yelp page (342) it is known as "The Core", and for the official Facebook page (344) it is referred to as "The CORE WOODVILLE". Using entity resolution these are resolved, for example using metadata such as address and/or geo-location, to be the same entity. After deduplication (346), resolution (348) provides a single entity with fused attributes from all three providers. In one embodiment, the flow uses the following steps:

Group similar reference and/or core entities by address;
Remove reference duplicates;
Assign a candidate and/or content entities to reference groups; and
Do a final entity resolution between candidate and reference entities.

Figure 4A:
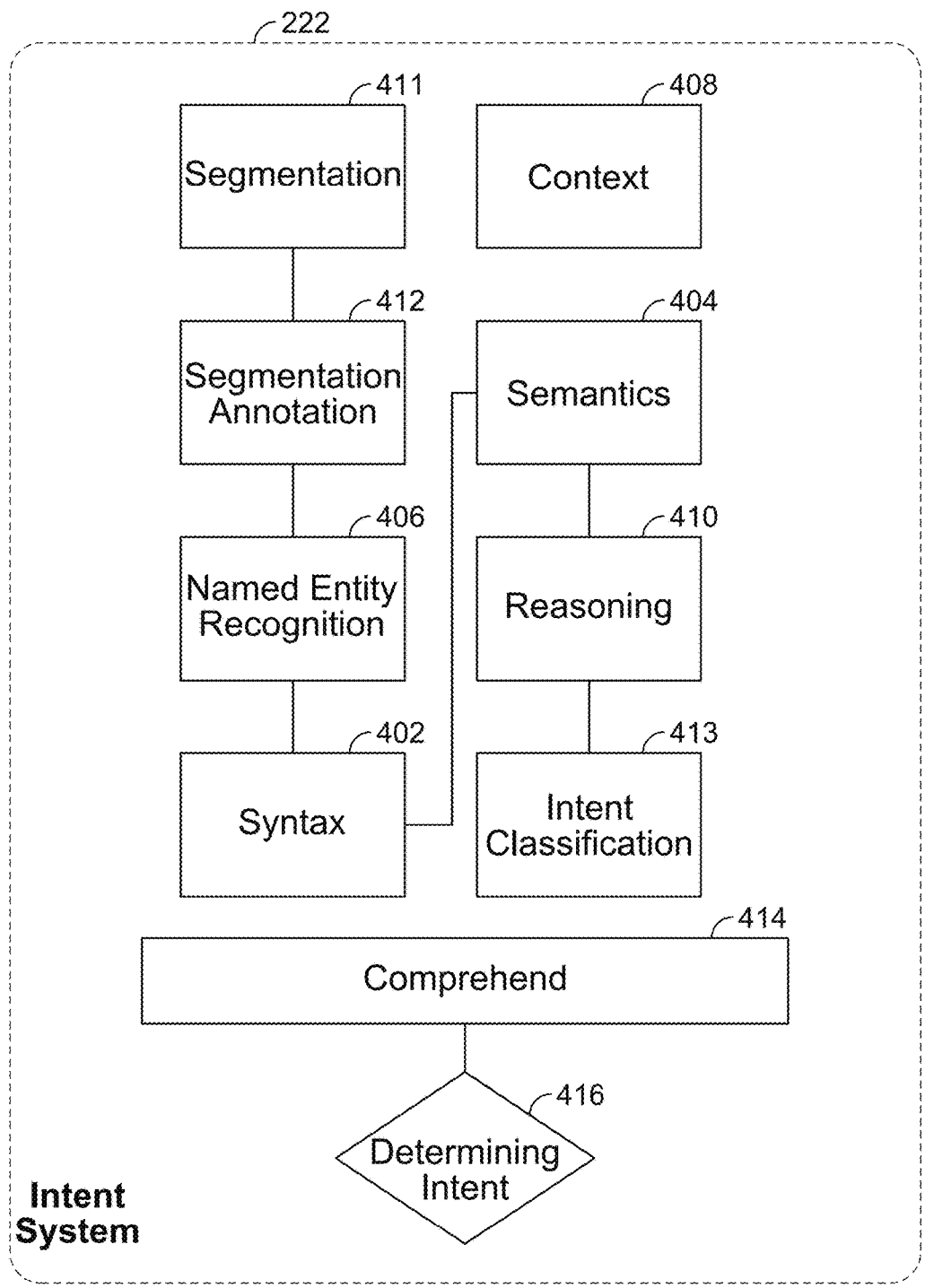
FIG. 4A is a block diagram illustrating an embodiment of an intent system.

FIG. 4A is a block diagram illustrating an embodiment of an intent system. In one embodiment, the intent system of FIG. 4A is represented in FIG. 2 (222) to provide language and understanding to a user utterance, user statement, and/or user query.

Within the intent system (222) may be a system for tokenization and/or segmentation (411), as the process may go through tokenization and then segmentation. In one embodiment, annotations are applied only to the segments, as described below. As an example, "where can I get a pizza?" yields the following spans: "I get", "can", "can I", "can I get a", "I", "where", "get", "get a", "a", "a pizza", "pizza", "?".

Within the intent system (222) may be a system for syntax (402), for processing grammar rules, for example natural language grammar rules. For example, if a user utterance, user statement, and/or user query is "where's a good place to watch the game?", the syntax engine (402) identifies the words "place" and "game" as nouns, identifies "good" as an adjective, identifies "watch" as a verb, and so on.

Within the intent system (222) may be a system for semantics (404), to derive meaning from the structure of the user utterance, user statement, and/or user query. To continue the example, for the user statement "where's a good place to watch the game?" the semantics engine (404) may determine "discover points of interest" as a statement task, and "TV, sports bar, highly rated" as statement attributes.

Within the intent system (222) may be a system for named entity recognition (406), to extract named entities from a user utterance, user statement, and/or user query. For example, if the user utterance includes "Where's the nearest Starbucks?" the named entity recognition engine (406) is responsible for matching the word Starbucks to one or more named entities.

Within the intent system (222) may be a system for context (408), to take a previous session context and user specific features and overlay them onto a current user utterance, user statement, and/or user query. To continue the above example, for the previous user query "Where's a good place to watch the game?", a current user query may be "Something closer?". In this example, the second query carries context from the previous query to determine a new or continuing conversation.

Within the intent system (222) may be a system for reasoning (410), to map a user utterance, user statement, and/or user query to a meaning intent. To continue the above example, for the user utterance "Where's a good place to watch the game?", the reasoning engine (410) is responsible for determining that the user (202) is not asking about a specific facet and/or thing, but rather looking for one or more points of interest that have certain attributes.

As described below, within the intent system (222), other systems may be used (412) for segmentation, segmentation annotation, and/or task classification. In sum, the systems (402-412) are integrated to provide a system for comprehension (414) in the goal of determining intent (416).

In one embodiment, the intent system (222) is modeled around a human comprehension approach. The earliest Sumerian writing consisted of non-phonetic logograms: that is, it was not based on the specific sounds of the Sumerian language which could have been pronounced with entirely different sounds to yield the same meaning in any other language. Humans model the world as concepts imbued with meaning. Historically language and subsequently writing was invented to enable humans to communicate meaning-loaded concepts with each other. The brain may then be able to decode the elements that carry meaning, whether from sound and/or spoken language, or symbols and/or writing. Likewise, the brain may reverse the process, encoding a series of ideas into speech or text.

While humans do this encoding and decoding of meaning effortlessly, the complexity of this entire process is not readily understood or available. It is said inventing writing is such a hard process that it is believed to independently have been invented only twice in human history. Modeling this machinery in an effective manner allows training machines to work with natural language.

Figure 4B:
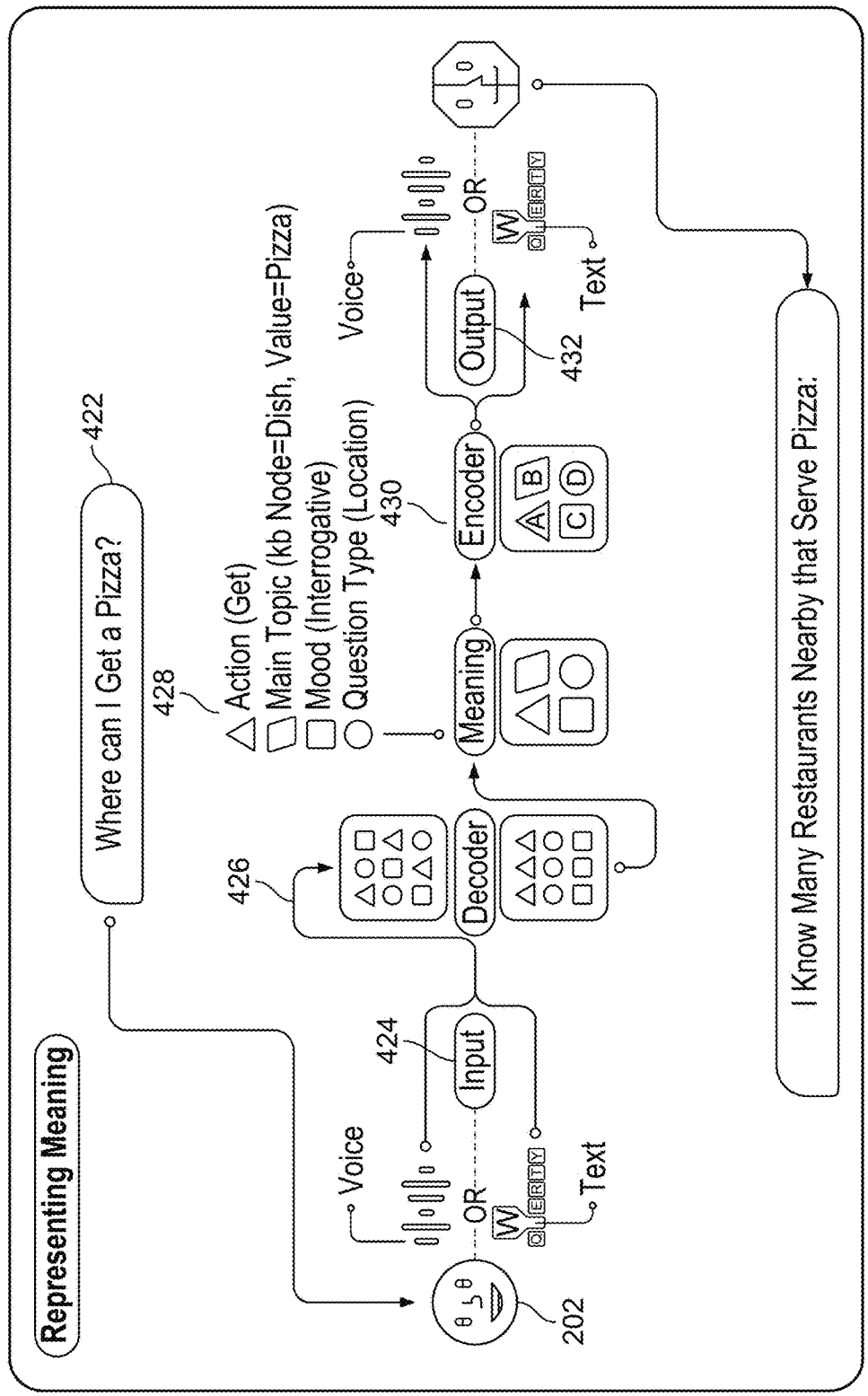
FIG. 4B is an illustration of an overview for representing meaning.

Representing meaning. The following example illustrates how a machine could understand natural language and extract an abstract representation of meaning for enhanced search. FIG. 4B is an illustration of an overview for representing meaning. In one embodiment, the illustration of FIG. 4B outlines a possible flow for the enhanced search and/or intelligent agent of FIG. 2 (212).

User (202) either utters or writes "Where can I get a pizza?" (422) as gathered input (424). The spoken or textual input (424) enters a decoder (426), where input is processed through multiple steps to extract a representation that the machine may understand. This entire process is called Comprehension (402-414). The output of this decoding process is a Meaning (428). The user intent for an action, represented by triangles in FIG. 4B, has been decoded to be "get". The user intent for a main topic, represented by parallelograms in FIG. 4B, have been decoded to be "kb node=dish, value=pizza". The user intent for a mood, represented by squares in FIG. 4B, has been decoded to be "interrogative". The user intent for a question type, represented by circles in FIG. 4B, has been decoded to be a "location".

The meaning object (428) is consumed first by the execution engine (not shown) and subsequently by an encoder (430). The encoder, also termed "Language Synthesis", is where a response output (432) is constructed, either by voice or in text, based on the extracted meaning and the results of the execution engine. In the example of FIG. 4B, the intelligent agent (212) replies "I know many restaurants nearby that serve pizza:" and proceeds to list them.

Breaking down comprehension. Decoding input to extract meaning, or Comprehension as shown in FIG. 4A, generally uses logical forms and abstract meaning representation (AMR). In one embodiment, to make comprehension efficient and/or focused a fully specified "meaning representation" that is able to condense all aspects of natural language into meaning trees is not required, but instead focus is put on areas that are relevant to specific domains and product capabilities. This enhances search within a target domain over an all-purpose chatbot, permitting simpler elements of meaning representation that build incrementally with more complex elements of natural language as needed.

In one embodiment, two methods are used:
Modeling "concepts", wherein concepts are semantic units of meaning that may be understood. Within each target domain, like food or movies, there are concepts that help put utterances into context. Within the food domain, cuisine and food preferences are examples of concepts that the intelligent agent (212) is designed to be conversant in; and
Modeling "actions", which cover a range from modeling type of questions to a granular understanding of actual verb actions. Some examples comprise: a command, for example "do something", "get something", and so forth; an interrogative, for example asking about entities or their attributes; and statements, for example expressing preferences, greetings, salutations and so forth.

Semantic understanding. In one embodiment, the comprehension component is a movement from syntactic to semantic elements. As the utterance passes through a comprehension pipeline increasingly detailed semantic elements may be extracted.

Returning to the example of a user input: "where can I get a pizza?", the user input is a raw run of text that may be acquired from a text interface or transliterated from voice to text.

Syntactic parse. As described earlier, a syntactic parse (402) maps raw bytes of user input to a digital representation of low-level parts of human natural language and may be a first step for an intent system (222). In one embodiment, the syntactic parse (402) comprises a segmentation (411), segmentation annotation (412), and/or speech tagger system. Various systems, derived using algorithmic and statistical processes, may be employed by the parser to perform this parse, including one or more of the following:

Normalization of encoding variations in digital text;
Recognition of underlying terms despite intentional and unintentional variations in spelling and morphology, including spelling errors, alternative spellings, abbreviations and shortcuts, emoji;
Detection of non-textual data encoded in text; this could include numerics such as "one", dates such as "Tues. 16", or other types of data;
Labelling of parts of speech according to a model of human natural language. In this phase, terms might be labeled as Adjective, Noun, Preposition, etc. They might also be tagged into larger groups representing conjugations and declensions, annotated with their grammatical role as shown in FIG. 4D; and
Detection of spans in the input text.

In one embodiment, the syntactic parse considers multiple incompatible segmentations and parses of the data. For example, the string "Chelsea" may be tagged as both a "Place/Locality" (in Massachusetts) and a "Place/Neighborhood" (in New York City).

Figure 4C:
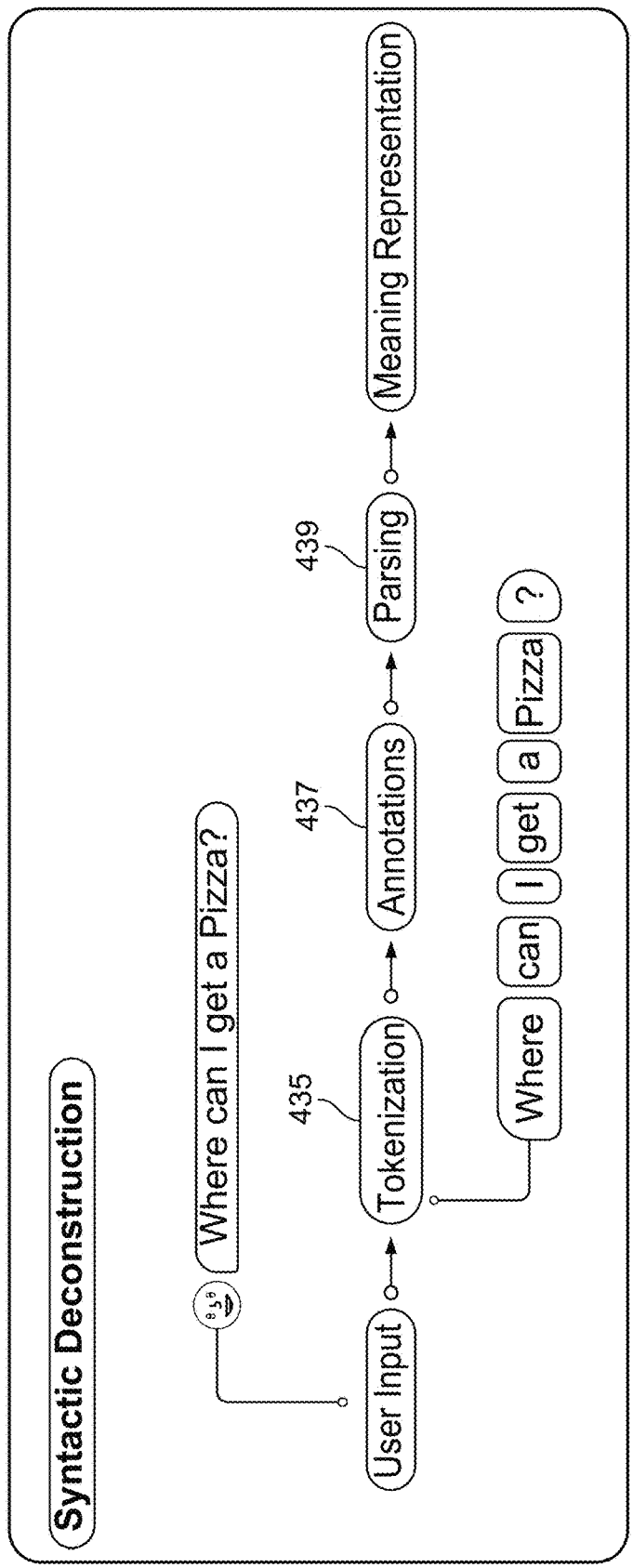
FIG. 4C is an illustration of an overview for syntactic deconstruction.
Figure 4D:
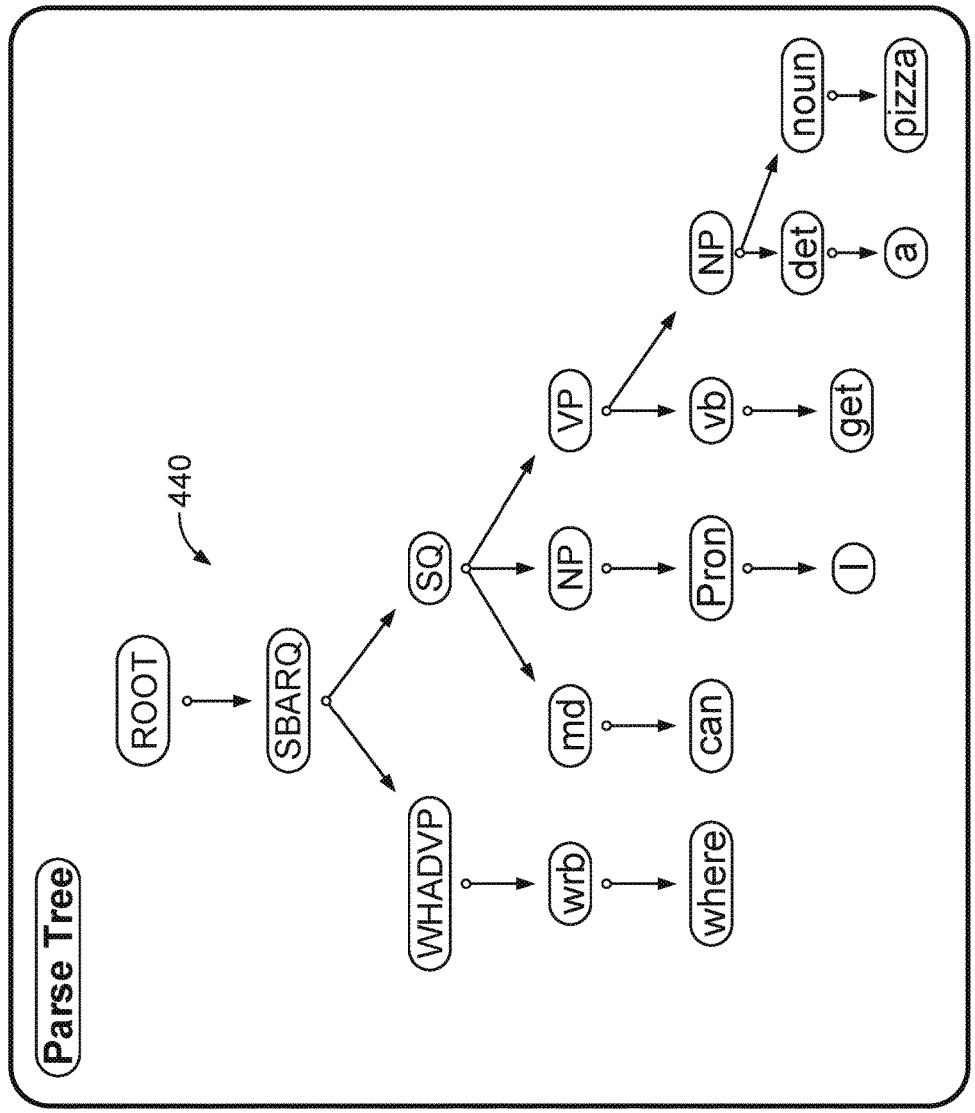
FIG. 4D is an illustration of a result from a constituency parse.

FIG. 4C is an illustration of an overview for syntactic deconstruction. In one embodiment, the illustration of FIG. 4C outlines a possible flow for tokenization/segmentation (411) and segmentation annotations (412) in FIG. 4A.

In one embodiment, a tokenization framework is used to get a set of tokens or words. For example, tokenization of "where can I get a pizza?" is shown in FIG. 4C to break up (435) the user input to the tokens "where", "can", "I", "get", "a", "pizza", and "?". In an annotations phase (437) the comprehension engine (414) attaches rich metadata to tokens generated from the previous step (435).

Metadata attached to segments of the original utterance and/or token spans provide richer signal for various processing downstream. A span is a run of one or more terms that represent a discrete concept from the perspective of the user uttering/stating it, but which may have additional data associated with it, for example a domain and a probability. For example, the three words "New York City" might be tagged as a single "Place/Locality" with a confidence of 97%. The two of the most important pieces of metadata attached are parts-of-speech (PoS) tags and categorical or named entity recognition (NER) tags. In one embodiment, a proprietary PoS tagger trained specifically on utterance structures are carefully tuned to utterances in target domains and product experience. This allows creation of a PoS tagger which has very high accuracy for utterances of interest and does better with more general language input.

For example, using segmentation annotation (412), a list of annotation labels generated below is a small subset of the entire universe of labels but working over multiple token spans:

[0,5] 'where':
   s:322.3429   [pos: WRB]   (322.342911) [0,5]
. . .
[6,9] 'can':
   s:322.3429   [pos: MD]   (322.342911) [6,9]
. . .
[6,17] 'can I get a':
   s: 0.2157   [named-entity article]   [ns:0.215711 s:371.125977 idf:0.814669 article]
[10,11] 'I':
   s:322.3429   [pos: PRP]   (322.342911) [10,11]
. . .

-continued

[10,15] 'I get':
   s: 1.0000   [skippable]
[12,15] 'get':
   s:322.3429   [pos: VB]   (322.342911) [12,15]
. . .
[12,17] 'get a':
   s: 1.0000   [skippable]
[16,17] 'a':
   s:322.3429   [pos: DT]   (322.342911) [16,17]
. . .
[18,23] 'pizza':
   s:322.3429   [pos: NN]   (322.342911) [18,23]
   s: 1.0000   [categ meta:dish]   dish:pizza (penalty=0.000000 skips= [ ] base=1.000000)
   s: 0.5000   [named-entity poi.food]   [ns:1.000000 s:3123204352.000000 idf:0.264108 poi.food]
   s: 0.3675   [named-entity video.movie]
. . .

In one embodiment, a Parser (439) then builds a Constituency Parse that uses the PoS tags generated by a focused PoS tagger (437). This Constituency Parser (439) is trained on a corpus which in one embodiment is similar to the PoS tagger training data. This approach allows targeting of a single training set for multiple components in the comprehension pipeline. In one embodiment, tooling is created, wherein such tooling efficiently collects consistent judgements from uniform training sets of utterance for various trainable components in a comprehension stack.

In one embodiment, a focus on a particular product experience by targeting areas in language comprehension improves the chance all components in the comprehension stack are trained and tested towards the same targets.

Semantic and grammatical parse. The syntactic parse output (402) is subjected to a semantic and grammatical parse (404) in a second step. In one embodiment, this step comprises the Meaning Representation and/or Constituency Parse (439) step of FIG. 4C. In this phase, a database of rules may be applied to the syntactic parse output to construct more powerful interpretations of the data. This rule database has access to all of the data produced by the syntactic parse (402), as well as the user context state (204, 228a) and discourse state (228b). Rules in this layer may derive one or more of the following:

Adjectival filters such as "new" or "good";
Categorical filters derived from a lexicon such as "Mexican", "Italian", and "comedy";
A prepositional relationship between entities such as "in New York" or "near the train station";
Inference of a target domain based on provided attributes, for example a cuisine in a city is likely a request for restaurants;
Grammatical relationships between parts of the input and the implications of these relationships. For example, the speech labels for interrogative, modal-verb, first-person-pronoun, and verb may be combined to identify a common question-creation pattern, for example "where can I get"; and
The concepts and objects that have been previous evoked into the conversation, as modeled by the discourse state (228b).

FIG. 4D is an illustration of a result from a constituency parse. In one embodiment, the illustration of FIG. 4D is the result from the parser (439) in FIG. 4C. In one embodiment, a PoS structure is used, for example a treebank and/or parsed (text) corpus as shown in FIG. 4D (440), using bracket labels such as:

Clause Level
- S—simple declarative clause, i.e. one that is not introduced by a (possible empty) subordinating conjunction or a wh-word and that does not exhibit subject-verb inversion.
- SBAR—Clause introduced by a (possibly empty) subordinating conjunction.
- SBARQ—Direct question introduced by a wh-word or a wh-phrase. Indirect questions and relative clauses should be bracketed as SBAR, not SBARQ.
- SINV—Inverted declarative sentence, i.e. one in which the subject follows the tensed verb or modal.
- SQ—Inverted yes/no question, or main clause of a wh-question, following the wh-phrase in SBARQ.

Phrase Level
- ADJP—Adjective Phrase.
- ADVP—Adverb Phrase.
- CONJP—Conjunction Phrase.
- FRAG—Fragment.
- INTJ—Interjection. Corresponds approximately to the part-of-speech tag UH.
- LST—List marker. Includes surrounding punctuation.
- NAC—Not a Constituent; used to show the scope of certain prenominal modifiers within an NP.
- NP—Noun Phrase.
- NX—Used within certain complex NPs to mark the head of the NP. Corresponds very roughly to N-bar level but used quite differently.
- PP—Prepositional Phrase.
- PRN—Parenthetical.
- PRT—Particle. Category for words that should be tagged RP.
- QP—Quantifier Phrase (i.e. complex measure/amount phrase); used within NP.
- RRC—Reduced Relative Clause.
- UCP—Unlike Coordinated Phrase.
- VP—Vereb Phrase.
- WHADJP—Wh-adjective Phrase. Adjectival phrase containing a wh-adverb, as in how hot.
- WHAVP—Wh-adverb Phrase. Introduces a clause with an NP gap. May be null (containing the 0 complementizer) or lexical, containing a wh-adverb such as how or why.
- WHNP—Wh-noun Phrase. Introduces a clause with an NP gap. May be null (containing the 0 complementizer) or lexical, containing some wh-word, e.g. who, which book, whose daughter, none of which, or how many leopards.
- WHPP—Wh-prepositional Phrase. Prepositional phrase containing a wh-noun phrase (such as of which or by whose authority) that either introduces a PP gap or is contained by a WHNP.
- X—Unknown, uncertain, or unbracketable. X is often used for bracketing typos and in bracketing the . . . the-constructions.

Word Level
- CC—Coordinating conjunction
- CD—Cardinal number
- DT or det—Determiner
- EX—Existential there
- FW—Foreign word
- IN—Preposition or subordinating conjunction
- JJ—Adjective
- JJR—Adjective, comparative
- JJS—Adjective, superlative
- LS—List item marker
- MD—Modal
- Noun or NN—Noun, singular or mass
- NNS—Noun, plural
- NNP—Proper noun, singular
- NNPS—Proper noun, plural
- PDT—Predeterminer
- POS—Possessive ending
- Pron or PRP—Personal pronoun
- PRP$—Possessive pronoun (prolog version PRP-S)
- RB—Adverb
- RBR—Adverb, comparative
- RBS—Adverb, superlative
- RP—Particle
- SYM—Symbol
- TO—to
- UH—Interjection
- VB—Verb, base form
- VBD—Verb, past tense
- VBG—Verb, gerund or present participle
- VBN—Verb, past participle
- VBP—Verb, non-3rd person singular present
- VBZ—Verb, 3rd person singular present
- WDT—Wh-determiner
- WP—Wh-pronoun
- WP$—Possessive wh-pronoun (prolog version WP-S)
- WRB—Wh-adverb Following a Constituency Parse a complete syntactic representation of the input utterance/statement/query results which captures both the syntactic units and/or PoS tags, and the relationships between those elements and/or constituent structure. In one embodiment, the intelligent agent (212) combines this syntactic structure with a semantic Bag of Information, where bag in this context means a listing of bag items picked invariant to sequence order, to generate a coarse grained Meaning Representation. The Meaning Representation tree may be represented as a semantically-denoted Predicate-Argument data structure.

Figure 4E:
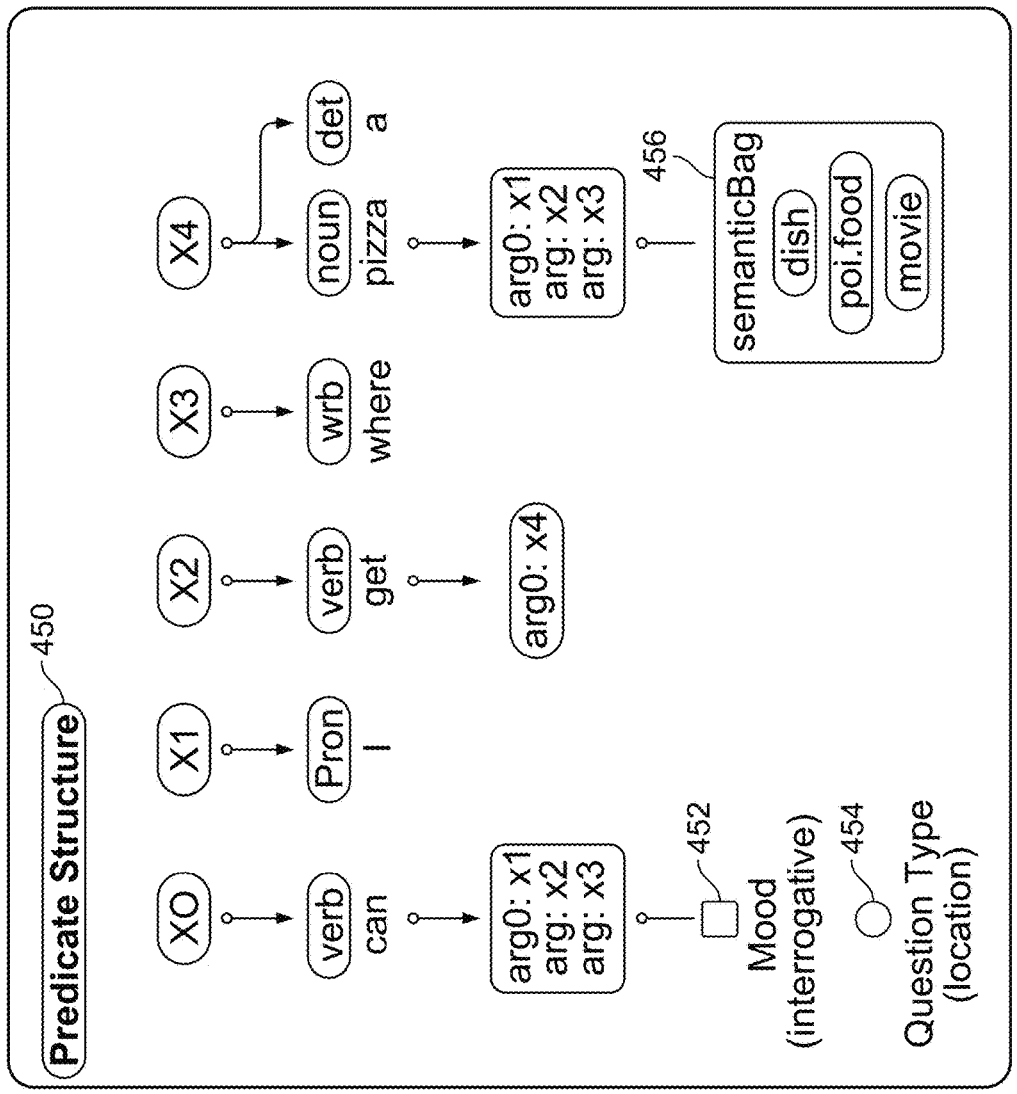
FIG. 4E is an example of a predicate-argument data structure.

FIG. 4E is an example of a predicate-argument data structure. In one embodiment, the data structure (450) has a basis in a predicate-argument structure in linguistics but differs for the purposes of the target domains. The Mood (452), Question Type (454) and semanticBag (456) in FIG. 4E are inferred both from syntactic structure and semantic annotations that may be extracted from parts of the user utterance/statement/query. The Predicate-Argument data structure (450) is termed a Meaning Representation artifact that the comprehension engine (414) produces.

In one embodiment, processing a user utterance/statement/query via the comprehension stack and generating this Meaning Representation artifact converts a natural language utterance to an abstraction that is machine-readable, machine-understandable and/or machine-parsable. At this level of abstraction, it may be possible to:
- extract the grammatical structure, for example the predicate argument structure;
- infer coarse form, for example whether it is a statement, question, command, and so forth; and/or
- attach bags of semantic information to the appropriate parts of the structure.

In one embodiment, a consumer of the Meaning Representation is an Intent Classification system (412). An intent classifier may convert the Meaning Representation to a set of features which it matches against a set of tasks registered with the system at startup time.

In one embodiment, being able to convert any input utterance/statement, perhaps even in different languages, into a Meaning Representation permits the intent classifier to be language independent. This abstraction allows the remainder of the system to deal with a machine compiled representation of the input, with the advantage for developing software that may work with varied inputs. Analogous to the Sumerian logograms, concepts may be processed independent of their original encoding.

In one embodiment, the semantic parse considers hundreds of thousands of rules, employing a Viterbi search algorithm with domain pruning to reduce the size of the search space. At its completion, it produces a list of interpretations. In one embodiment, each of these interpretations is assigned a score according to a mathematical combination of factors derived from the rules that were matched to create it, the spans that were consumed in producing it, and quality of other semantic rules that combined to produce the final interpretation. The resulting list is sorted by score, and the system (404) considers the highest-scoring implementations. In one embodiment, an interpretation consists of a grammatical tree representing the understanding of the statement, where each node is tagged with its syntactic, grammatical, and semantic role.

In one embodiment, the final interpretation may have a combination of pragmatic and phatic elements. The term "phatic elements" refers to elements of text/words that have social or conventional function, rather than identifying properties of the topic under conversation. The semantic parser (404) extracts phatic elements and normalizes them, for example so that "could you help me locate a . . . " is parsed as a "inquiry, possibility, find" statement, while "get me . . . " is parsed as "imperative command, acquire".

In one embodiment, if an interpretation that corresponds to a concrete user intent is derived through this process, the interpretation is converted into a machine readable query by an algorithm that resolves each unbound concept in the statement by binding it to a search or an object or objects from the conversation state, and uses a search engine to identify the most likely matches for those bindings given the user's context. Interpretations which do not give rise to reasonable outputs are discarded, and the remaining interpretations, with their likely answers, are provided to the intelligent agent for rendering as graphical elements or natural language.

If, on the other hand, the interpretation is not found to correspond to a concrete user intent, the interpretation is submitted as input to an intent refinement system which identifies the most likely counter-offers that may be presented to the user (202) to move the conversation in a satisfactory direction.

In one embodiment, user intent ambiguity may be detected. For example, the system may determine two or more possible interpretations of a user's intent. In one embodiment, a knowledge base may be used to pose to the user a follow up question to resolve the ambiguity. In one embodiment, user history, for example prior queries or results selected in response to prior queries, and/or other context information for example geo-location, may be used to resolve the ambiguity. In one embodiment, a user (202) may be prompted to respond to a question specifically tailored to resolve the ambiguity.

While determining user intent, the interpretation system may encounter inputs which are compatible with more than one interpretation. In one embodiment, the system automatically resolves ambiguities without further user input. In cases where an ambiguity cannot be resolved without further input, the system may be configured to ask for assistance from the user, for example by asking "Are you looking for an X or a Y?".

Thus, an ambiguity may be any situation which arises when a user's input gives rise to more than one interpretation. In one embodiment, multiple interpretations may be resolved by one or more of the following:

Ranking interpretations according to a confidence score, for example a confidence scored derived from a statistical rule base, and/or a probabilistic classifier of user inputs;

Converting each interpretation to a machine-readable query, and executing the query against a search engine to derive a score for the interpretation, constructed in such a way that the score is improved for meanings and results which are judged to be likely for the user's context, wherein:

Scoring of these results may encompass multiple algorithms, combining statistical signals derived from surveillance of the Internet, geographic calculations based on the user's current position and velocity (204), and scoring factors derived from the user's profile and history (228a); and For example, in resolving "near the train station", a search for places of type "railstation" is performed against a geographic database, and the resulting list of rail stations is scored according to the above metrics, yielding a ranked list of likely train stations;

Determining whether the remaining interpretations represent a distinction without a difference. That is, whether the results they would present to the user (202) are similar enough that asking the user to clarify would unnecessary. In a simple case, this would simply detect that two interpretations give rise to identical answers. For example, "national park near Golden Gate" could reasonably be interpreted to refer to "The Golden Gate Bridge" or "The Golden Gate", a natural landmark. In both cases, the set of national parks close to the interpretation is identical, and asking the user to clarify is unnecessary; and The ambiguous interpretations which remain may be automatically classified according to the type of ambiguity they represent. For example, they may be ambiguous in:

domain—referring to different classes of nouns; for example a "Taylor Swift show" may refer to a live musical performance (domain: event), a television program (domain: TV), or a film (domain: movie);

meaning—when part of the statement cannot be definitively assigned a semantic role; for example a "Tom Hanks movie" could be referring to a movie performed by Tom Hanks (domain: movie, attribute: actor), directed by Tom Hanks (domain: movie, attribute: director), and/or written by Tom Hanks (domain: movie, attribute: screenplay author); and subject—when a reference in the statement cannot be precisely attached to a referent; for example in "coffee near the airport" (domain: poi.food, facet: airport.unknown), it may be unclear which airport is most relevant to the user.

In one embodiment, an intelligent agent (212) resolves these ambiguities by considering various strategies and choosing one that is judged automatically to be most likely to resolve the ambiguity correctly. Once the ambiguity is resolved, the interpretation determined to reflect the user's intent is converted to a query plan, which is then executed to determine and return a set of results.

Depending on the type of ambiguity, a clarifying question may be constructed and presented to the user:

In the case of a domain ambiguity, unless the result set is considered small, in which case it is presented to the user in total, the domains of objects which satisfy the one or more queries are identified and provided to a question synthesis system, for example "live performances", "television shows" and/or "movies";

In the case of a meaning ambiguity, a canonical prepositional phrase is constructed for the candidate answers, for example "performed by," "directed by," and/or "written by"; and In the case of a subject ambiguity, the most likely candidates are identified, and obvious commonalities among their names are elided/omitted, for example in the airport scenario, "San Francisco", "San Jose", and/or "Oakland".

In one embodiment, a natural language synthesis component (226) is then responsible for combining the comprehended portion of the query with any clarifying properties, for example provided in response to a clarifying question, to synthesize an appropriate rendering of result information for the user's channel, where it may:

Synthesize a natural language question, that is "Which 'airport' did you mean, San Francisco, Oakland, or San Jose?";

Synthesize a question fragment and encode interactive elements, that is Which 'airport' did you mean?"<button: San Francisco> <button: Oakland> <button: San Jose>; and/or Render a result for the most likely referent but provide opportunities for clarification, that is "Here's coffee near San Francisco airport. <result list> <button: "I meant Oakland"> <button: "I meant San Jose">

In one embodiment, a rich signal collection framework is used to facilitate the interpretation of user queries. The rich signal collection framework may collect rich signals in the form of annotations coupled with a complex textual spans resolution data structure. This framework may facilitate the extraction of rich signals which are used by the syntactic parser (402), semantic meaning generator (404), and machine learning components (406-414) used to interpret queries, for example to determine user intent.

In one embodiment, a textual representation of the message is processed by a signal collection framework, which applies a series of knowledge extracting annotators. The annotators may extract knowledge using one or more of the following:
domain specific knowledge extracted from content;
knowledge extracted from a concept graph;
domain dependent linguistic knowledge; and/or
language specific grammatical knowledge.

In one embodiment, these extracted signals are all compiled in a data structure that has the ability to reason about spans of text and annotations attached with the spans. These textual spans enriched with signals from annotations are then used by components in the query understanding system, for example: the syntactic parser (402) that uses a rule based system augmented with span & annotations; semantic system (404) which extracts the meaning from the message to produce a user intent; and/or machine learning algorithm (406-414) that generates features using the signals from the framework to build domain specific models.

FIGS. 5A-5D illustrate examples of resolving ambiguity. In FIGS. 5A-5D, screenshots are given of an intelligent agent (212) conversing in natural language with a user (202, 204) on a mobile phone (206a) with a portrait aspect ratio.

As will be described below, the examples show the intelligent agent (212) using a chat interface with the user (202), for reasons including:
intuitive and/or natural for mobile applications;
a comfortable conversational style such that text-to-voice conversion is easy and may be used for other systems for example in-car systems (206); and/or
may interwork in apps and frameworks such as Slack and Facebook Messenger.

Figure 5A:
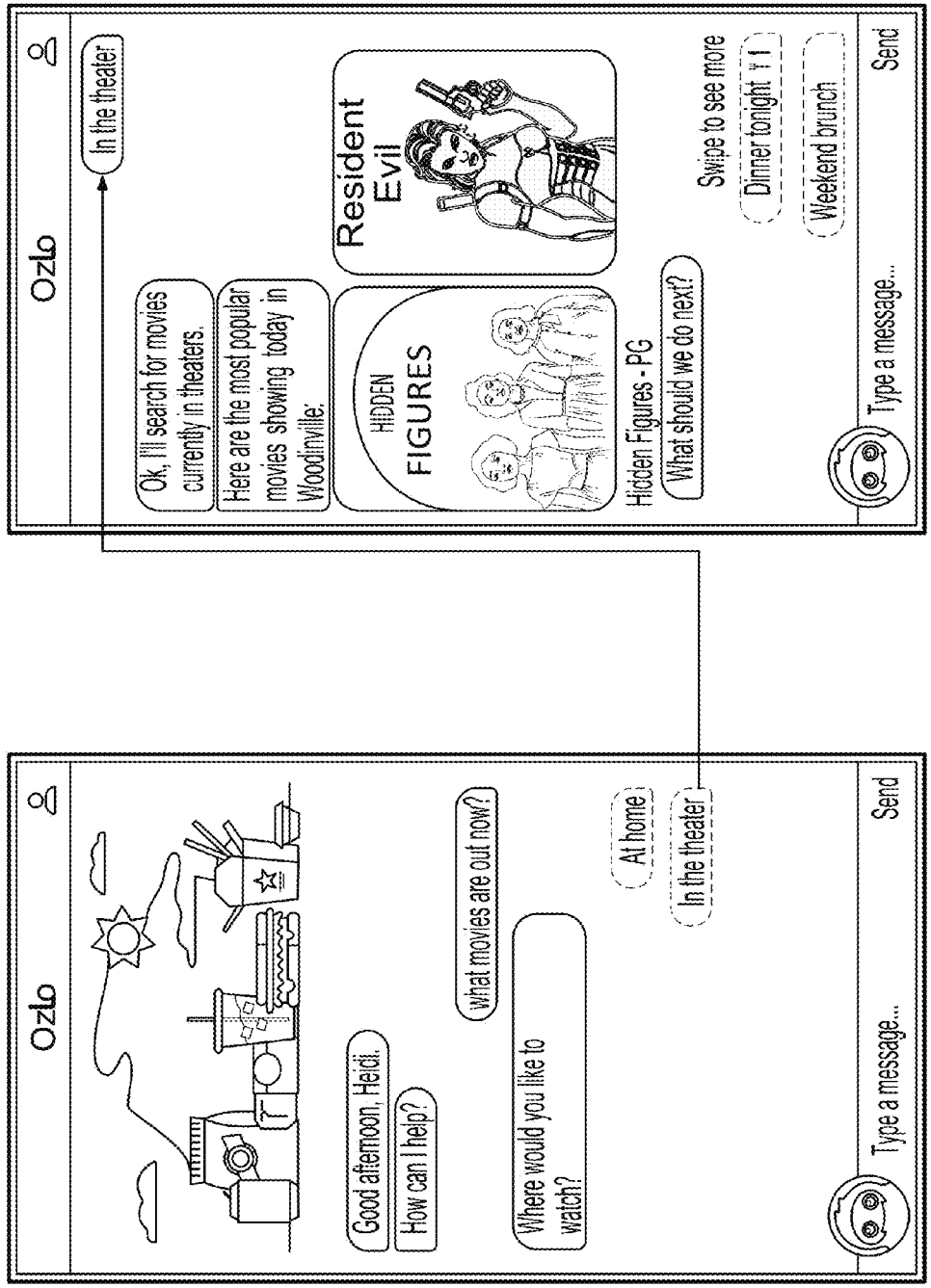

FIG. 5A represents a user query "what movies are out now?" The ambiguity lies in that disambiguation is required between what type of movie experience the user would prefer, for example a theatre experience and an at-home experience. The dialog generated by the intelligent agent (212) in FIG. 5A demonstrates an ability to disambiguate across two tasks: Discover media:movie:theater and Discover media:movie:home.

In FIG. 5A, the dialog between "A>", the intelligent agent (212) and "U>" the user (202) is as follows:
A> How can I help?
U> what movies are out now?
A> Where would like to watch?
A> [displays: At home button; and In the theatre button]
U> [selects In the theatre button]
A> Ok, I'll search for movies currently in theatres.
A> Here are the most popular movies showing today in Woodville:
A> [displays carousel of theatre movie cards, left-most movie of highest priority]

FIG. 5B represents a user statement "Vegan soup." The ambiguity lies in that disambiguation is required between what type of food experience the user would prefer, for example a recipe for cooking vegan soup at home and a restaurant carrying vegan soup. The dialog generated by the intelligent agent (212) in FIG. 5B demonstrates an ability to disambiguate across two tasks: Discover recipe:dish:vegan soup and Discover poi.food:dish:vegan soup.

In FIG. 5B, the dialog between "A>", the intelligent agent (212) and "U>" the user (202) is as follows:
A> How can I help?
U> Vegan soup
A> I know some vegan soup recipes:
A> [displays carousel of vegan soup recipes, left-most recipe of highest priority]
A> [displays buttons including No, I was looking for restaurants button]
U> [selects No, I was looking for restaurants button]
A> I know a lot of restaurants nearby that serve soup and have vegan options:
A> [displays carousel of restaurants, left-most recipe of highest priority]
A> [displays buttons including Which ones are open now? button and Show on a map button]

Figure 5C:
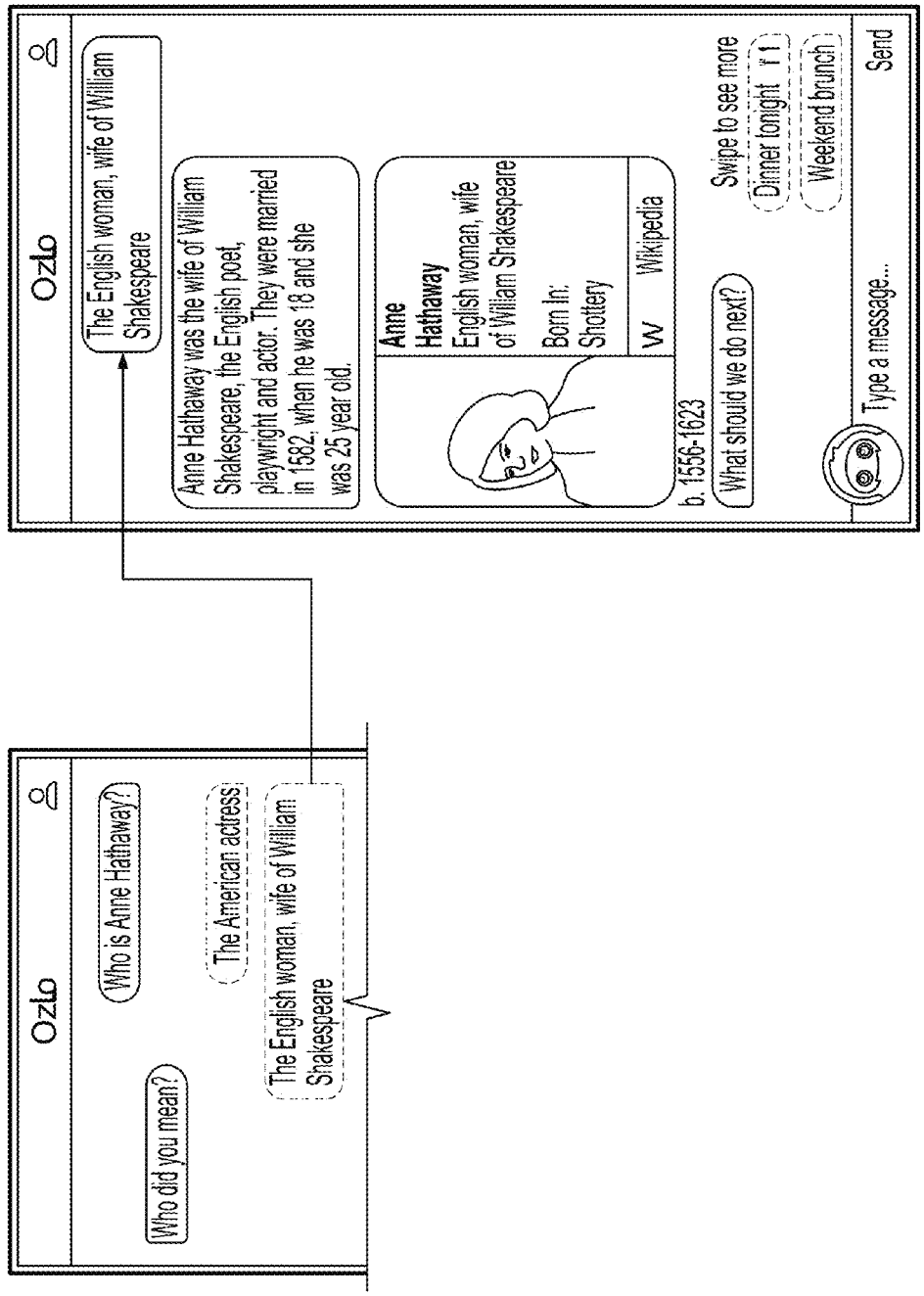

FIG. 5C represents a user statement "Who is Anne Hathaway?" The ambiguity lies in that disambiguation is required to determine whether the user (202) is asking about one of two persons of interest: the English Anne Hathaway from the $16^{th}$ century or the modern American actress Anne Hathaway. The dialog generated by the intelligent agent (212) in FIG. 5C demonstrates an ability to disambiguate within a task of Answer/Inspect person:Anne Hathaway.

In FIG. 5C, the dialog between "A>", the intelligent agent (212) and "U>" the user (202) is as follows:
U> Who is Anne Hathaway?
A> Who did you mean?

A> [displays buttons including The English woman, wife of William Shakespeare button, and The American actress button]

U> [selects The English woman, wife of William Shakespeare button]

A> Anne Hathaway was the wife of William Shakespeare [ . . . ] (shows Wikipedia-based information on the English Anne Hathaway)

Figure 5D:
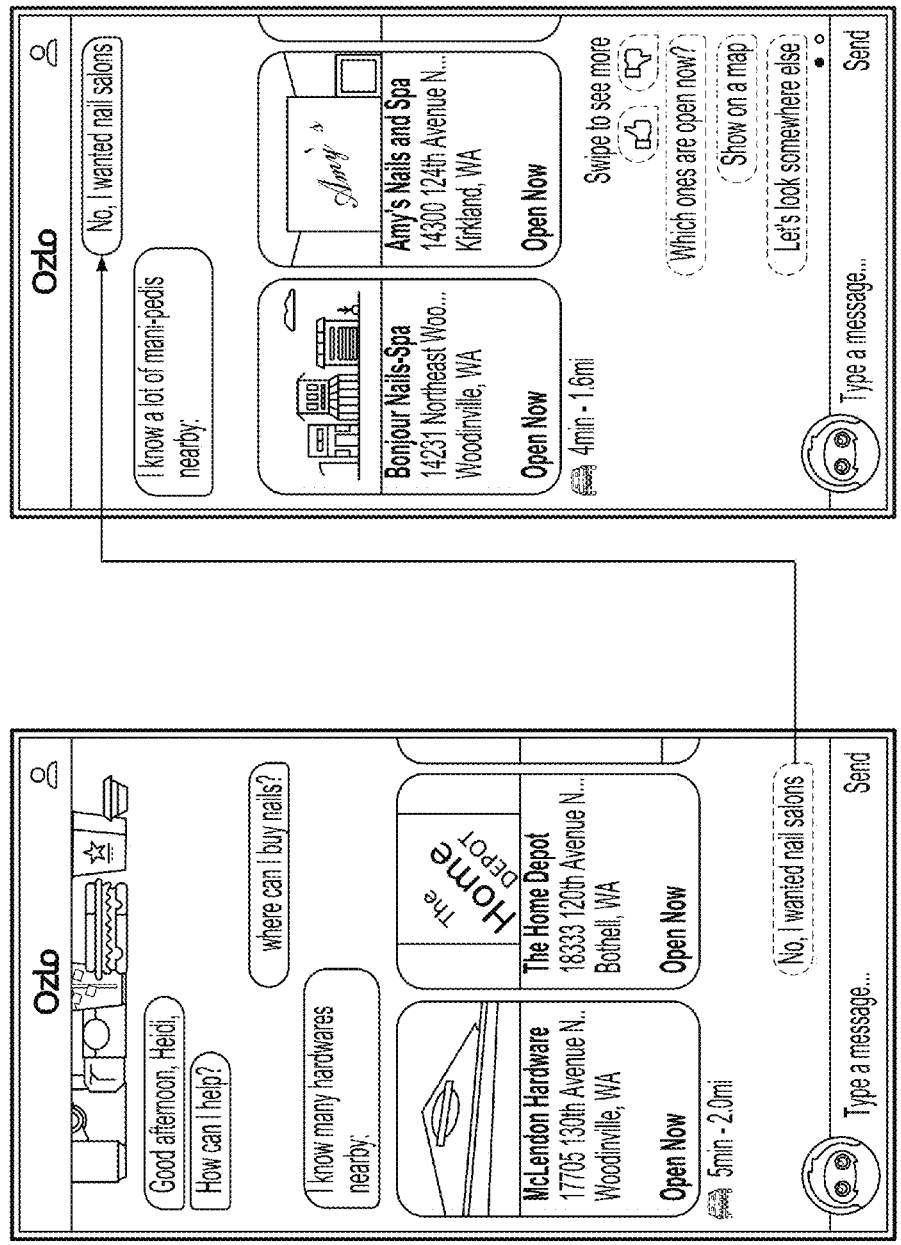

FIG. 5D represents a user statement "Where can I buy nails?" The ambiguity lies in that disambiguation is required between what type of business the user would prefer, nails for hammers/home improvement, and fingernails for a manicure. The dialog generated by the intelligent agent (212) in FIG. 5D demonstrates an ability to disambiguate within task, but across business types Discover: poi:placetype:nail salon and Discover: poi:placetype:hardware store.

In FIG. 5D, the dialog between "A>", the intelligent agent (212) and "U>" the user (202) is as follows:

A> How can I help?

U> where can I buy nails?

A> I know many hardwares nearby:

A> [displays carousel of hardware stores, left-most recipe of highest priority]

A> [displays buttons including No, I wanted nail salons button]

U> [selects No, I wanted nail salons button]

A> I know a lot of mani-pedis nearby:

A> [displays carousel of nail salons, left-most recipe of highest priority]

A> [displays buttons including Which ones are open now? button and Show on a map button]

Figure 6A:
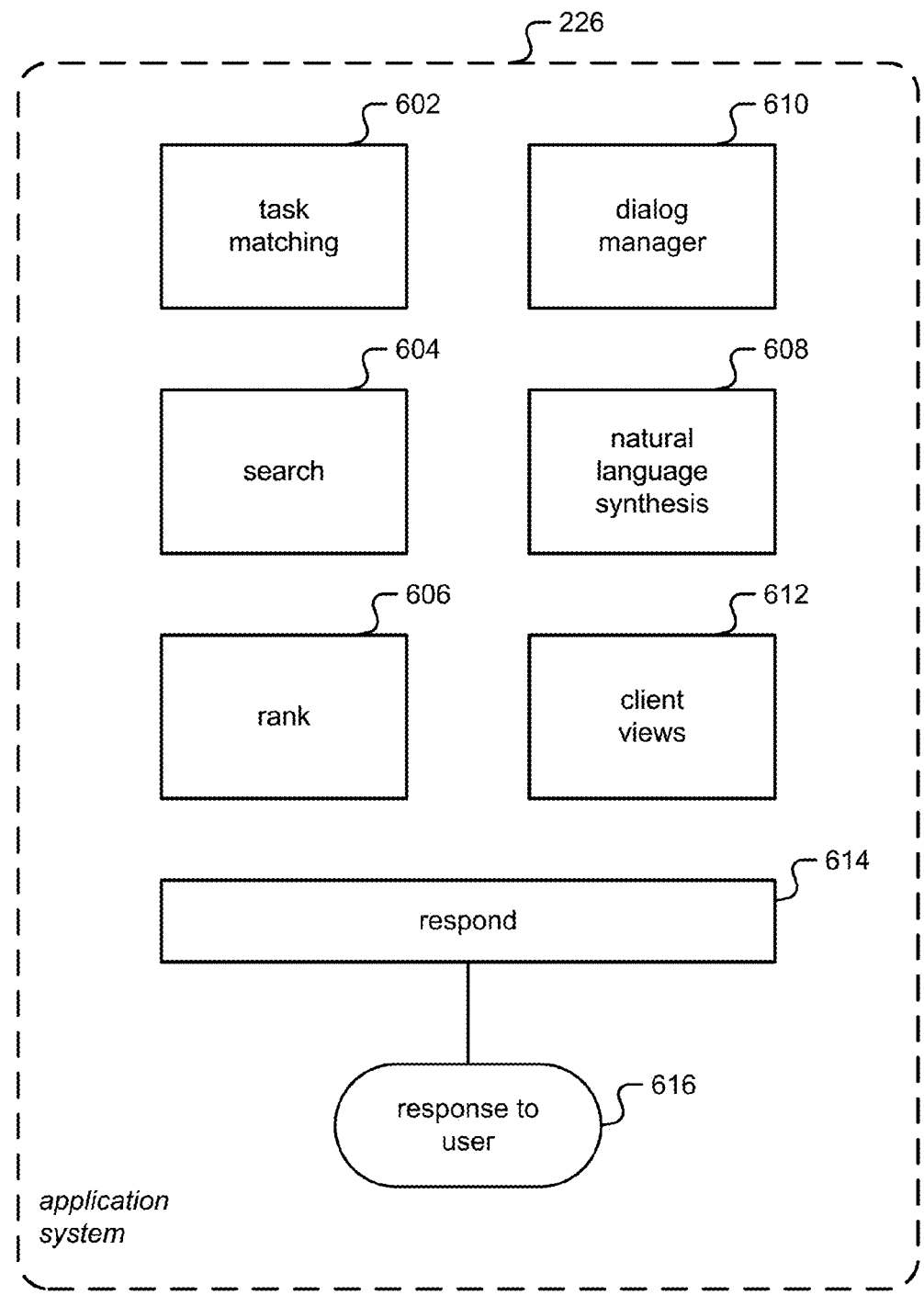
FIG. 6A is a block diagram illustrating an embodiment of an application system.

FIG. 6A is a block diagram illustrating an embodiment of an application system. In one embodiment, the application system of FIG. 6A is represented in FIG. 2 (226) to manage a conversation between intelligent agent (212) and user (202).

Within the application system (226) may be a system for task matching (602), to match intent for a user utterance/statement/query to a task. For example, if a user query is "where's a good place to watch the game?", the task matcher (602) finds a POI entity task.

Within the application system (226) may be a system for search (604), that given user intent and a task type from task matcher (602), searches for results and/or answers that could fulfill the request. For example, if a user query is "where's a good place to watch the game?", and the matched task a POI entity task, the search system (604) searches for POIs, namely restaurants and bars, in the graph that are sports bars, have a TV, and/or are known for sports.

Within the application system (226) may be a system for rank (606), to take search results returned from search system (604) and rank them according to the user's implicit and explicit signals, for example personalization signals. For example, if a user query is "where's a good place to watch the game?", one ranking for rank engine (606) is to rank higher POIs that are closer to the user (202) in their current location (204).

Within the application system (226) may be a system for natural language synthesis (608), to determine how intelligent agent (212) may reply to user (202). For example, if a user query is "where's a good place to watch the game?", the natural language synthesis engine (608) determines this is not a factual query with a precise answer to such a query, so the intelligent agent (212) should reply with a set of results as suggestions rather than answer with facts. Within the application system (226) may also be various other systems such as a dialog manager (610) and a manager for client views (612), which in combination with the above systems (602, 604, 606, 608) form a response engine (614) to provide a response to user (616).

Figure 6B:
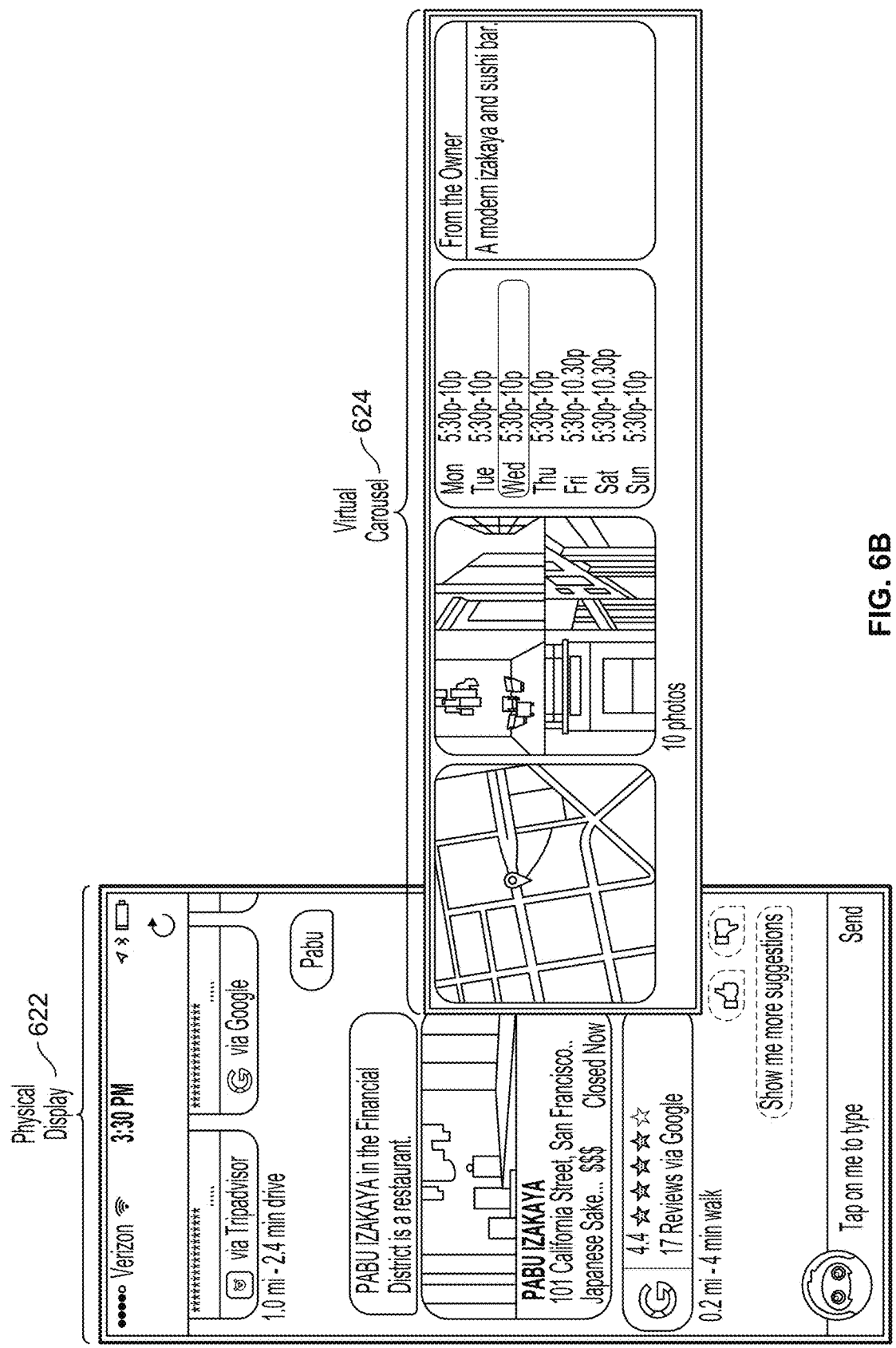
FIGS. 6B-6D illustrate examples of carousels of cards.
Figure 6C:
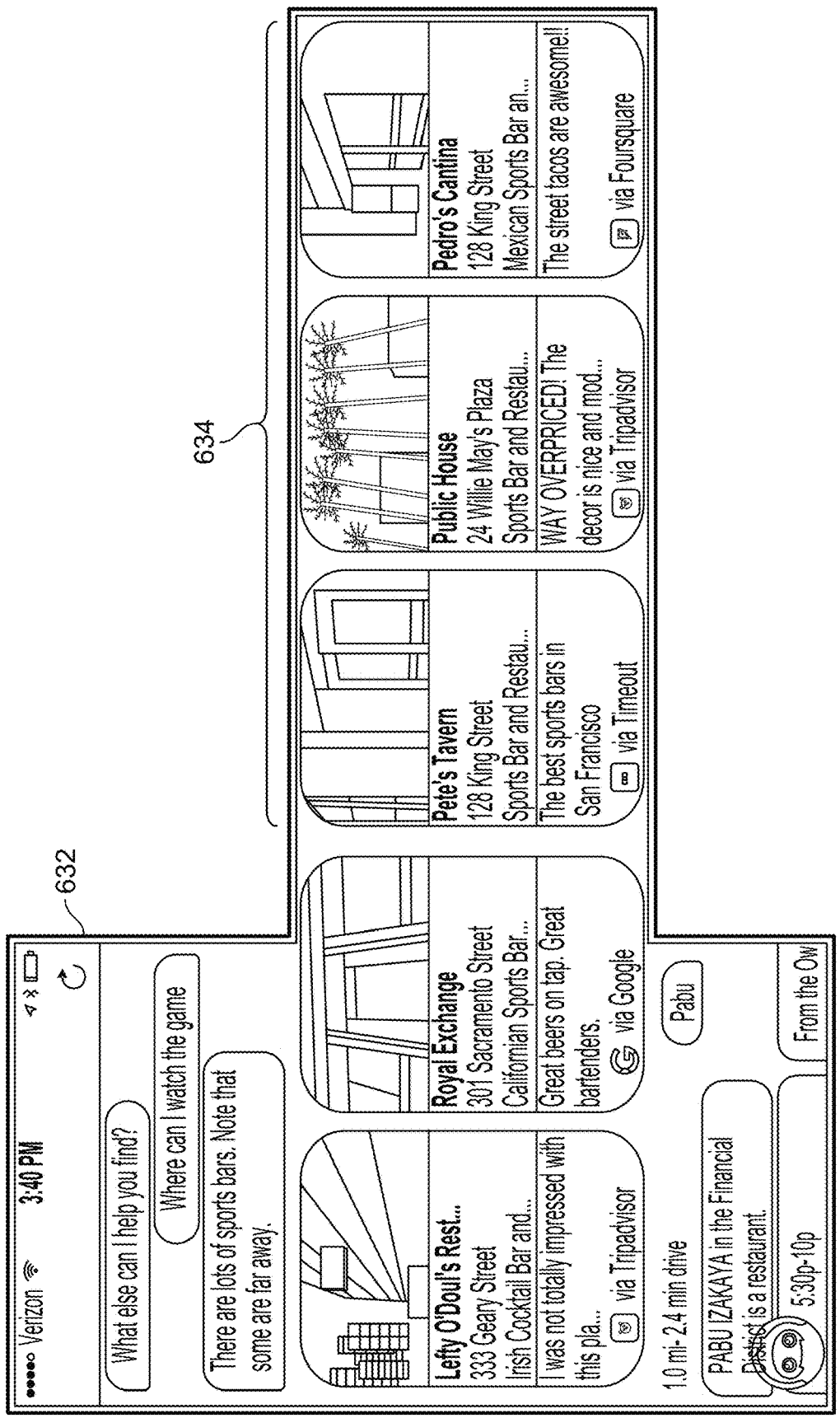
Figure 6E:
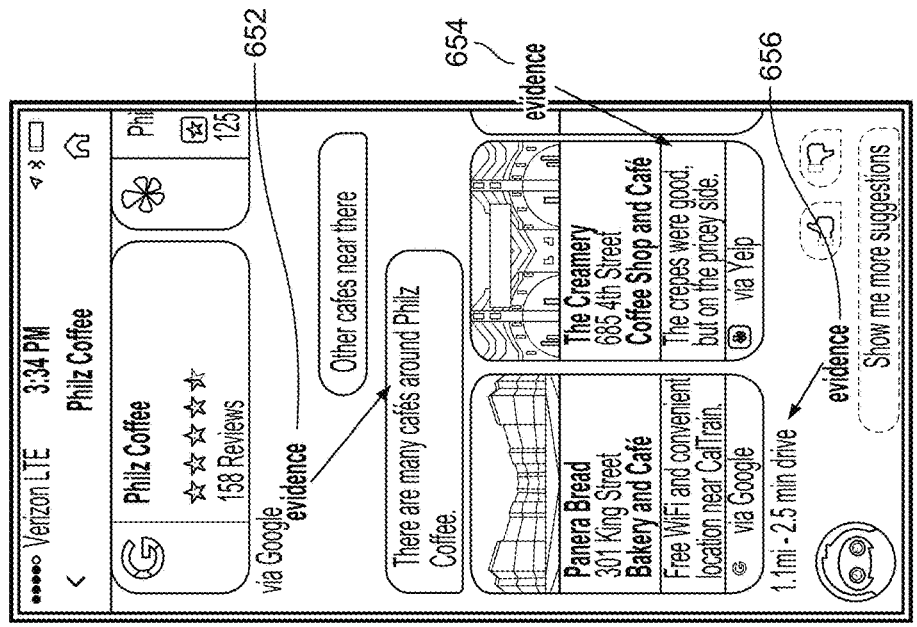
FIG. 6E illustrates an example of evidence-supported results.
Figure 6D:
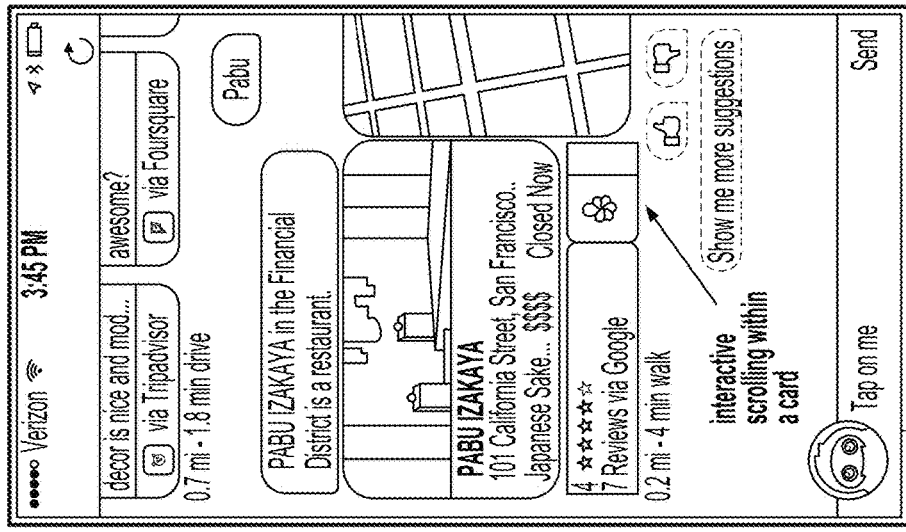

FIGS. 6B-6D illustrate examples of carousels of cards. In FIGS. 6B-6D, screenshots are given of an intelligent agent (212) conversing in natural language with a user (202, 204) on a mobile phone (206a) with a portrait aspect ratio.

In one embodiment, again information may be presented to a user (204) via a user interface that includes a carousel of publisher-themed cards, for example, as a set of most relevant results in response to a user query. In one embodiment, a card in a carousel may include rich user interface elements and/or controls. For example, in the case of a set of results responsive to a query associated with finding a restaurant, a card in the carousel may display a responsive result with a control to make a reservation at a time specified within the control.

In one embodiment, one or more of the following techniques may be used to present search results:

a. When presenting a set of search results in an interface with constrained vertical space, results may be presented as a horizontal series of cards, which the user may scroll through, by swiping or whatever other input means is available on the device such as arrow keys, and so on. Similarly for constrained horizontal space, the carousel may be represented by a vertical series of cards. One example of a constrained vertical space include a conversational chat interface on a phone (206a) in which the intelligent agent is participating as a participant in the conversation, where the user (202) only has the space between their reply and the user's next input. Another examples of vertically constrained displays include a television, an automobile navigation, and/or entertainment system display;

b. Each card may provide summary information about a corresponding result;

c. Additional information about each result may be displayed below the card, which changes depending on which card is "in focus". For example the card in focus may be centered, or on a left side. A card in focus may be related to the priority order, if any, in which cards are presented;

d. Results cards may all be identical, or they may be mixed. For example, when examining the details about a specific result, a carousel of cards for each item associated with that result may be displayed;

e. A card may be 'selected' by the user (202) tapping the card or via some other input, which once selected then navigates the user (202) to a more detailed view of the information. A detailed view of the information includes, for example, playing a video, showing an image, playing a song, and so forth; and f. A card may also contain active elements such as buttons, inputs, or scroll views, allowing a user (202) to directly manipulate content within the cards.

FIG. 6B shows a pictorial illustration of a carousel. Physical display (622) indicates a conversation with user (202), wherein a user statement is "Pabu". Given the user context, discourse state, and user intent, the intelligent agent (212) determines the user is looking for information on Pabu Izakaya, a POI in San Francisco. The carousel presented for Pabu Izakaya includes at least one card displayed on physical display (622) showing vital statistics for Pabu Izakaya, but also pictorially is indicated as a 'virtual carousel' (624) meaning that when user (202) swipes the physical carousel to the right, more cards are available including a map, photo gallery, operating times, and a statement from the owner.

FIG. 6C shows a second pictorial illustration of a carousel. Physical display (632) indicates a conversation with user (202), wherein a user statement is "Where can I watch the game". Given the user context, discourse state, and user intent, the intelligent agent (212) determines the user is looking for information on finding a sports bar nearby. The carousel presented for this task includes at least one card displayed on physical display (632) of two better sports bars close by, but also pictorially as indicated as a virtual carousel (634) are additional cards available to a right swipe including three more sports bars a little further away. FIG. 6D shows a third screen shot of a carousel. In the example in FIG. 6D, carousels may themselves permit interactive scrolling within a card, shown as virtually a mini-carousel (642) of reviews and review providers for a given POI.

FIG. 6E illustrates an example of evidence-supported results. In FIG. 6E, a screenshot is given of an intelligent agent (212) conversing in natural language with a user (202, 204) on a mobile phone (206a) with a portrait aspect ratio.

In one embodiment, evidence-supported results are provided as results may be aggregated from multiple sources such that results are presented along with an explanation for why the result and rank was included in the set for easier understanding. To generate an explanation, a set of candidate explanations may be generated by examining all of the inputs that were used to contribute to the ranking.

Figure 6F:
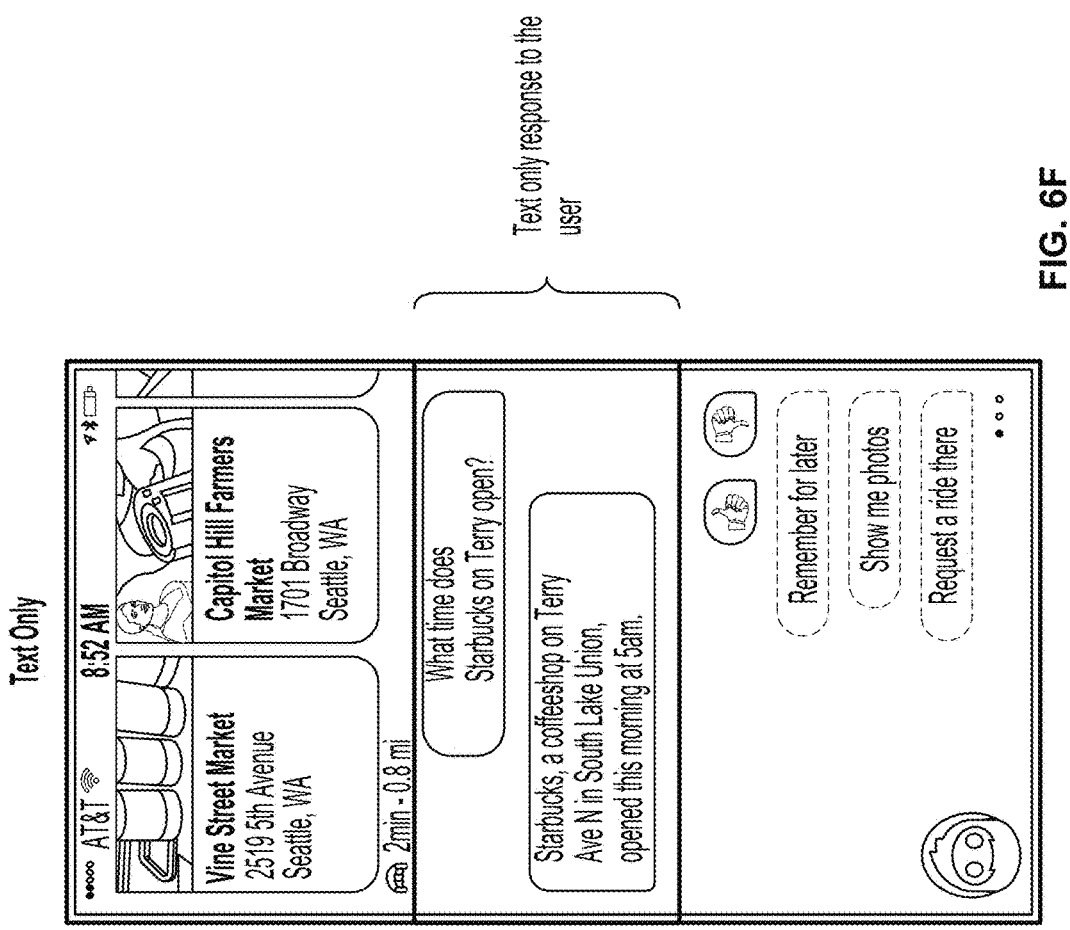
Figure 6G:
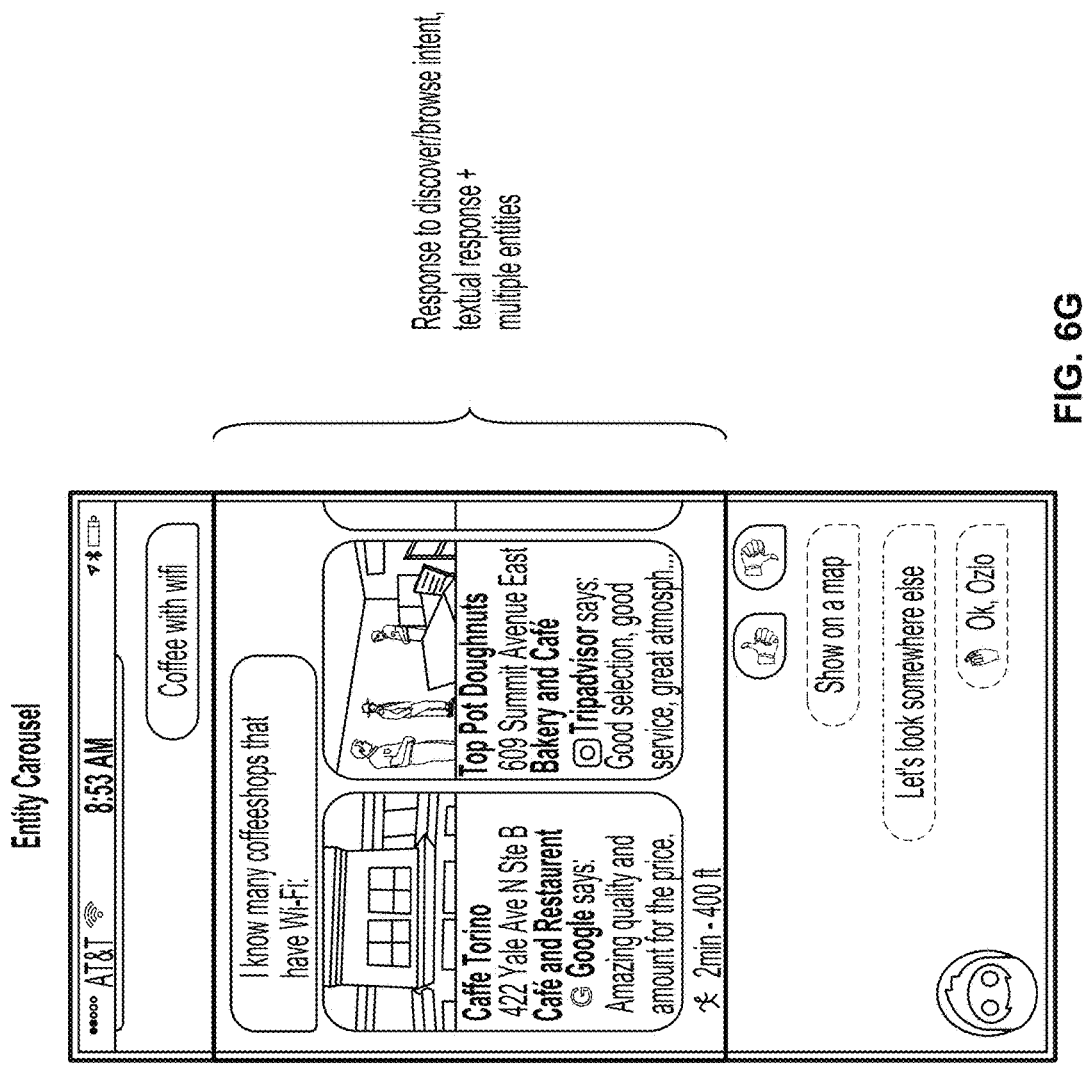
Figure 6H:
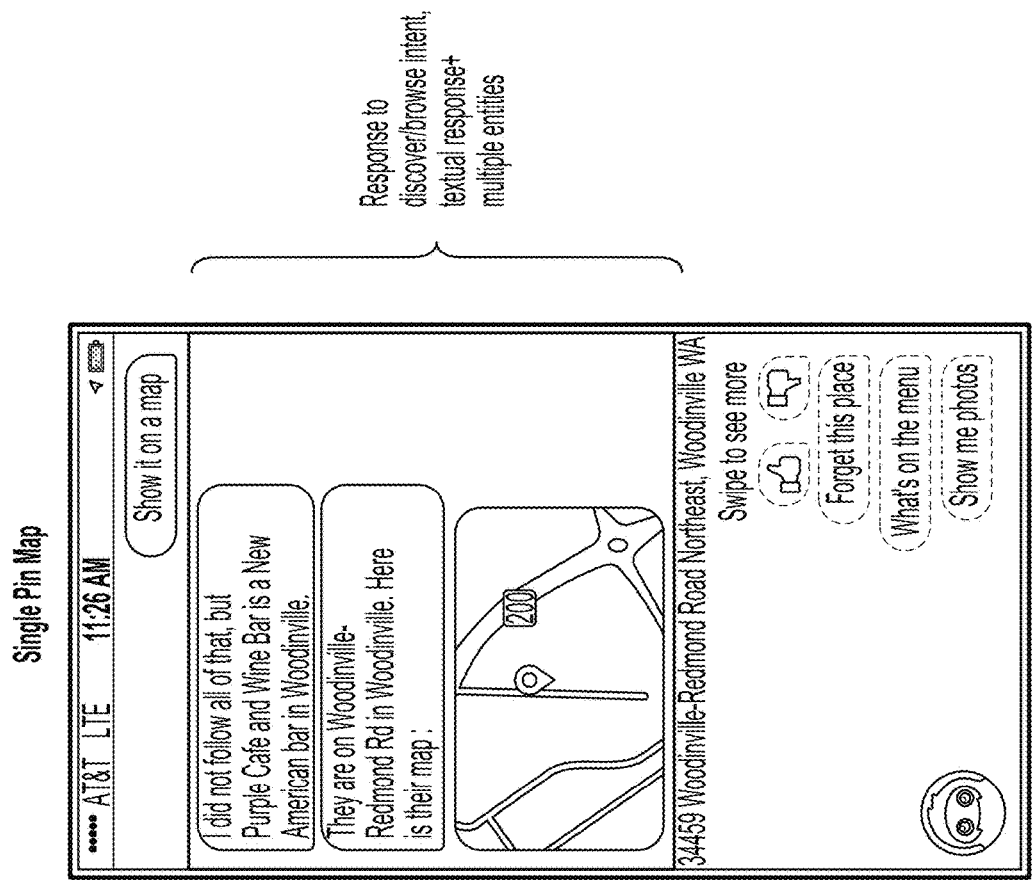
Figure 61:
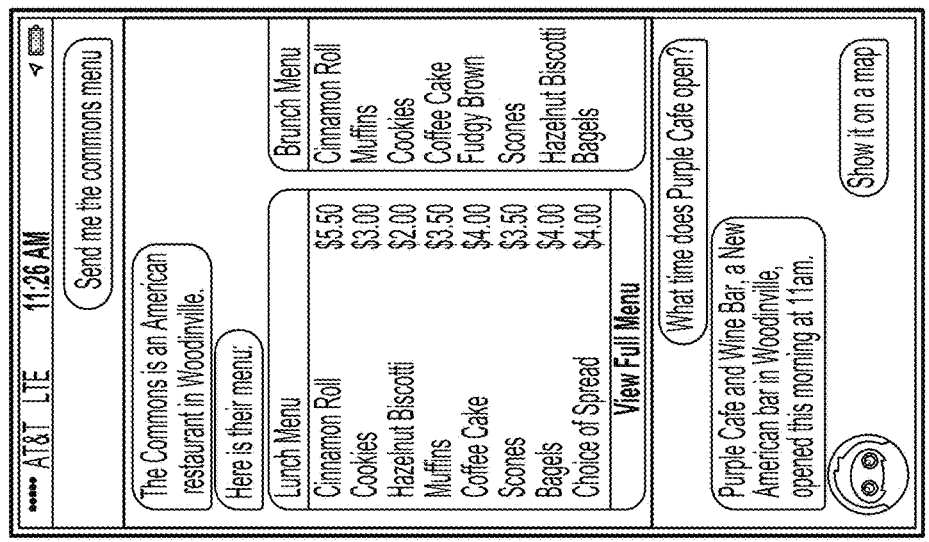

The methods used may vary depending on the type of input. FIGS. 6F-6M illustrate example screenshots for an intelligent agent. FIG. 6F illustrates a screenshot of a text only response to a user (202) from intelligent agent (212). FIG. 6G illustrates a screenshot of an entity carousel used as a response to a user (202), which may be used as a response to discover and/or browse intent, as a textual response and/or for multiple entities. FIG. 6H illustrates a screenshot of a single pin map used as a response to a user (202), which may be used as a response to discover and/or browse intent with geographic significance with a POI, and/or as a textual response and/or for multiple entities.

Figure 6J:
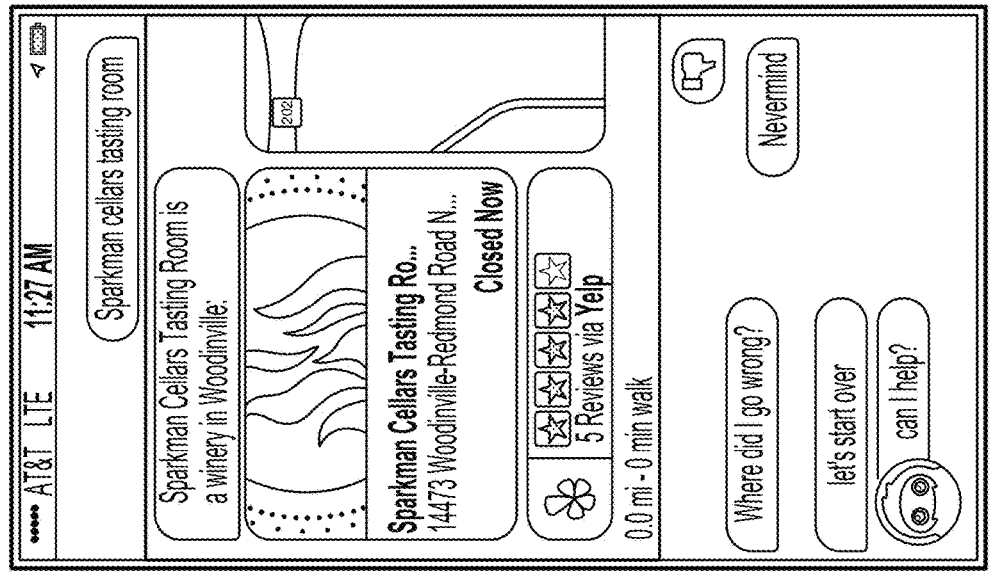
Figure 6K:
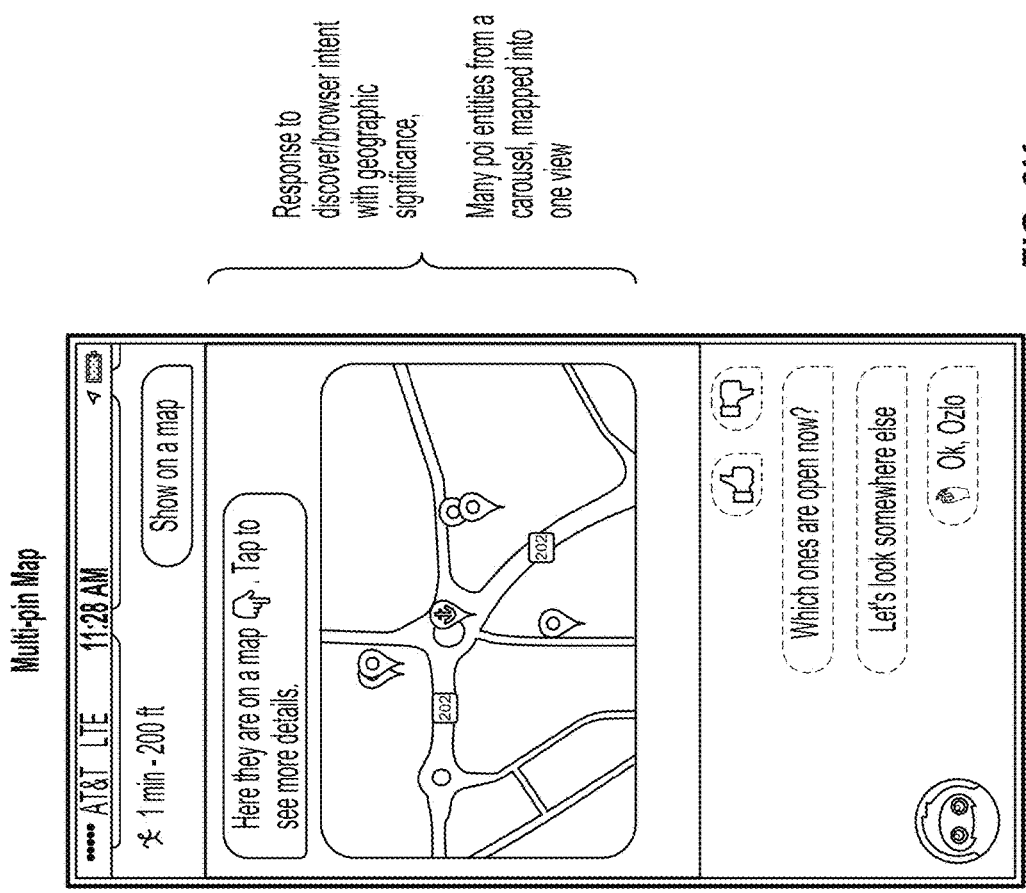

FIG. 6I illustrates a screenshot of a menu carousel used as a response to a user (202), which may be used as a response to menu queries such as those in the café and/or restaurant domain, and/or other list queries. FIG. 6J illustrates a screenshot of a single entity carousel used as a response to a user (202), which may be used as a response to answer and/or inspect intent about a single, disambiguous entity, in order to provide a textual response and/or rich information about this entity. FIG. 6K illustrates a screenshot of a multi-pin map used as a response to a user (202), which may be used as a response to discover and/or browse intent with geographic significance, with a plurality of POI entities from a carousel, mapped into one view.

Figure 6L:
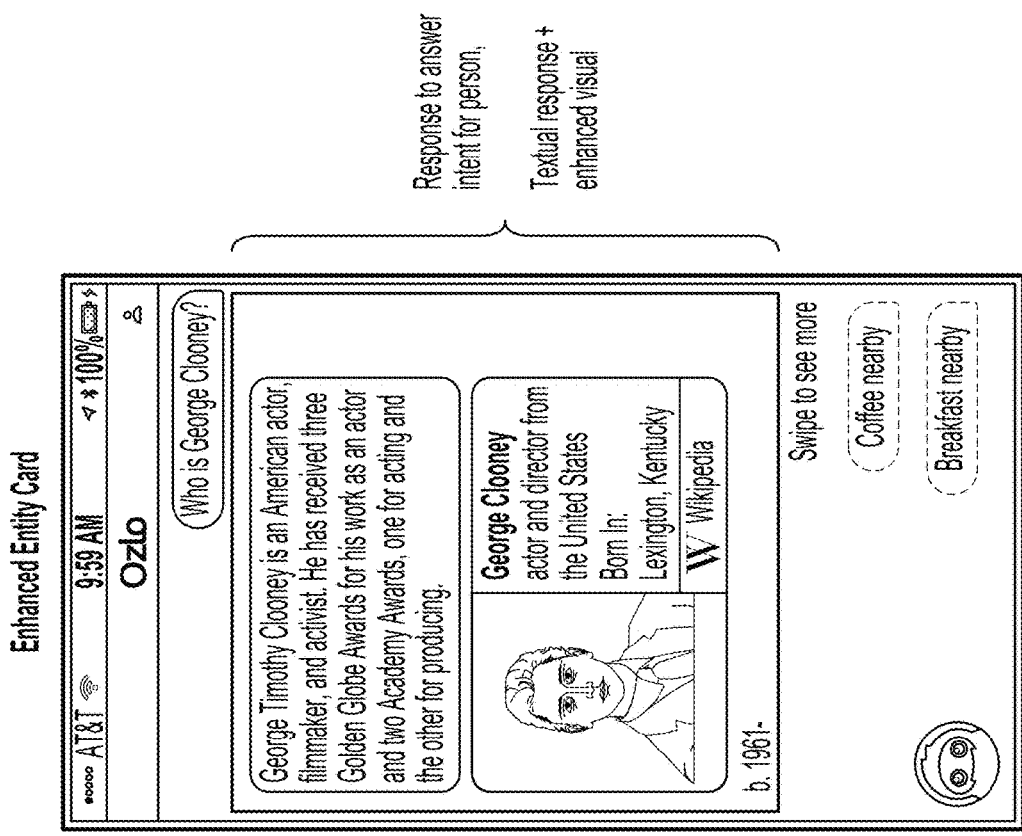
Figure 6M:
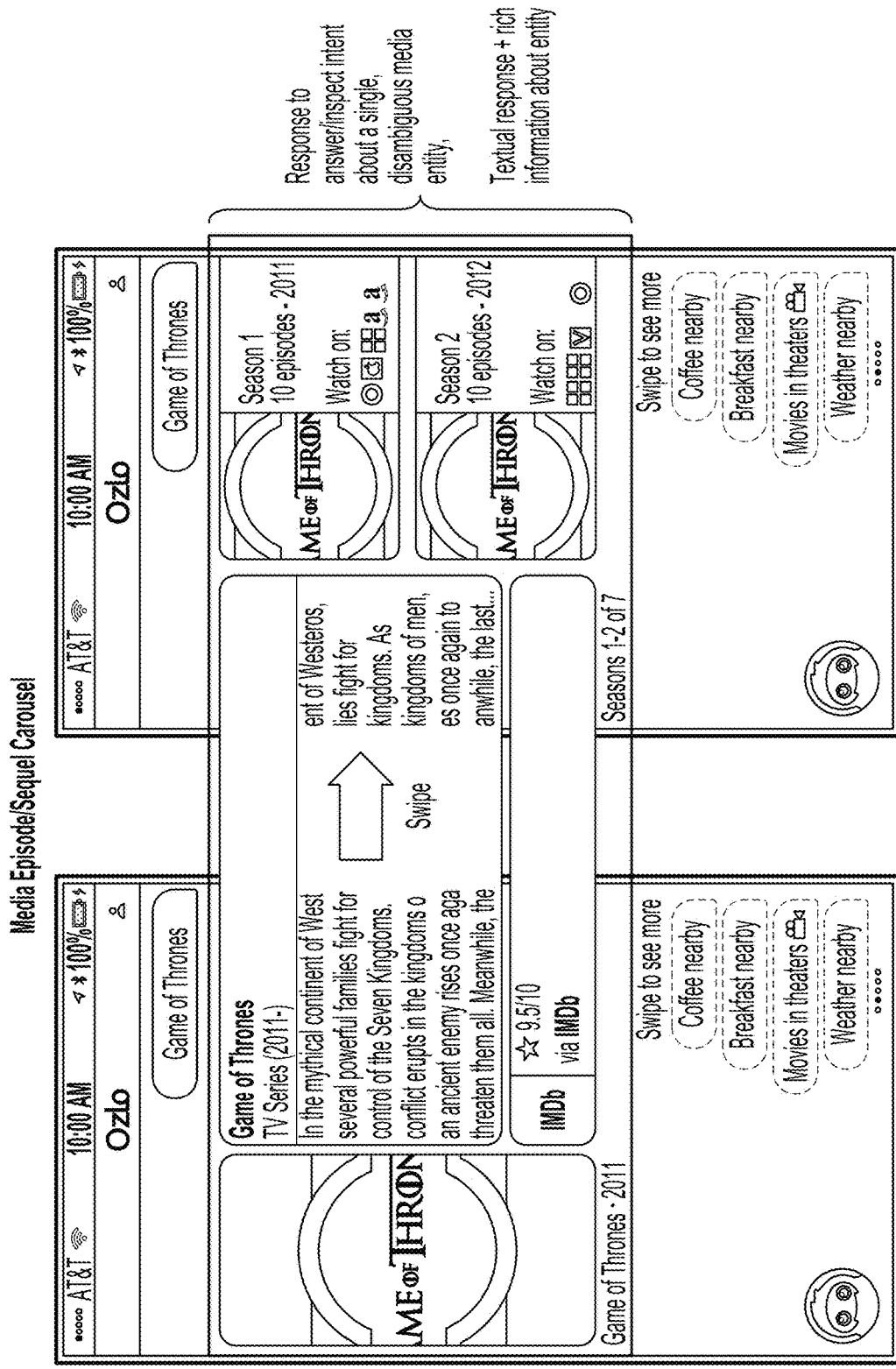

FIG. 6L illustrates a screenshot of an enhanced entity card, which may be used as a response to answer intent for person and/or other type of entity, which provides a textual response and enhanced visual. FIG. 6M illustrates a two screenshot sequence of a media episode/sequel carousel, which may be used as a response to answer and/or inspect intent about a single, disambiguous media entity and/or other type of entity with analogous episodes/sequels. A textual response and/or rich information about entity and its episodes/sequels may be provided.

In one embodiment, for factual data that a single and/or deterministic answer such as a trivia fact, a distance from a point, and/or hours of operation, the relevant facts that contributed to the score may be stored and/or presented. By contrast, for data extracted from source documents, including reviews, menus, listings, articles, images, audio, and video, the source document may be split into independent fragments, each of which may be cited independently as evidence. For example:

For a review the document may be split into sentences and/or otherwise abridged;
For an image the bitmap may be split based on objects or patterns recognized in the image; and/or
For audio the audio file may be split into words, musical stanzas, or simply 30s cuts.

In one embodiment, fragments that obviously did not contribute to the ranking function because, for example, they did not contain any matching keywords and/or patterns, may be omitted. In one embodiment, once a candidate set of fragments has been identified, those fragments may be ranked based on their suitability to explaining the ranking.

In one embodiment, the evidence displayed may be determined based at least in part on how evidence is to be presented generally. For example, any evidence that does not match a current display method may be omitted, for example, images may be dropped because a display area is text only.

In one embodiment, correlation is sought between a candidate fragment and how input originated was used to influence the ranking. For example, for reviews matching keywords may be sought that are used prominently in the sentence, or in a similar way, for example adjective to adjective. For audio overall similarity of sound may be sought and/or prominence of sound may be sought. These scores are combined to rank all of the fragments and then show the top N results to the user, where N is a predetermined scalar.

In one embodiment, for specified interface designs and/or aspect ratios there may exist multiple slots where evidence may be shown, in which case this same algorithm may be executed multiple times and/or rescore the same set multiple times to make use of the multiple slots.

In one embodiment, the following approach may be used to determine and present evidence to support and/or indicate why a result is included, for example from where the result was obtained:

When search index is generated, fragments are tracked of input documents that contributed to scoring;
When evidence is to be shown, original fragments are collected and ranked based on how much they contributed to the scoring; and/or
Final ranking/presentation steps from above are tracked and collected in a similar fashion.

Evidence-supported methods end up showing user (202) the specific bits and/or fragments of source documents that actually contributed the most strongly to ranking of that particular item.

In some cases, showing the piece of data that contributed to scoring is not formatted in a way that will be useful to user (202). Another way to do this is to do a hybrid of the above two approaches, where candidate fragments are ranked on a combination of how much they actually influenced ranking and how well it may be explanatory to the user.

In one embodiment, "anti-evidence" may be shown. For example, evidence may be highlighted that tells user (120) why one or more results are probably not a good fit and/or why the result was ranked low.

FIG. 6E illustrates three different examples of how evidence may be displayed in a screenshot. For a user statement "Other cafés near there" the first evidence example (652) is displaying a statement "There are many café s around Philz Coffee" which indicates to a user (202) that the intelligent agent (212) has interpreted "near there" as meaning "around Philz Coffee".

Second evidence example (654) shows an online review of the second ranked result "The Creamery" which gives a justification for its higher second rank with an excerpt from a Yelp review, "The crepes were good, but on the pricey side". The third evidence example (656) shows the distance from and time to travel to the first ranked result "Panera Bread" which gives a justification for its higher first rank; a short distance of 1.1 mi and/or a 2.5 min drive.

FIGS. 7A-7I illustrate interactive search. In FIGS. 7A-7H, a screenshot is given of an intelligent agent (212) conversing in natural language with a user (202, 204) on a mobile phone (206a) with a portrait aspect ratio. As described above, interactive search focuses on helping user (202) to iteratively improve their question until they may precisely find the answer they are seeking.

Interactive search may provide three major advantages over traditional search, particularly for people accessing the system on a mobile phone or other constrained devices such as voice controlled systems, TVs, and/or in-car computers:
 a. It is compatible with small or no screen devices. Traditionally a large PC screen may show a long list of results during search because they are easy to scan. Phone-size screens or voice-only interfaces may show and/or read out a smaller handful of results. Thus, precision is more important than recall because the user (202) will often only see or hear the first one or two results;
 b. It may be faster. Each time a user (202) adds to or clarifies their query, it may be easier to show the user the exact right result. For example 'coffee' versus 'closest coffee shop' wherein it is much easier to show a better result for 'closest coffee shop' over 'coffee'. Oftentimes merely one or two refinements may get to the right answer; and
 c. A user (202) may feel more confident in the answer. The process of refining the query helps user (202) build confidence they are asking for the right thing. When the user (202) finally gets the result, they may be happier with the answer and do not feel the need to spend time on further research or evaluating alternative resources.

In one embodiment, an interactive search system is modeled as a conversation with an intelligent agent (212) a digital agent or bot, similar to a chat interface found in a traditional messenger. User inputs to the intelligent agent (212) via text, voice, touch gestures and/or other inputs, act as commands to the system to start a new query, modify the exiting query, or to take final action and/or approve the result. Intelligent agent (212) responds to a user (202) in various ways to elicit further feedback from the user, propose possible results, and to suggest possible next steps. In this way, the user (202) engages intelligent agent (212) in a back and forth to build and modify their query until they approve the query and/or start over.

Inputs A user (202) may use one or more inputs to issue commands to the system. In general there may be at least five classes of commands:
 a. new-search. Initiate a new search query. If a user issues this kind of command while a search is in progress, the in-progress search it is considered abandoned. Abandoned searches do not have to be discarded; they may be saved and resumed later by another command. A special kind of new search is an interjection—this means the abandoned search is saved and resumed automatically when the user completes the current search;
 b. modify-search. This kind of command modifies the query for the current search in progress by adding, deleting, or changing options on the current query;
 c. accept. This kind of command terminates the search. It also typically causes the system to take some action on the result. For example, the user (202) may ask to save the result to a wishlist, invoke some service with it, share it, and so forth;
 d. resume-search. A search that was abandoned may be resumed by this kind of command;
 e. chatter. Because a chat system is conversational, users may input things that by-pass the normal search system such as "hi", "what's your name", and so forth.

A user may input commands to the system in a number of different ways:
 a. Text or Speech. A user (202) may type or speak a command. Suggested prompts and other interface mechanisms may also be provided to accelerate entry of a command and may be treated just like typed text. These commands may be interpreted using a natural language interface that understands natural language phrases such as English phrases. Examples include:
  i. start a new search. "new search", "start over", "let's talk about something else":
   1. A user (202) may implicitly start a new search by just stating a new query or intent. "show me coffee shops around here", "I'm hungry", "I need to plan a date"; and
   2. Many of these statements may also be interpreted as modifying an existing search. The natural language interface may use the context of the current search to make that judgement;
  ii. modify an existing search. "not that one", "what is closer", "how about for my kids";
  iii. accept a result: "looks good", "make the reservation", "thanks";
  iv. resume a search: "let's go back", "what was that place I was looking at yesterday?"; and
  v. chatter: "hi", "bye";
 b. Contextual Validation of Free Text Input. In some cases the interface may expect a specific type of text or voice response like a geographical location, for example city, state intersection, and/or address, or perhaps a specific type of food, for example cuisine, dish, and/or eatery type. In these cases the comprehension and interpretation of the input may be biased and/or limited to the expected type; and
 c. Gestures. Visual interfaces may be provided readily for a user to interact with, including presenting results or action buttons. User interactions with these visual interfaces may also translate into the same commands to the system. Examples include:
  i. start a new search. Tapping on a home button;
  ii. modify an existing search. Flipping a toggle button, or Tapping on a card for a single result, which modifies the query to focus on that single result instead of the list of results;
  iii. accept a result. Hitting a "reserve table" button;
  iv. resume a search. Pressing the 'back' button after tapping on a result card; and
  v. chatter.

Outputs and/or Feedback. Whenever a user (202) submits a command to the intelligent agent (212), the agent may apply the command, such as start the search and/or modify the search, then offer the user (202) feedback intended to help them take the next step in modifying their query. Examples include:

a. Propose results. The intelligent agent (212) may propose a result, giving the user a chance to accept the result or to further modify the query. Results may be shown any way, but alongside with an explanation of what was searched for and why it is being shown to them:
    i. Note that results themselves may include affordances for the user to further modify/accept the result;
    ii. For example, a user may tap on a result card to go to a detailed browse mode about that result. This also modifies the current search to focus on that result; and
    iii. For example: a reservation card may have a "reserve table" button which 'accepts' the search and makes the reservation;
b. Ask a question. Agent (212) may directly ask user (202) a question to drive them to a next step in the conversation. One highlight is that the user is not shown any results. There are several types of questions:
    i. To start a new query: "What else can I help you with?";
    ii. To propose a next step: "What kind of brunch places did you have in mind?";
    iii. To clarify an ambiguous input: "Which airport did you mean?"; and
    iv. To collect a user preference: "Where do you live?";
c. Suggest next steps. At the end of any response, suggested prompts for possible next commands user (202) might input are shown. These suggestions may be important ways to help user (202) rapidly iterate on their query to get to a wanted result.

Using Context. In addition to explicit, active input from user (202), the intelligent agent (212) may also use passive input such as user context (204) and user model/preferences (228a) to pre-fill a query with reasonable defaults, saving time for user (202). The intelligent agent (212) may explain to user (202) what relevant context is being used when showing results and user (202) may modify and/or override the context.

Examples of passive context include:
a. Current location, speed, heading (204) as well as past locations;
b. Personal data such as name, home, work, diet, likes, and dislikes;
c. Time of day, day of week, time of year, and holidays;
d. Recent searches; and
e. Location in the UI, for example a navigation stack.

In one embodiment, if the system (212) is not confident that a given piece of context should be used, it may ask a question to have user (202) clarify. For example, if a user was known to be recently looking near their home and they start a new search for 'italian', the agent (212) may confirm that they still want to use their home.

Corpus. Interactive search may be applied to any corpus of data including typical things like people, places, and/or things, but also for services. For example, interactive search may help a user expand a starting input like "I want to throw a party" into a query, assuming the query was represented as a set of key value pairs, such as:

| Key | Value |
|---|---|
| action | Send |
| object | Invitation |
| invitees | Joe, Jane, Mary, Bob |
| location | {my-house}.location |

-continued

| Key | Value |
|---|---|
| invite-style | balloons, squeaky-teddy-bear |
| collect-rsvp | Yes |
| notify-me | Yes |

In one embodiment, any service discovery/search system configured to process a query as shown above and retrieve a specific service that could fulfill this request, assuming one existed, may be invoked.

Collecting user personal data in context. One improvement in interface to enable interface search is collecting user personal data in context. In one embodiment, users may provide personal data that may be reused later, for example their home address. This type of input may appear negative to user (202) because it may be made to feel intrusive or at least annoying like during form completion.

In one embodiment, the system (212) waits until user (202) actually intends to resolve a query that uses personal data before asking for it. For example, for a home address the agent (212) waits until user (202) asks to search near their home before asking for a home address. Once home address is collected, the search task is resumed with an indicator that user personal data will be stored, for example:

U> Hi, I want to find some coffee near my house
A> No problem! Where is your home?
U> San Francisco
A> OK I'll remember that! Here are the best coffee shops in San Francisco:
A> [Agent presents carousel of coffee shops]

Another aspect of this feature is that it accommodates user (202) disclosing whatever level of information they are comfortable with. So their home address is requested and they say "San Francisco, Calif." rather than "301 Mission, San Francisco, Calif.", the agent (212) accepts it and tailors results based on what is known. If user (202) expresses a desire that requires more accuracy then agent (212) will in turn ask them to refine further, for example:

U> Coffee near my house
A> OK. Here are the best coffee shops in San Francisco:
A> [Agent presents carousel of coffee shops]
A> What do you think?
U> Which one is closest
A> I don't know exactly where you live. What is your address or a nearby intersection?
Mission and fremont
Cool. I'll remember that! La Capra is closest. What do you think?

Figure 7A:
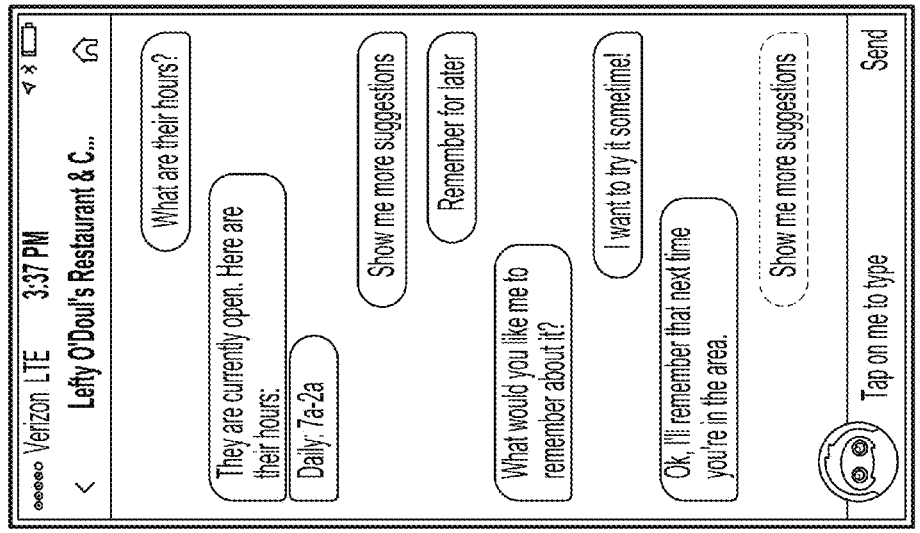
FIGS. 7A-7I illustrate interactive search.

FIG. 7A shows a sample screenshot as an example of proposing results. Note FIG. 7A is similar to FIG. 6C, except that the user location (204) has changed, which changes the query results.

Figure 7B:
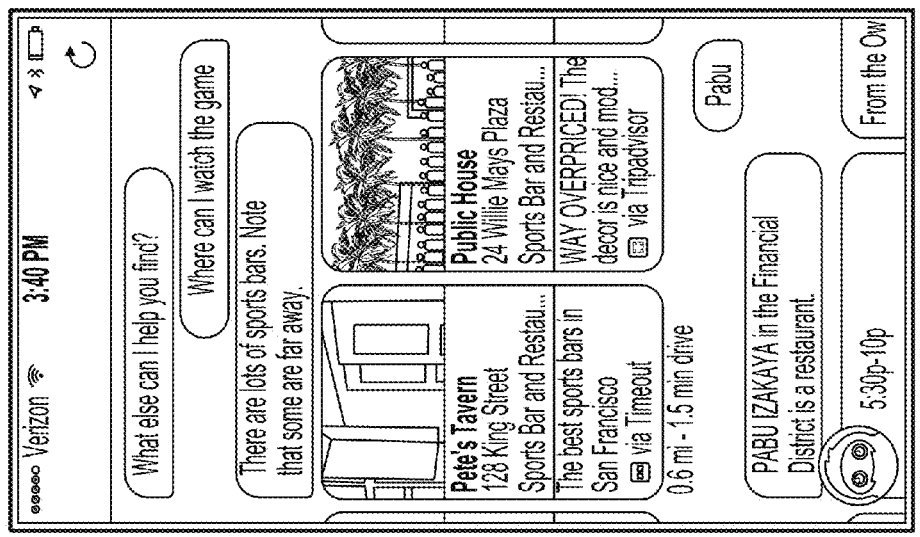

Remember for Later. Frequently user (202) may tangentially run across something while searching and may want to remember it but then later forget. An "accept" commands may ask to remember something on behalf of user (202). The intelligent agent (212) then may ask user (202) what they want to remember about it. This becomes part of user context (228a) and may be retrieved automatically when something is asked by user (202) that seems relevant. FIG. 7B shows a sample screenshot as an example of proposing a remember for later. The user (202) is exploring Lefty O'Doul's restaurant in the SOMA district of San Francisco and asserts a statement "Remember for later" (702). Agent (212) responds "What would you like me to remember about it?", to which by example user (202) responds "I want to try it sometime!", and wherein agent (212) responds "Ok, I'll remember that next time you're in the area."

In the example above, the next time user (202) asked for "a good bar in soma", intelligent agent (212) may respond "You asked me to remember Lefty O'Doul's. How about that?"

Suggested dialog prompts and/or starting dialog prompts. In one embodiment, suggested prompts are shown via agent (212) after a statement. Suggested prompts use a recommendation algorithm to select a set of likely next commands user (202) could input to advance them towards a goal. This list of dialog prompts may be dynamic and change based on personal preferences, contextual signals, and prior conversational turns.

In one embodiment, tapping on the prompt works exactly like typing the same thing using the keyboard or uttering the same thing via voice. In this instance the user does not have an active search, so agent (212) shows them a selection of possible inputs to start a new search, based on their current time and place, for example late afternoon in San Francisco.

Figure 7D:
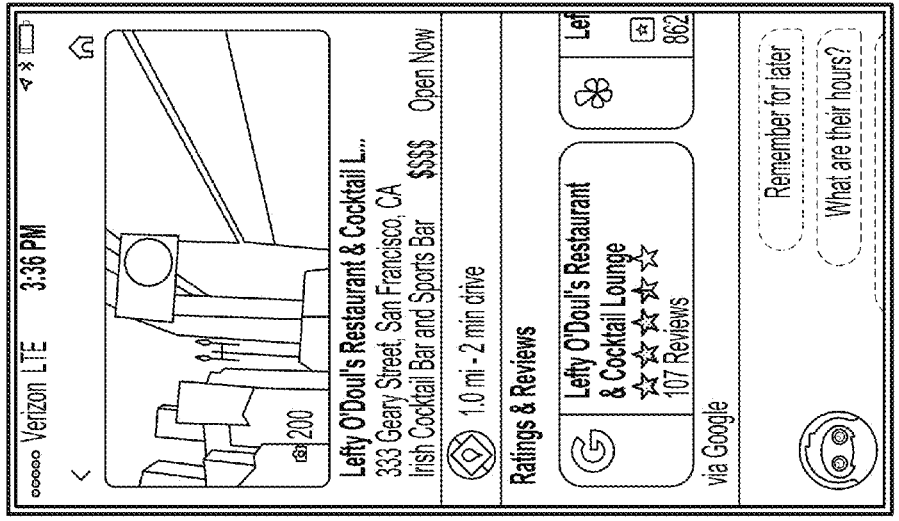
Figure 7C:
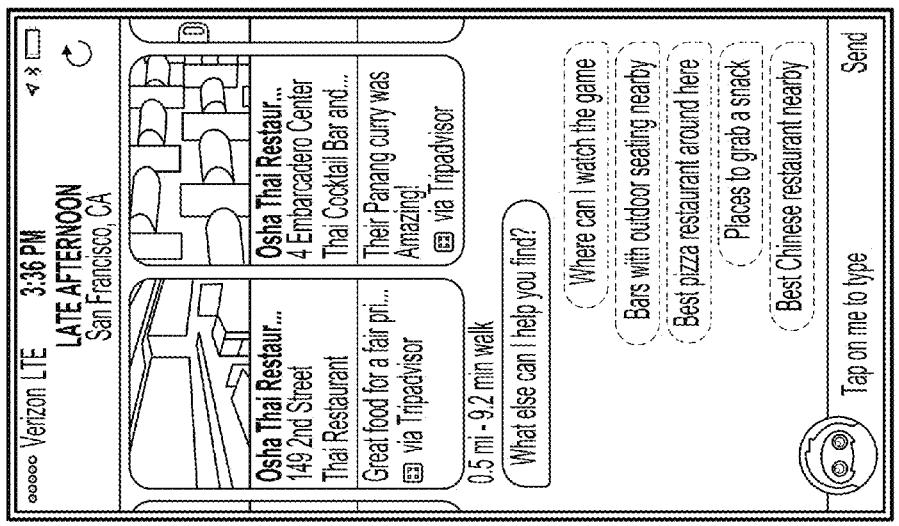

FIG. 7C is an example of a suggested dialog prompts for late afternoon in San Francisco in response to an agent's question "What else can I help you find?" Examples of suggested prompts include "Where can I watch the game", "Bars with outdoor seating nearby", "Best pizza restaurant around here", "Places to grab a snack", and/or "Best Chinese restaurant nearby".

Dialog Prompt Refresh. In one embodiment, to progressively disclose dialog prompt options, user (202) may be offered a limited set, for example three-four, but may be able to pull the view up to refresh and advance the recommendation algorithm. The algorithm will make use of this progressive disclosure and in some cases present sets of related dialog prompt types.

Browse Mode. When user (202) taps on a result card within a carousel, agent (212) modifies the query to focus on that specific result. The agent's response is to push a detailed "browse view" onto the screen that shows more detailed information about the result along with a new set of suggested prompts.

In one embodiment, browsing into this card does not lose the user's search and/or workflow. The prompts shows below are contextual to the search in progress, modified by focusing on a single result instead of the overall set.

Figure 7E:
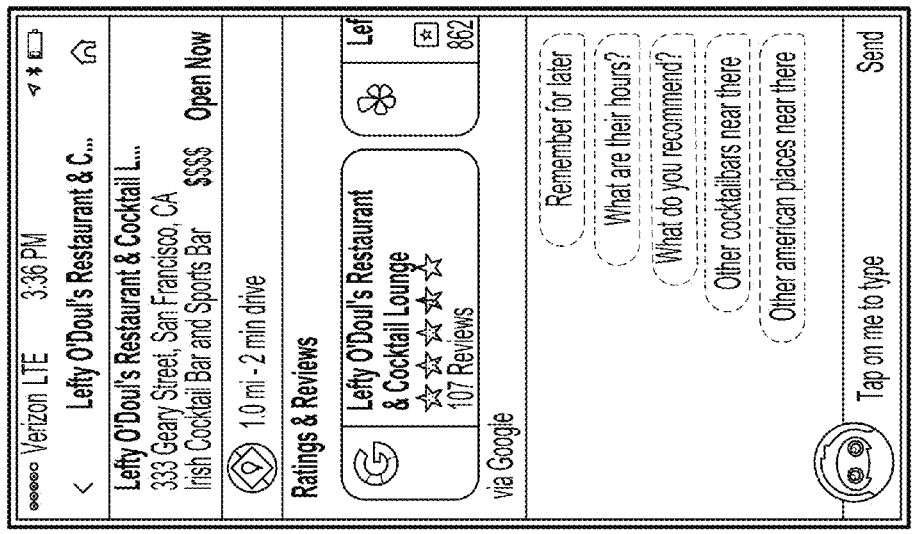
Figure 7F:
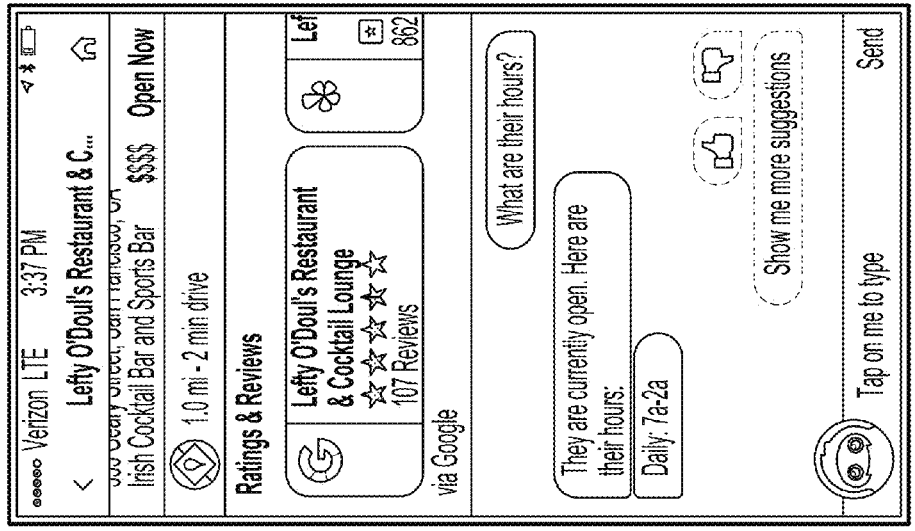

FIG. 7D-7F are an illustration of browse mode. In FIG. 7D, in the conversational flow a result card for Lefty O'Doul's Restaurant is shown, which user (202) selects. FIG. 7E is the resultant screen shot which is a browse view for Lefty O'Doul's Restaurant. The screenshot in FIG. 7E provides detailed information for Lefty O'Doul's and provides a larger set of suggested prompts. FIG. 7F, illustrates an example of user (202) submitting another input while within browse mode that now causes a result, hours for Lefty O'Douls, to be proposed, demonstrating the query refinement and proposal process.

Automatically Showing Results. In one embodiment, agent (212) may use many different techniques in order to help user (202) get to the right query. When the agent app is first started, the results of a query that the agent (212) infers is likely interesting for user (202) is proactively displayed, allowing user (202) to potentially completely skip having to ask. User (202) may modify this query by asking another question or by tapping in on one of the result cards.

Figure 7H:
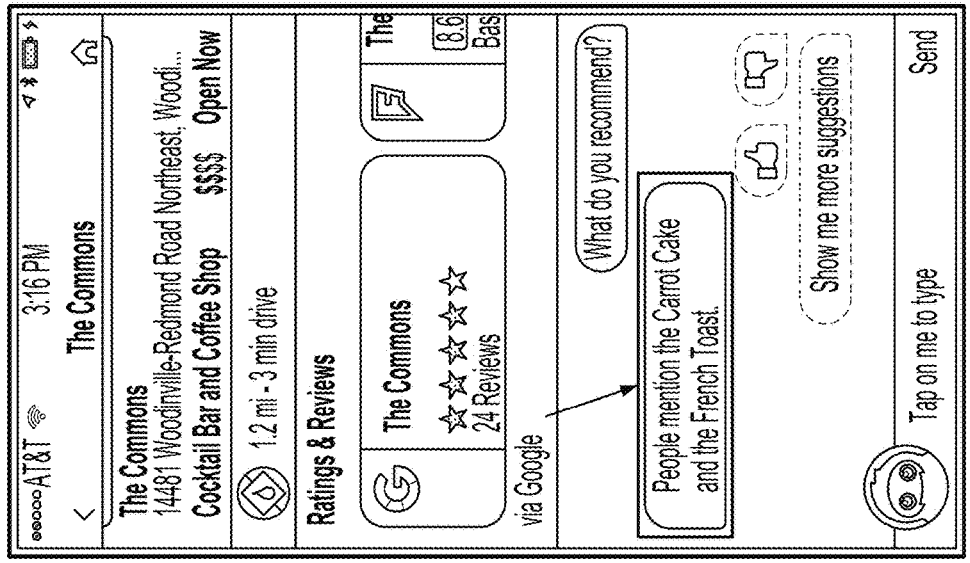
Figure 7G:
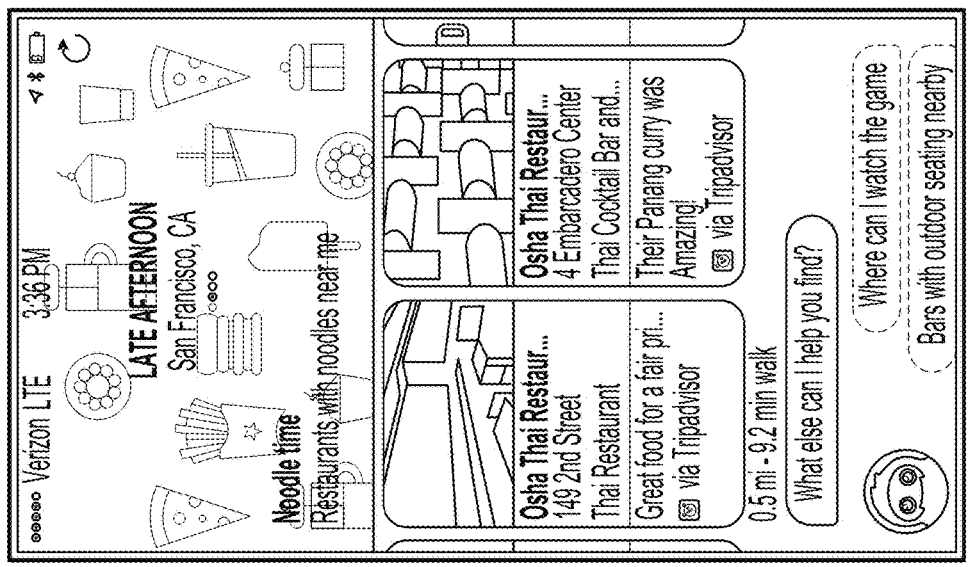

FIG. 7G is an illustration of automatically showing results on startup, wherein agent (212) determines late afternoon in San Francisco, Calif. is "Noodle time" for a given user (202) and context (204, 228a). The agent (212) thus displays a carousel of restaurants with noodles near User (202) and also asks "What else can I help you find?"

In one embodiment, results may be ranked and/or recommended based on entity metadata. Data associated with an entity may be analyzed, such as one or more of structured metadata, and metadata that is inferred from other digital data associated with the entity, including text, images, and link graphs.

The data may be used by a ranking and recommendation system for example for:
 a. Recommendation based on attributes of the entity, such as by dishes on a menu;
 b. Correlation of attributes of the entity with inferred data, such as by correlating the quality of amenities located at a business with comments contained in reviews of that business; and/or
 c. Correlation of attributes of the entity with structured knowledge contained in an external concept database. For example a list of dishes on a menu may be analyzed to determine their ingredients and a score based on fitness for various restricted diets may be assessed.

FIG. 7H is an illustration on recommending results based on entity metadata. User (202) has shown interest in a local coffee shop, and issues user query "What do you recommend". Based on entity metadata such as reviews, agent (212) responds "People mention the Carrot Cake and the French Toast."

In one embodiment, the quality of a task based search system is measured. In one embodiment, in order to measure the quality and progress of a task based search system, data is aggregated across multiple tasks and then weighted on multiple dimensions to provide a consistent score is used to maintain system health.

An example process includes the steps of:
 a. Tasks are broken down by different domains;
 b. Sub-tasks are identified and grouped within a task. Sub-tasks may overlap across different task types;
 c. Different query formulations are used to represent the task/subtasks;
 d. Standard quality metrics of subtasks are used to measure subtasks across query classes;
 e. Aggregation of data across subtask occurs, weighting by query volume;
 f. Importance factor is applied based on human labeling; and/or
 g. Score is produced.

Figure 7I:
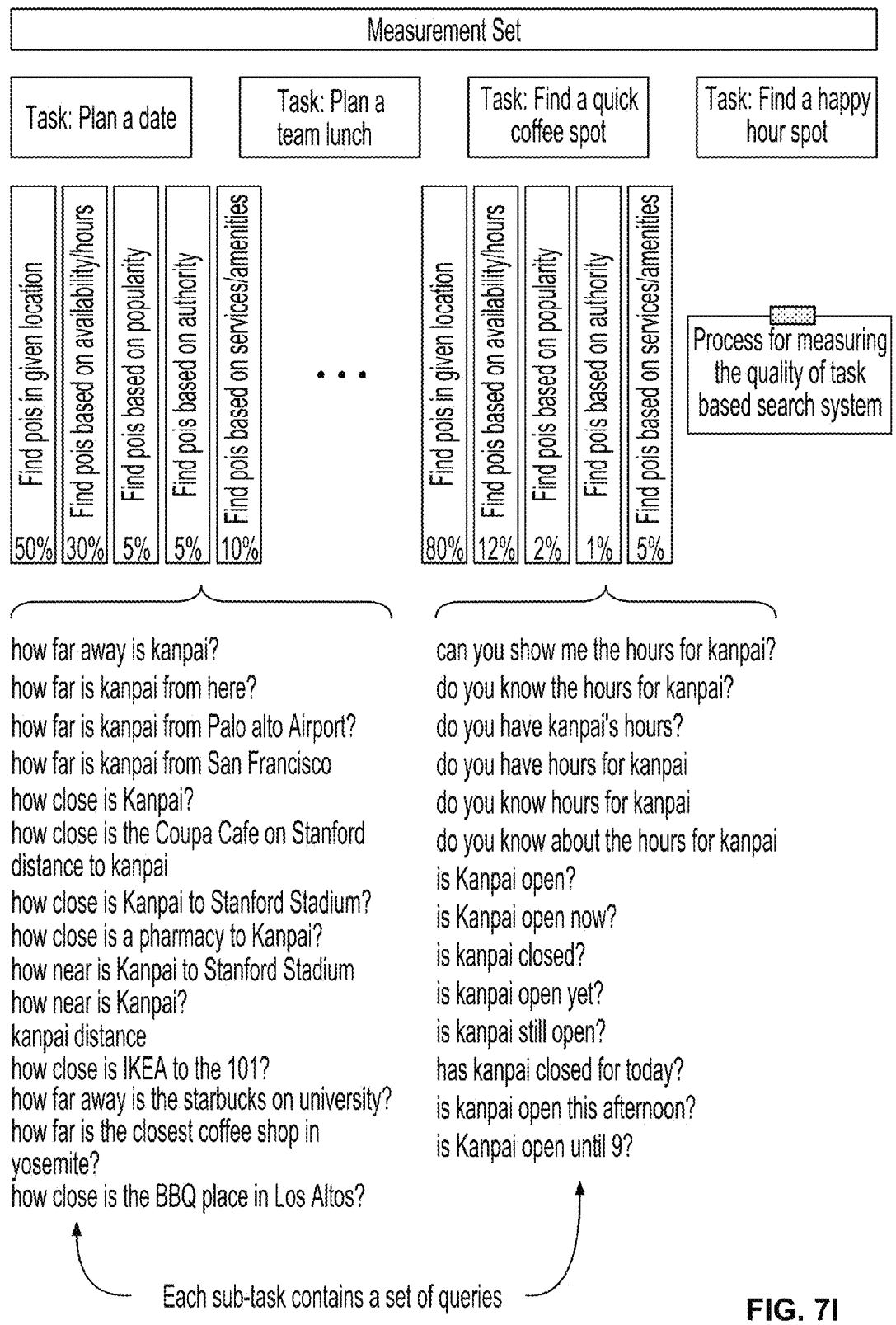

FIG. 7I is an example for measuring quality of a task based search system for a POI domain. The example of 7I includes an example measurement set over four possible tasks: Task: Plan a date; Task: Plan a team lunch; Task: Find a quick coffee spot; and Task: Find a happy hour. A measurement set is an aggregated set of queries that are in human readable form. Each query within the set is annotated with a specific task and with a particular weight.

A weight is determined based on the volume of that query type in real world user logs, human preferences gathered at measurement set generation time whilst consuming the narratives and generating queries, and internal product requirements.

As an example, for the Task: Plan a date, the sub-tasks may be weighted as follows:
 Find POIs in given location: 50%
 Find POIs based on availability/hours: 30%
 Find POIs based on popularity: 5%
 Find POIs based on authority: 5%
 Find POIs based on services/amenities: 10%

As an example, for the Task: Find a quick coffee spot by contrast the sub-tasks might be weighted as follows, in part due to its 'quick' request:
  Find POIs in given location: 80%
  Find POIs based on availability/hours: 12%
  Find POIs based on popularity: 2%
  Find POIs based on authority: 1%
  Find POIs based on services/amenities: 5%

Also, as described above, each sub-task contains a set of queries for assessment. The corresponding table to FIG. 7I includes, for example for Task: Plan a date might surface in the following embodiment:

|   | A | B | C | D | E | F |
|---|---|---|---|---|---|---|
| 1 | City | | | Win/Loss @ Perfect/ Excellent | Query Volume | Importance |
| 2 | Seattle | | | 70% | 100% | 100% |
| 3 | | Task: Plan a date | Sub-task | | | |
| 4 | | | Taste Requirements | 60% | 5% | 25% |
| 5 | | | Location | 65% | 35% | 15% |
| 6 | | | Hours/ Availability | 75% | 10% | 15% |
| 7 | | | Popularity/ Authority | 90% | 10% | 10% |
| 8 | | | Price/Cost | 40% | 10% | 15% |
| 9 | | | Services/ Amenities | 90% | 10% | 7.50% |
| 10 | | | Ambience | 95% | 10% | 7.50% |
| 11 | | | Noteworthiness | 75% | 10% | 5% |

This example table exposes that the intelligent agent (212) is performing well on queries related to planning a date, for the topics of 'Ambience' and 'Services' or 'Amenities', for example Places that are romantic, Movies that are good for a date, Best places with valet parking), but not as well on queries related to price, for example Cheap places that are good for a date. The final scores are a combination of standard measurement metrics, in this case, Win/Loss, and a weighting of their volume and importance.

FIG. 7J is a flow chart illustrating an embodiment of a process for generating a measurement set. In one embodiment, an example of this measurement process is given above with FIG. 7I. One or more steps may be omitted without limitation.

In step 702, important tasks are established via 1) sampling query logs and/or 2) a product investment definition. In step 704, a narrative for each task is written. In step 706, a set of questions for each task is written. In step 708, motivating queries and tasks are presented to the crowd, as will be detailed in FIG. 7J. In step 710, results of step 708 are collated to a clean query set, in part by dropping nonsense and malformed results. In step 712, the cleaned query set is presented to the crowd, as will be detailed in FIG. 7K. In step 714, the results of step 712 are collated to a final query set, in part again by dropping nonsense and malformed results. In step 716, the final query set is used to assess quality of the intelligent agent (212).

Figure 7K:
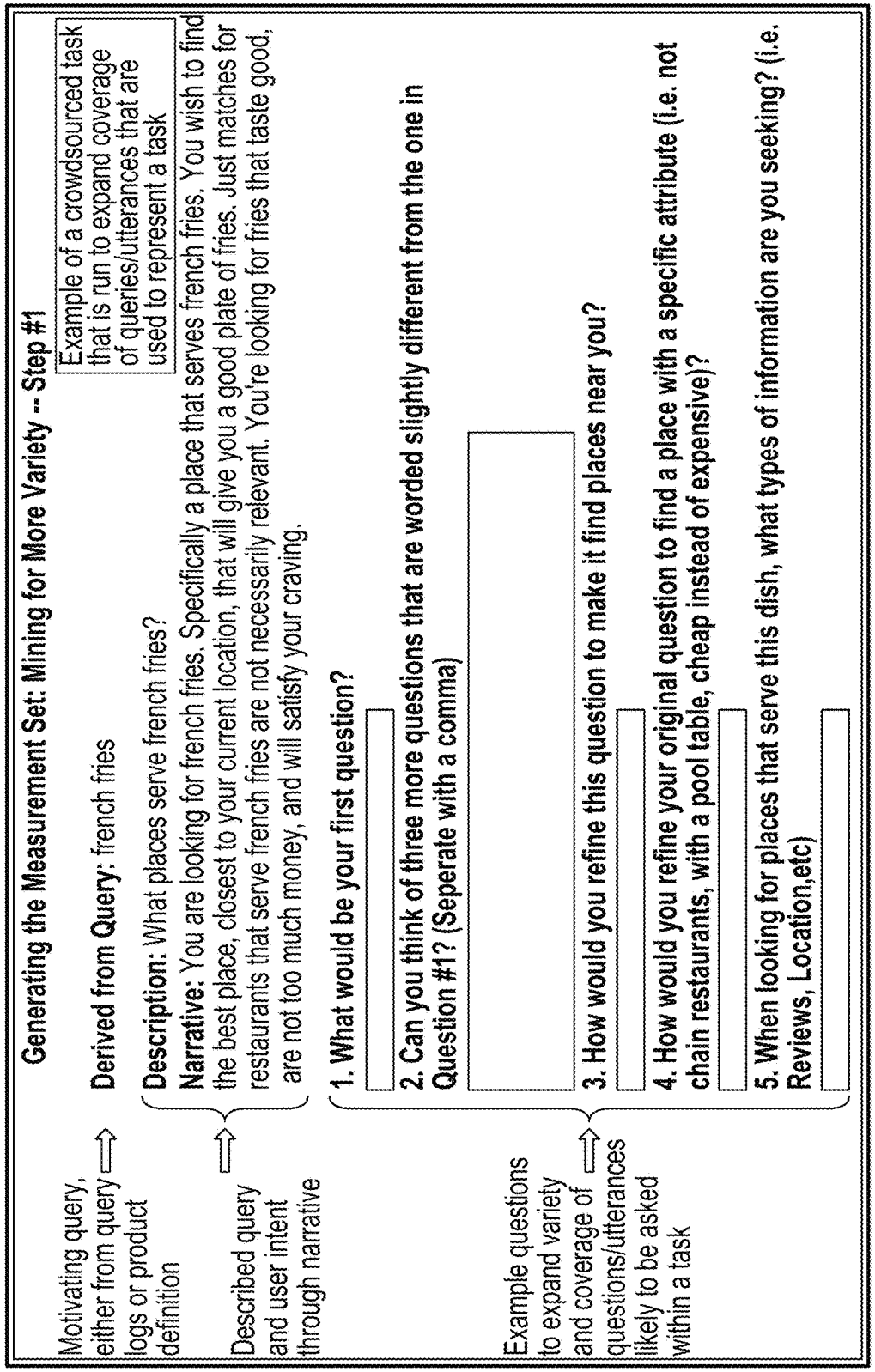
FIG. 7K is an illustration of an embodiment for a first mining of variety.

FIG. 7K is an illustration of an embodiment for a first mining of variety. In one embodiment, the illustration of FIG. 7K is related to step 708 in FIG. 7J. FIG. 7K is an example of a crowdsourced task that is run to expand coverage of statements, queries and/or utterances that are used to represent a task. In the example of FIG. 7K, a motivating query is presented, either from query logs and/or product definition; derived from a query "french fries" the description given is "what places serve French fries?".

The described query and user intent through a narrative is presented, and in FIG. 7K is given: "You are looking for French fries. Specifically, a place that serves French fries. You wish to find the best place, closest to your current location, that will give you a good plate of fries. Just matches for restaurants that serve French fries are not necessarily relevant. You're looking for fries that taste good, are not too much money, and will satisfy your craving."

Questions to expand variety and coverage of statements/ queries/utterances likely to be asked within a task are presented, and examples in FIG. 7K are given: "1. What would be your first question?"; "2. Can you think of three more questions that are worded slightly different from the one in Question #1? (Separate with a comma)"; "3. How would you refine this question to make it find places near you?"; "4. How would you refine your original question to find a place with a specific attribute (i.e. not chain restaurants, with a pool table, cheap instead of expensive)?"; and "5. When looking for places that serve this dish, what types of information are you seeking? (i.e. Reviews, Location, etc)".

Figure 7L:
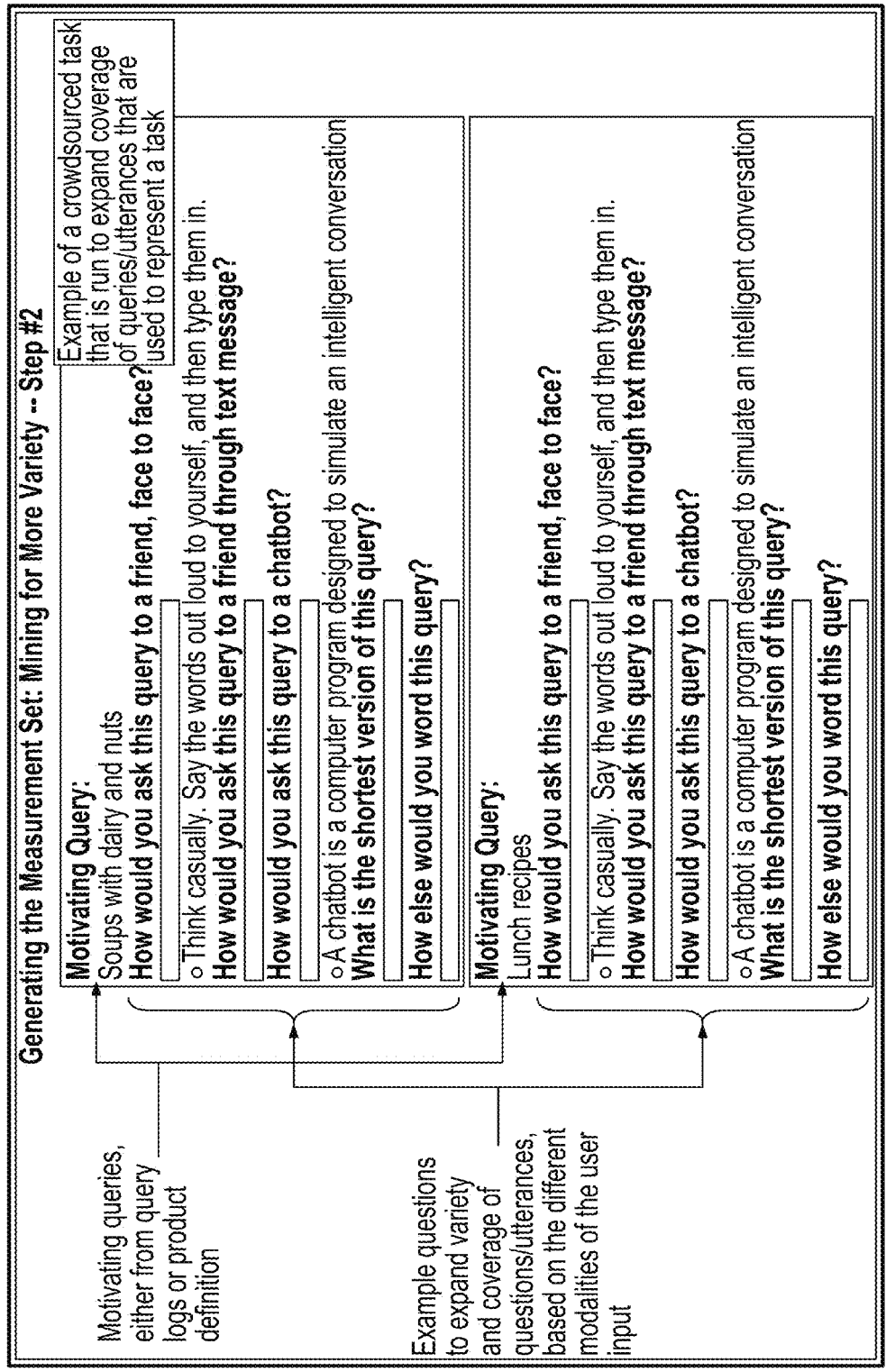
FIG. 7L is an illustration of an embodiment for a second mining of variety.

FIG. 7L is an illustration of an embodiment for a second mining of variety. In one embodiment, the illustration of FIG. 7L is related to step 712 in FIG. 7J. FIG. 7L is a second example of a crowdsourced task that is run to expand coverage of statements, queries and/or utterances that are used to represent a task. In the example of FIG. 7L, a motivating query is presented, either from query logs and/or product definition and example questions are presented to expand variety and coverage of statements/queries/utterances, based on different modalities of user input and/or context.

The first motivating query in FIG. 7L is that of "soups with dairy and nuts". The second motivating query in FIG. 7L is that of "lunch recipes". The questions for this queries include: "How would you ask this query to a friend, face to face? Think casually. Say the words out loud to yourself, and then type them in."; "How would you ask this query to a friend through text message?"; "How would you ask this query to a chatbot? A chatbot is a computer program designed to simulate an intelligent conversation"; "What is the shortest version of this query?"; and "How else would you word this query?"

Figure 8A:
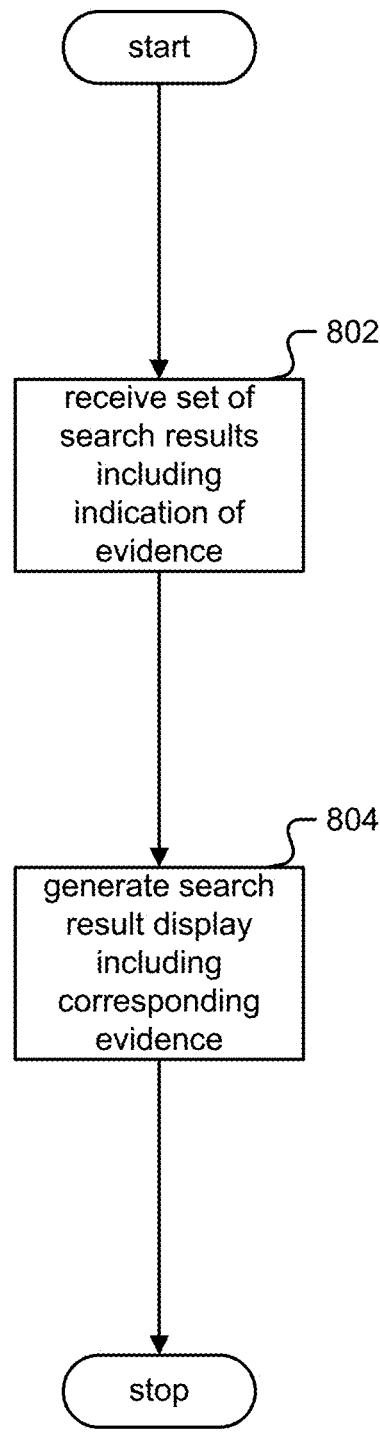
FIG. 8A is a flow chart illustrating an embodiment of a process for providing enhanced search using an intelligent agent and interface.

FIG. 8A is a flow chart illustrating an embodiment of a process for providing enhanced search using an intelligent agent and interface. In one embodiment, the process of FIG. 8A is performed by intelligent agent (212) of FIG. 2.

In step 802, a set of search results associated with a query is received, the set of search results including for each of search result in at least a subset of the set an indication of an evidence based at least in part on which the search result was included in the set of search results.

In step 804, a search result display interface is generated in which at least a displayed subset of search results are displayed, the search result display interface include for each of at least a subset of the displayed search results an indication of the corresponding evidence based on which that search result was included in the set of search results.

In one embodiment, the search result display interface comprises a carousel of cards. The carousel of cards may comprise cross-aspect scrolling of cards in a priority order. The carousel of cards may comprise publisher themed cards. A selection of a card from those presented within the carousel of cards may open more information about a result associated with the card. A card from those presented within the carousel of cards may have a control associated with the card. Said control may comprise at least one of the following: an active element, a button, an input, a scroll view, a reservation button, a reservation time selector, a play video control, and a show image control. Said control may allow a user (202) of the control to directly manipulate content within the card.

In one embodiment, a set of evidence associated with the set of search results comprises at least one of the following: a trusted source; an authoritative source; an aggregation from multiple sources; a factual data; and a data extracted from a source document, wherein the source document comprises at least one of the following: a review; a menu; a listing; an article; an image; a video; and an audio clip. The set of evidence may be changeable by a user (202) selection. The indication of evidence may allow a user (202) to browse the evidence. The indication of evidence may include anti-evidence. The data extracted from a source document may be split into fragments of data to provide a plurality of evidence.

In one embodiment, the query is associated with a messaging channel. A U/I behavior associated with the search result display interface may adapt to the messaging channel used for access. The message channel may allow a user (202) to converse with an intelligent search agent (212). Conversing may comprise at least one of the following: voice conversation, text conversation, SMS conversation, MMS conversation, IM conversation, and chat conversation.

Figure 8B:
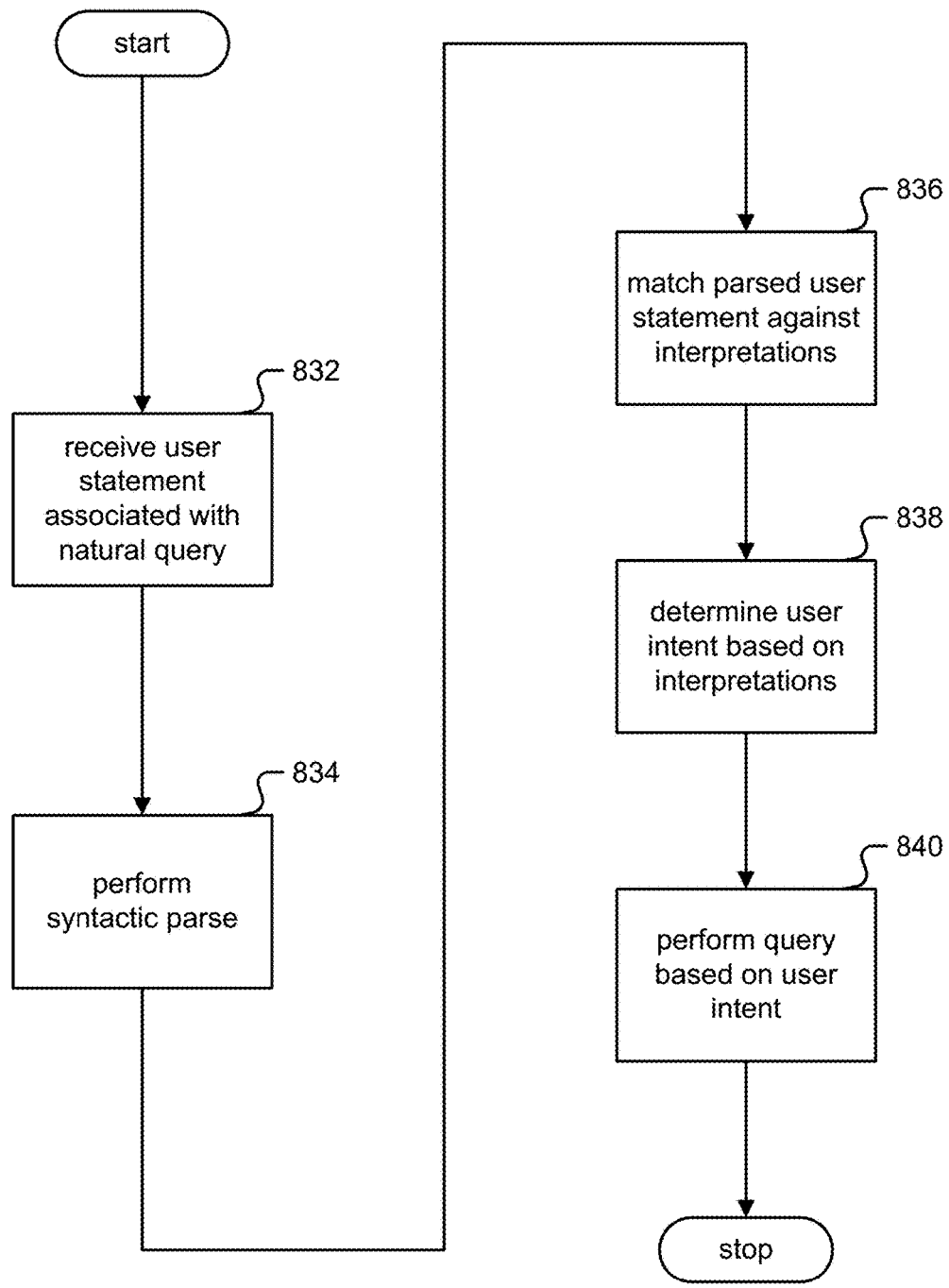
FIG. 8B is a flow chart illustrating an embodiment of a process for user intent and context based search results.

FIG. 8B is a flow chart illustrating an embodiment of a process for user intent and context based search results. In one embodiment, the process of FIG. 8B is performed by intelligent agent (212) of FIG. 2.

In step 832, a user statement associated with a natural query is received. In step 834, a syntactic parse of the user statement is performed to generate a parsed user statement. In step 836, the parsed user statement is matched against a set of one or more interpretations determined to have meaning in a context of a knowledge base with which the user statement is associated. In step 838, a user intent is determined based at least in part on said one or more interpretations. In step 840, a determined query based on said user intent is performed.

In one embodiment, the syntactic parse comprises mapping raw bytes of user input to low-level parts of natural language. Said mapping may comprise at least one of the following: normalization of encoding systems; recognition of intentional and unintentional variations of terms; detection of non-alphabetical data; labelling of terms according to natural language models; and detection of spans.

The recognition of intentional and unintentional variations of terms may comprise at least one of the following: spelling errors, alternate spellings, abbreviations, shortcuts, and emoji. Labelling of terms may comprise labelling at least one of the following: adjective, noun, preposition, conjugation, and declension. Detection of spans may comprise detection of one or more terms that represent a discrete concept in a mind of a user (202). Detection of spans may comprise a domain and a probability. Mapping may comprise multiple incompatible segmentations and parses of user input.

In one embodiment, matching the parsed user statement comprises a semantic and grammatical parse. Said semantic and grammatical parse may comprise at least one of the following: adjectival filters; categorical filters; prepositional entity relationships; target domain inference; grammatical relationships; implicative grammatical relationships; discourse state concepts; and discourse state objects. The semantic and grammatical parse may comprise at least one of the following: a Viterbi search algorithm and a domain pruning.

In one embodiment, an interpretation of the set of one or more interpretations may comprise a grammatical tree representing an understanding of the user statement. A node on the grammatical tree may be tagged with at least one of the following: its syntactic role; its grammatical role; and its semantic role.

In one embodiment, an additional step (not shown in FIG. 8B) is performed of generating a machine readable query at least in part by resolving an unbound concept in the interpretation, wherein the determined query is the machine readable query. Resolving an unbound concept in the interpretation may comprise binding it to an object associated with a search. Binding may comprise determining based at least in part on a user context, wherein the user context comprises a user location. Binding may comprise determining based at least in part on a user conversation state, wherein the user conversation state comprises a conversation vector.

In one embodiment, an additional step (not shown in FIG. 8B) is performed of generating a clarifying question in the event the parsed user statement matches a plurality of interpretations.

Figure 8C:
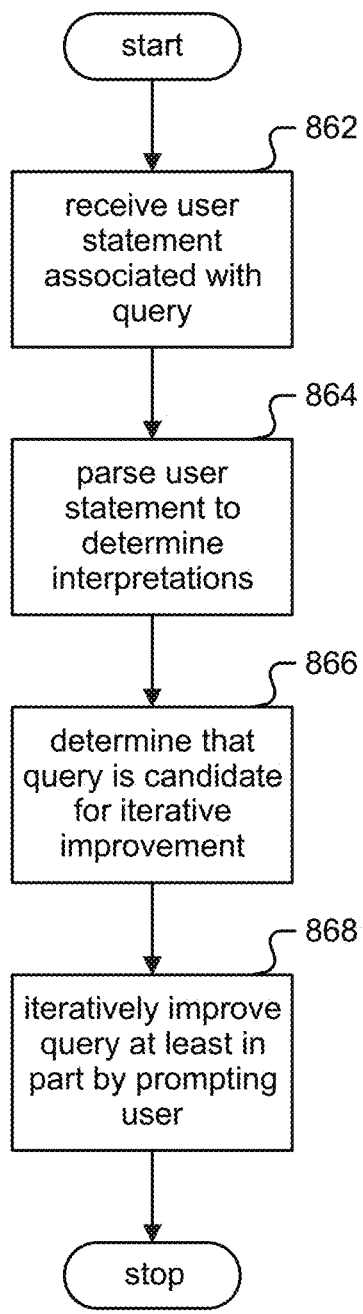
FIG. 8C is a flow chart illustrating an embodiment of a process for an interactive search engine.

FIG. 8C is a flow chart illustrating an embodiment of a process for an interactive search engine. In one embodiment, the process of FIG. 8C is performed by intelligent agent (212) of FIG. 2.

In step 862, a user statement associated with a query is received. In step 864, the user statement is parsed to determine a set of interpretations matching the user statement. In step 866, based at least in part on the set of interpretations it is determined that the query is a candidate for iterative improvement. In step 868, the query is iteratively improved at least in part by prompting a user (202) associated with the user statement to provide a further input.

In one embodiment, determining that the query is the candidate for iterative improvement may comprise determining an ambiguity exists as to a user intent associated with the user statement, and wherein prompting the user (202) to provide the further input comprises resolving the ambiguity. Prompting the user (202) to provide a further input may comprise constructing prompts for possible next commands the user (202) would input. Prompting the user (202) to provide a further input may comprise constructing a Clarifying Question.

In one embodiment, an additional step (not shown in FIG. 8C) is performed of rendering a result for a most probable referent but provide opportunity for clarification. In one embodiment, an additional step (not shown in FIG. 8C) is performed of resolving the ambiguity at least in part by using a machine originated query.

In one embodiment, the query is associated with a conversation model between the user (202) and an intelligent agent (212). The user (202) may converse with an input of at least one of the following: a new search; a modify search; an acceptance; a resume search; and a chatter. The user (202) may converse with an input of at least one of the following: a text command; a spoken command; a contextual validation of free text; and a gesture. The user (202) may be associated with passive input of at least one of the following: user context; user preferences; current location; current speed; current heading; past locations; personal data; user name; user home address; user work address; user diet; user likes; user dislikes; time of day; day of week; time of year; holidays; recent searches; and location in the U/I.

The intelligent agent (212) may converse with an output of at least one of the following: a proposed result; a question; and a suggestion of next steps. In the event a question relates to collecting a user personal data, the intelligent agent (212) may reduce user intrusion. Reducing user intrusion may comprise at least one of the following: waiting until query relates to the user personal data; accommodating a comfortable level of information relating to the user personal data; and explaining that the agent (212) is using the user personal data when showing results based at least in part on the user personal data.

The output may comprise a browse mode without losing a search flow. The acceptance may comprise a command to remember for later. A conversation associated with the conversation model may start with a set of one or more starting dialog prompts without any user input. The further input may be a set of one or more suggested dialog prompts. The set of one or more suggested dialog prompts may be refreshed to determine an advance set of suggested dialog prompts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive via the communication interface a set of search results associated with a query;
retrieve a set of evidence for each search result in the set of search results, the evidence included in a given set of evidence based at least in part on why the corresponding search result was included in the set of search results;
rank the search results in the set of search results based on the sets of evidence associated with the search results;
selecting a displayed subset of the search results to display based on the search result ranks; and
generate a search result display interface in which the displayed subset of search results is displayed, wherein the search result display interface comprises a carousel of cards and includes, for at least one of the displayed search results, an indication of corresponding evidence that contributed to the rank of the search result, the indication comprising an explanation of the rank given to the search result, the carousel of cards comprising a cross-aspect scrolling of publisher themed cards in priority order.

2. The system of claim 1, wherein a selection of a card from those presented within the carousel of cards opens more information about a result associated with the card.

3. The system of claim 1, wherein a card from those presented within the carousel of cards has a control associated with the card.

4. The system of claim 3, wherein the control comprises at least one of the following: an active element, a button, an input, a scroll view, a reservation button, a reservation time selector, a play video control, and a show image control.

5. The system of claim 3, wherein the control allows a user of the control to directly manipulate content within the card.

6. The system of claim 1, wherein a set of evidence associated with the set of search results comprises at least one of the following: a trusted source; an authoritative source; an aggregation from multiple sources; a factual data; and a data extracted from a source document, wherein the source document comprises at least one of the following: a review; a menu; a listing; an article; an image; a video; and an audio clip.

7. The system of claim 6, wherein the set of evidence is changeable by a user selection.

8. The system of claim 6, wherein the indication of corresponding evidence allows a user to browse the corresponding evidence.

9. The system of claim 6, wherein at least one of the sets of evidence includes anti-evidence, the anti-evidence resulting in the rank of the corresponding result being reduced.

10. The system of claim 6, wherein the processor is further configured to split a source document into fragments of data to provide a plurality of pieces of evidence.

11. The system of claim 1, wherein the query is associated with a messaging channel.

12. The system of claim 11, wherein a U/I behavior associated with the search result display interface adapts to the messaging channel used for access.

13. The system of claim 11, wherein the message channel allows a user to converse with an intelligent search agent.

14. The system of claim 13, wherein converse comprises at least one of the following: voice conversation, text conversation, SMS conversation, MMS conversation, IM conversation, and chat conversation.

15. The system of claim 1, further comprising:
a memory coupled to the processor and configured to store the set of search results;
a display device coupled to the processor and configured to display the search result display interface; and
an input device coupled to the processor and configured to receive the query, wherein the input device is at least one of the following: touch display, gesture display, keyboard, and microphone.

16. The system of claim 1, wherein the processor ranks fragments of evidence in the set of evidence for the search results in the set of search results based on how much the fragment contributed to the ranking of the search result.

17. The system of claim 1, wherein the displayed subset of search results includes a predetermined number of highest ranked results and the indication of corresponding evidence that caused each search result to be more highly ranked than other search results.

18. A method, comprising:
receiving a set of search results associated with a query;
retrieving a set of evidence for each search result in the set of search results, the evidence based at least in part on why the search result was included in the set of search results;
ranking the search results in the set of search results based on the sets of evidence associate with the search results;
selecting a displayed subset of the search results to display based on the search result ranks; and
generating a search result display interface in which the displayed subset of search results is displayed, wherein the search result display interface comprises a carousel of cards and includes, for at least one of the displayed search results, an indication of corresponding evidence that contributed to the rank of the search result, the carousel of cards comprising a cross-aspect scrolling of publisher themed cards in priority order.

19. The method of claim 18, wherein a selection of a card from those presented within the carousel of cards opens more information about a result associated with the card.

20. The method of claim 18, wherein a card from those presented within the carousel of cards has a control associated with the card.

21. The method of claim 20, wherein the control comprises at least one of the following: an active element, a button, an input, a scroll view, a reservation button, a reservation time selector, a play video control, and a show image control.

22. The method of claim 20, wherein the control allows a user of the control to directly manipulate content within the card.

23. The method of claim 18, wherein a set of evidence associated with the set of search results comprises at least one of the following: a trusted source; an authoritative source; an aggregation from multiple sources; a factual data; and a data extracted from a source document, wherein the source document comprises at least one of the following: a review; a menu; a listing; an article; an image; a video; and an audio clip.

24. The method of claim 23, wherein the set of evidence is changeable by a user selection.

25. The method of claim 23, wherein the indication of corresponding evidence allows a user to browse the corresponding evidence.

26. The method of claim 23, wherein at least one of the sets of evidence includes anti-evidence, the anti-evidence resulting in the rank of the corresponding result being reduced.

27. The method of claim 23, further comprising:
splitting a source document into fragments of data to provide a plurality of pieces of evidence.

28. The method of claim 18, wherein the query is associated with a messaging channel.

29. The method of claim 28, wherein a U/I behavior associated with the search result display interface adapts to the messaging channel used for access.

30. The method of claim 28, wherein the messaging channel allows a user to converse with an intelligent search agent.

31. The method of claim 30, wherein converse comprises at least one of the following: voice conversation, text conversation, SMS conversation, MMS conversation, IM conversation, and chat conversation.

32. The method of claim 18, further comprising:
storing the set of search results in a memory coupled to a processor;
displaying the search result interface via a display device coupled to the processor; and
receiving the query via an input device coupled to the, wherein the input device is at least one of the following: touch display, gesture display, keyboard, and microphone.

33. The method of claim 18, further comprising:
ranking fragments of evidence in the set of evidence for the search results in the set of search results based on how much the fragment contributed to the ranking of the search result.

34. The method of claim 18, wherein the displayed subset of search results includes a predetermined number of highest ranked results and the indication of corresponding evidence that caused each search result to be more highly ranked than other search results.

35. A non-transitory computer readable storage medium storing computer instructions for:
receiving a set of search results associated with a query;
retrieving a set of evidence for each search result in the set of search results, the evidence based at least in part on why the search result was included in the set of search results;
ranking the search results in the set of search results based on the sets of evidence associate with the search results;
selecting a displayed subset of the search results to display based on the search result ranks; and
generating a search result display interface in which the displayed subset of search results is displayed, wherein the search result display interface comprises a carousel of cards and includes, for at least one of the displayed search results, an indication of corresponding evidence that contributed to the rank of the search result, the carousel of cards comprising a cross-aspect scrolling of publisher themed cards in priority order.

* * * * *